(12) United States Patent
    Hayakawa et al.

(10) Patent No.: US 11,524,689 B2
(45) Date of Patent: Dec. 13, 2022

(54) VEHICLE TRAVELING CONTROL METHOD AND TRAVELING CONTROL DEVICE

(71) Applicant: Nissan Motor Co., Ltd., Yokohama (JP)

(72) Inventors: Yasuhisa Hayakawa, Kanagawa (JP); Takahiko Oki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/270,294

(22) PCT Filed: Sep. 7, 2018

(86) PCT No.: PCT/JP2018/033227
§ 371 (c)(1),
(2) Date: Feb. 22, 2021

(87) PCT Pub. No.: WO2020/049722
PCT Pub. Date: Mar. 12, 2020

(65) Prior Publication Data
US 2021/0171042 A1    Jun. 10, 2021

(51) Int. Cl.
*B60W 30/18*     (2012.01)
*B60W 60/00*     (2020.01)
(Continued)

(52) U.S. Cl.
CPC .... *B60W 30/18163* (2013.01); *B60W 30/146* (2013.01); *B60W 40/04* (2013.01);
(Continued)

(58) Field of Classification Search
CPC ......... B60W 30/18163; B60W 30/146; B60W 40/04; B60W 40/105; B60W 60/00182;
(Continued)

(56) References Cited

U.S. PATENT DOCUMENTS 8,244,408 B2 *   8/2012   Lee ................... B60W 30/0956
                                                           701/119
8,831,867 B2 *   9/2014   Bald ....................... G06F 17/00
                                                           701/300

(Continued)

FOREIGN PATENT DOCUMENTS

CN      106030609 A  * 10/2016   ......... B60K 31/0066
DE    102012221650 A1 *  5/2014   ............ B60W 50/14
(Continued)

*Primary Examiner* — Angelina Shudy
(74) *Attorney, Agent, or Firm* — Young Basile Hanlon & MacFarlane, P.C.

(57) ABSTRACT

When a subject vehicle performs first autonomous lane change control from a subject vehicle lane to an adjacent lane and then consecutively perform autonomous lane change control to a next adjacent lane in the same direction of lane change, lateral speed to perform second and subsequent autonomous lane change control is set slower than lateral speed to perform the first autonomous lane change control. Thus, the second and subsequent autonomous lane change control to the adjacent lane in the same direction of lane change is performed more slowly than the previously performed autonomous lane change control. Time used for confirming surrounding situations is lengthened, and the surrounding situations can be properly confirmed prior to the lane change.

13 Claims, 28 Drawing Sheets

(51) Int. Cl.
  *B60W 30/14* (2006.01)
  *B60W 40/04* (2006.01)
  *B60W 40/105* (2012.01)

(52) U.S. Cl.
  CPC .... *B60W 40/105* (2013.01); *B60W 60/00182* (2020.02); *B60W 2520/12* (2013.01); *B60W 2555/20* (2020.02)

(58) Field of Classification Search
  CPC ......... B60W 2520/12; B60W 2555/20; B60W 2556/10; B60W 2720/12; B62D 15/0255; B62D 6/00; G08G 1/167
  See application file for complete search history.

(56) References Cited

U.S. PATENT DOCUMENTS

| | | | | |
|---|---|---|---|---|
| 9,884,645 | B2* | 2/2018 | Fujii | G06V 20/58 |
| 11,097,778 | B2* | 8/2021 | Yoshimoto | B62D 25/08 |
| 11,167,758 | B2* | 11/2021 | Fukushige | G01C 21/3658 |
| 2010/0017180 | A1* | 1/2010 | Randler | G01S 13/726 703/8 |
| 2012/0271539 | A1* | 10/2012 | Bald | B60W 50/0097 701/300 |
| 2015/0153735 | A1* | 6/2015 | Clarke | B62D 15/025 701/301 |
| 2015/0321699 | A1* | 11/2015 | Rebhan | B60W 30/14 701/23 |
| 2016/0225261 | A1* | 8/2016 | Matsumoto | B62D 15/0255 |
| 2017/0043780 | A1* | 2/2017 | Yoon | B60W 30/18163 |
| 2017/0072951 | A1* | 3/2017 | Sakaguchi | B60W 30/143 |
| 2017/0151982 | A1* | 6/2017 | Fujii | B60W 10/20 |
| 2018/0326996 | A1* | 11/2018 | Fujisawa | B60W 50/16 |
| 2019/0023273 | A1* | 1/2019 | Ishioka | G08G 1/16 |
| 2019/0061766 | A1* | 2/2019 | Nishiguchi | B60W 30/18163 |
| 2019/0152525 | A1* | 5/2019 | Resch | G01C 21/34 |
| 2019/0193738 | A1* | 6/2019 | Oh | G08G 1/22 |
| 2019/0263410 | A1* | 8/2019 | Groult | B60W 40/04 |
| 2019/0294167 | A1* | 9/2019 | Kutila | G01C 21/3461 |
| 2019/0333381 | A1* | 10/2019 | Shalev-Shwartz | G06V 20/584 |
| 2020/0023845 | A1* | 1/2020 | Wang | B60W 30/146 |
| 2020/0094875 | A1* | 3/2020 | Mimura | B62D 15/0265 |
| 2020/0377088 | A1* | 12/2020 | Fukushige | B60W 30/18163 |
| 2020/0394562 | A1* | 12/2020 | Nonaka | B60W 50/00 |
| 2020/0398837 | A1* | 12/2020 | Kumara | B60W 50/085 |
| 2020/0398894 | A1* | 12/2020 | Hudecek | G05D 1/0214 |
| 2021/0065541 | A1* | 3/2021 | Koshizen | G08G 1/096791 |
| 2021/0276561 | A1* | 9/2021 | Hayakawa | B60W 30/095 |
| 2021/0362720 | A1* | 11/2021 | Takahashi | B60W 10/20 |
| 2021/0394786 | A1* | 12/2021 | Zhu | B60W 60/0011 |
| 2022/0073098 | A1* | 3/2022 | D'Orazio | B60W 40/072 |

FOREIGN PATENT DOCUMENTS

| | | | | |
|---|---|---|---|---|
| DE | 102016216134 A1 | * | 3/2018 | |
| JP | 2017073060 A | * | 4/2017 | |
| JP | 2017-100534 A | | 6/2017 | |
| JP | 2017140857 A | * | 8/2017 | |
| WO | WO-2019159724 A1 | * | 8/2019 | ............ B60W 10/20 |
| WO | WO-2020099555 A1 | * | 5/2020 | ............ B60W 10/04 |

* cited by examiner

FIG. 2

| Travel scene | Determination condition | Direction of changing lanes | Necessity level of changing lanes | Time limit |
|---|---|---|---|---|
| Scene of catching up with preceding vehicle | "Preceding vehicle exists ahead" and "Vehicle speed of preceding vehicle < Set vehicle speed of subject vehicle" and "Subject vehicle will reach preceding vehicle within predetermined time" and "Direction of changing lanes is not under lane change prohibition condition" | Toward overtaking lane side | X1 | Time to reach preceding vehicle – α |
| Scene of approaching tollgate | "Time to reach tollgate located ahead is less than 60 seconds" and "Direction of changing lanes is not under lane change prohibition condition" | Toward empty toll gate booth side | X2 | Time to reach tollgate – α |
| Scene of approaching merging point | "Time to reach merging point located ahead is less than predetermined time" and "Direction of changing lanes is not under lane change prohibition condition" | Toward opposite side to merging lane | X3 | Time to reach merging point – α |
| Obstruction scene of subject vehicle lane | "Travel lane of subject vehicle will disappear within predetermined distance" and "Direction of changing lanes is not under lane change prohibition condition" | Toward unobstructed lane side | X4 | Time to reach obstructed point – α |
| Scene of avoiding object on road | "Pedestrian, bicycle, motorcycle, or fallen object on road exists ahead" and "Direction of changing lanes is not under lane change prohibition condition" | Toward unoccupied lane side | X5 | Time to reach object on road – α |
| Scene of being caught up by vehicle from behind | "Following vehicle exists in travel lane of subject vehicle" and "Vehicle speed of following vehicle > Vehicle speed of subject vehicle" and "Following vehicle will reach subject vehicle within predetermined time" and "Direction of changing lanes is not under lane change prohibition condition" | Toward opposite side to overtaking lane | X6 | Time for following vehicle to reach subject vehicle – α |
| Emergency evacuation scene | "Onboard equipment is not operated within predetermined time" and "Driver is determined to be incapable of driving" and "Direction of changing lanes is not under lane change prohibition condition" | Toward road shoulder side | X7 | None |
| Scene of lane transfer toward destination | "Destination is set" and "Time to reach lane change point is within predetermined time" and "Direction of changing lanes is not under lane change prohibition condition" | Toward lane side for heading to destination | X8 (X1<X8) | Time to reach lane change point – α |
| Scene of heading to SA/PA | "Time to reach SA/PA is within predetermined time" "Elapsed time after previous rest is predetermined time or more" and "Direction of changing lanes is not under lane change prohibition condition" | Toward lane side near SA/PA | X9 | Time to reach SA/PA – α |

FIG. 3A
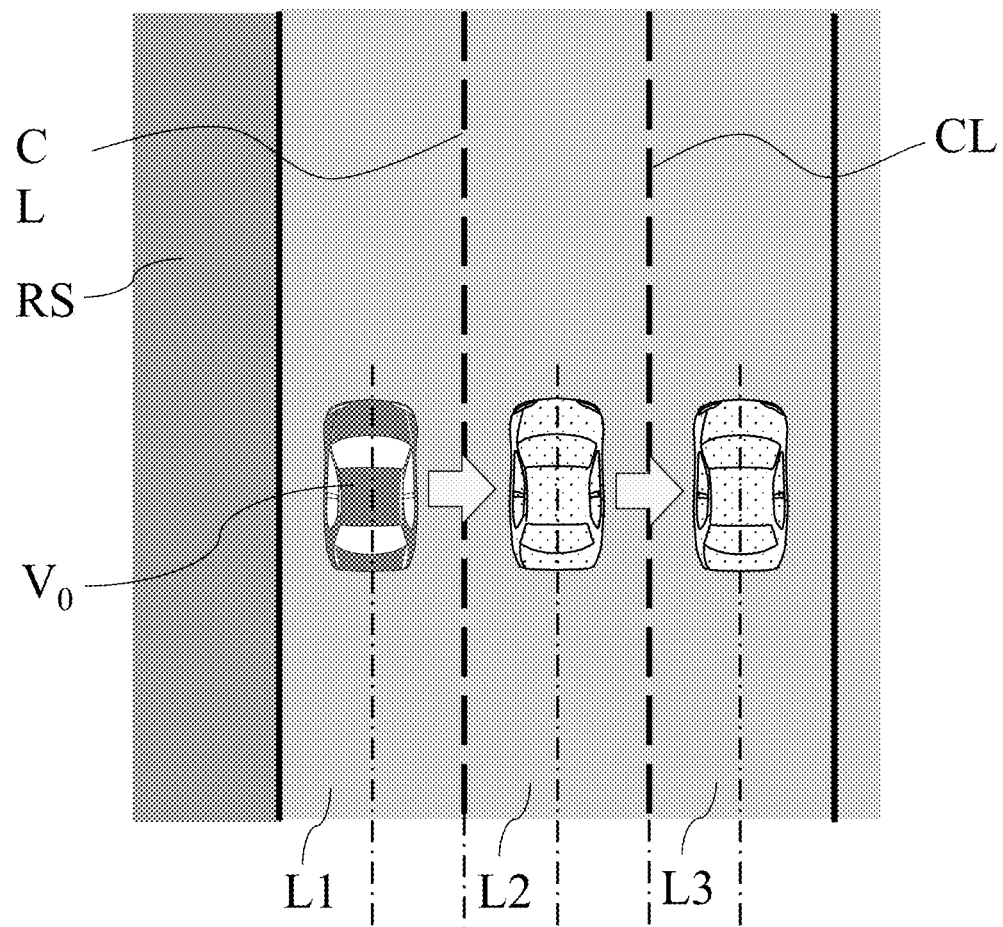
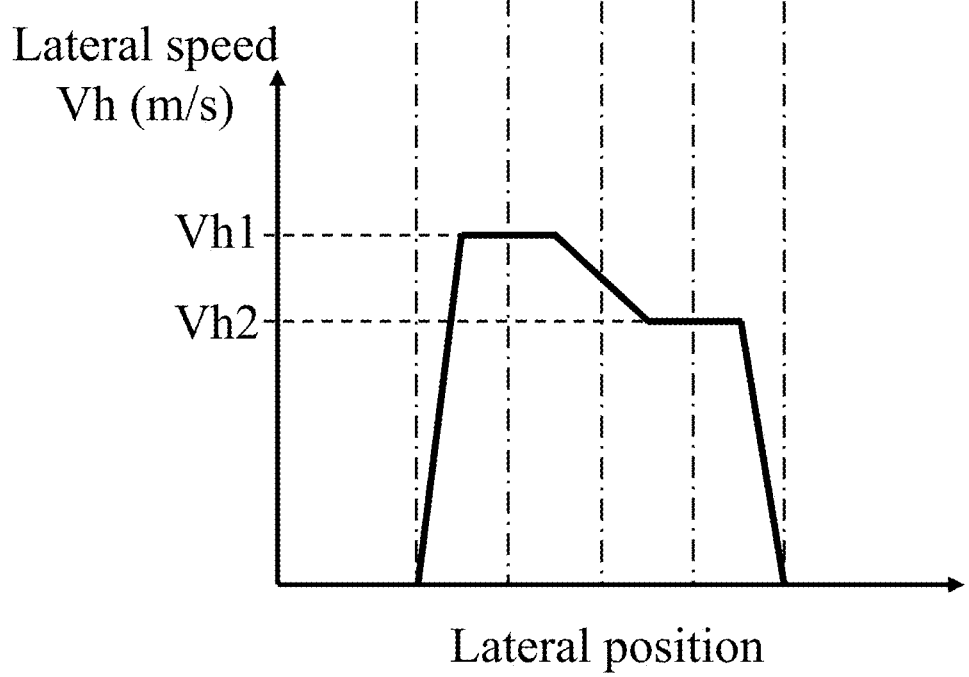

FIG. 3F
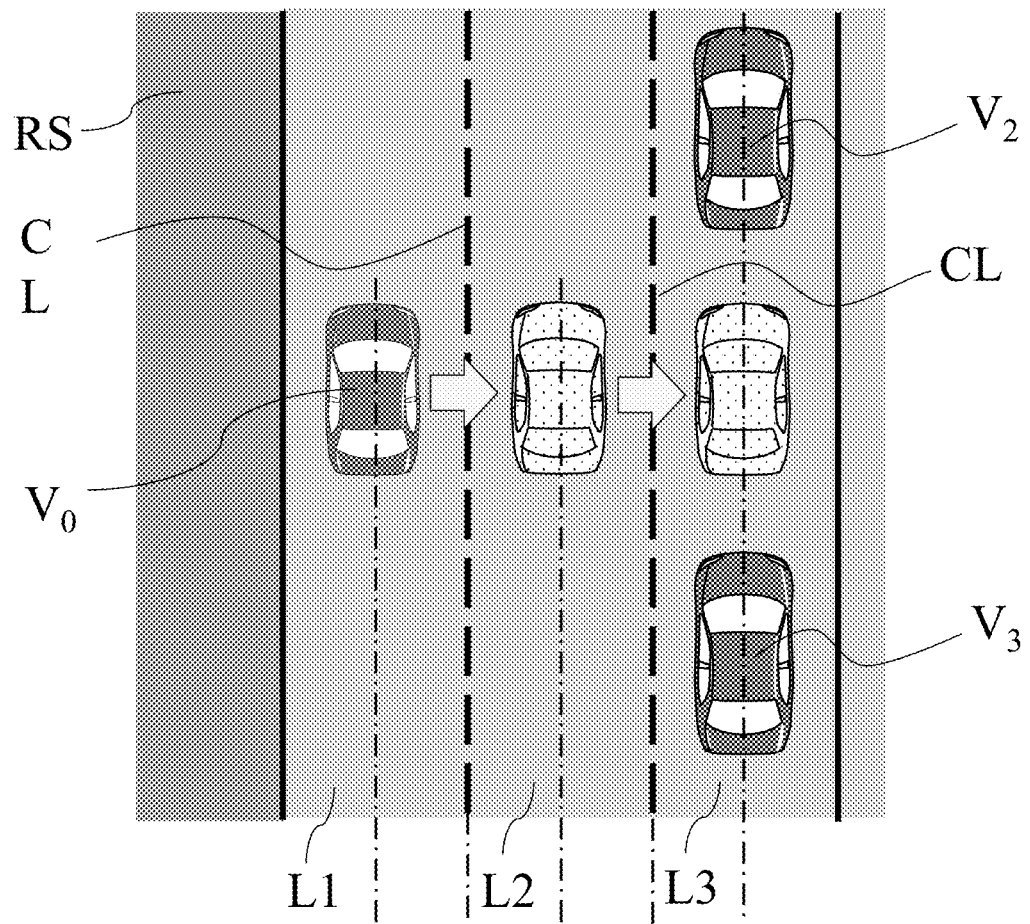
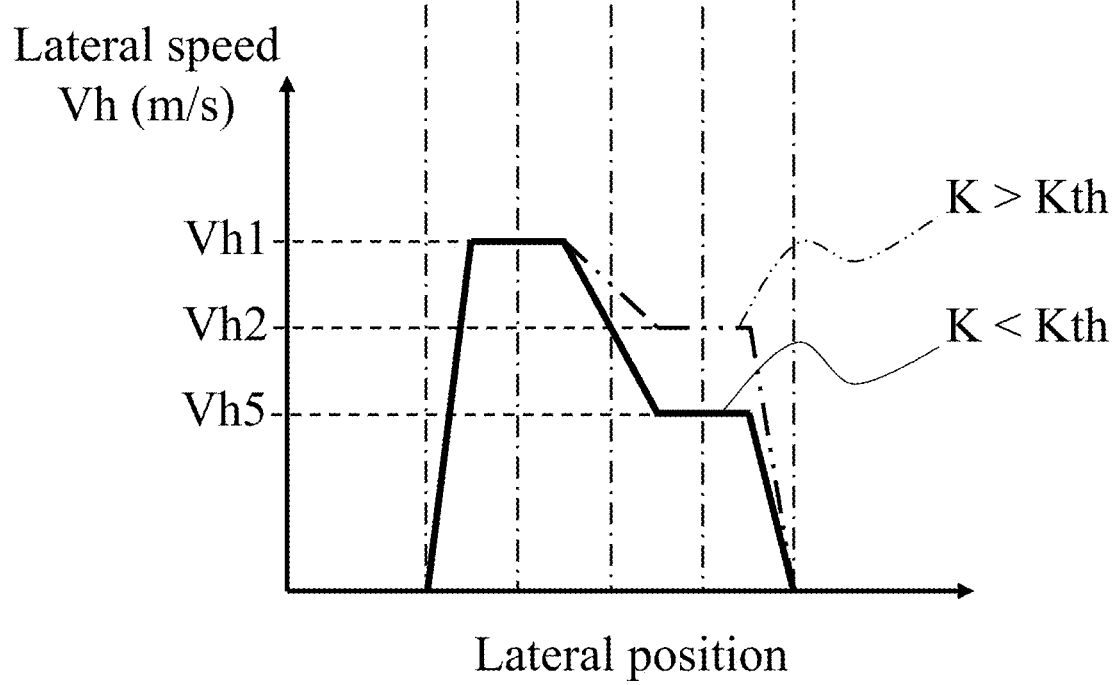

VEHICLE TRAVELING CONTROL METHOD AND TRAVELING CONTROL DEVICE

TECHNICAL FIELD

The present invention relates to a travel control method and a travel control apparatus for a vehicle that include autonomous lane change control.

BACKGROUND

A technique is known in which when performing autonomous lane changes of vehicles, the lane changes are performed with decreasing predetermined lateral acceleration or lateral speed when an object is detected in a lane to which the vehicle changes lanes or in the vicinity of the lane (JP 2017-100534 A).

In the prior art, the lateral acceleration or the lateral speed has been decreased not to discomfort an occupant when changing lanes. Therefore, the prior art does not consider autonomously changing lanes to an adjacent lane in the same direction of lane change two or more times consecutively such as changing lanes from a subject vehicle lane to the adjacent lane and consecutively changing lanes from the adjacent lane to the next adjacent lane. Therefore, when a first lane change is completed and the next lane change is performed, it may be difficult to confirm surrounding situations.

SUMMARY

The problem to be solved by the present invention is to provide a travel control method and travel control apparatus for a vehicle that can perform autonomous lane change control consecutively so that the surrounding situations can be properly confirmed when performing the second and subsequent lane changes to the adjacent lane in the same orientation of lane change.

The present invention solves the above problem by setting lateral speed for performing second and subsequent autonomous lane change control slower than lateral speed for performing first autonomous lane change control from a subject vehicle lane to an adjacent lane, when the autonomous lane change control to another adjacent lane in the same direction of lane change is consecutively performed after a subject vehicle performs the first autonomous lane change control. According to the present invention, the second and subsequent autonomous lane change control to the adjacent lane in the same direction of lance change is performed more slowly than the previously performed autonomous lane change control. For this reason, it is possible to lengthen a period for confirming the surrounding situations. Therefore, the surrounding situations can be properly confirmed prior to the lane change.

BRIEF DESCRIPTION OF THE DRAWINGS

FIG. 2 is a diagram illustrating an example of a scene determination table used for determination of a travel scene;

FIG. 3A is a diagram comprising a plan view illustrating a lane change scene on a road having three lanes according to an embodiment of the present invention and a graph illustrating lateral speed control according to a first embodiment of the travel control apparatus for a vehicle according to the present invention;

FIG. 3F is a diagram comprising a plan view of a lane change scene according to the embodiment of the present invention and a graph illustrating lateral speed control according to a third embodiment of the travel control apparatus for a vehicle according to the present invention;

DETAILED DESCRIPTION

Figure 1:
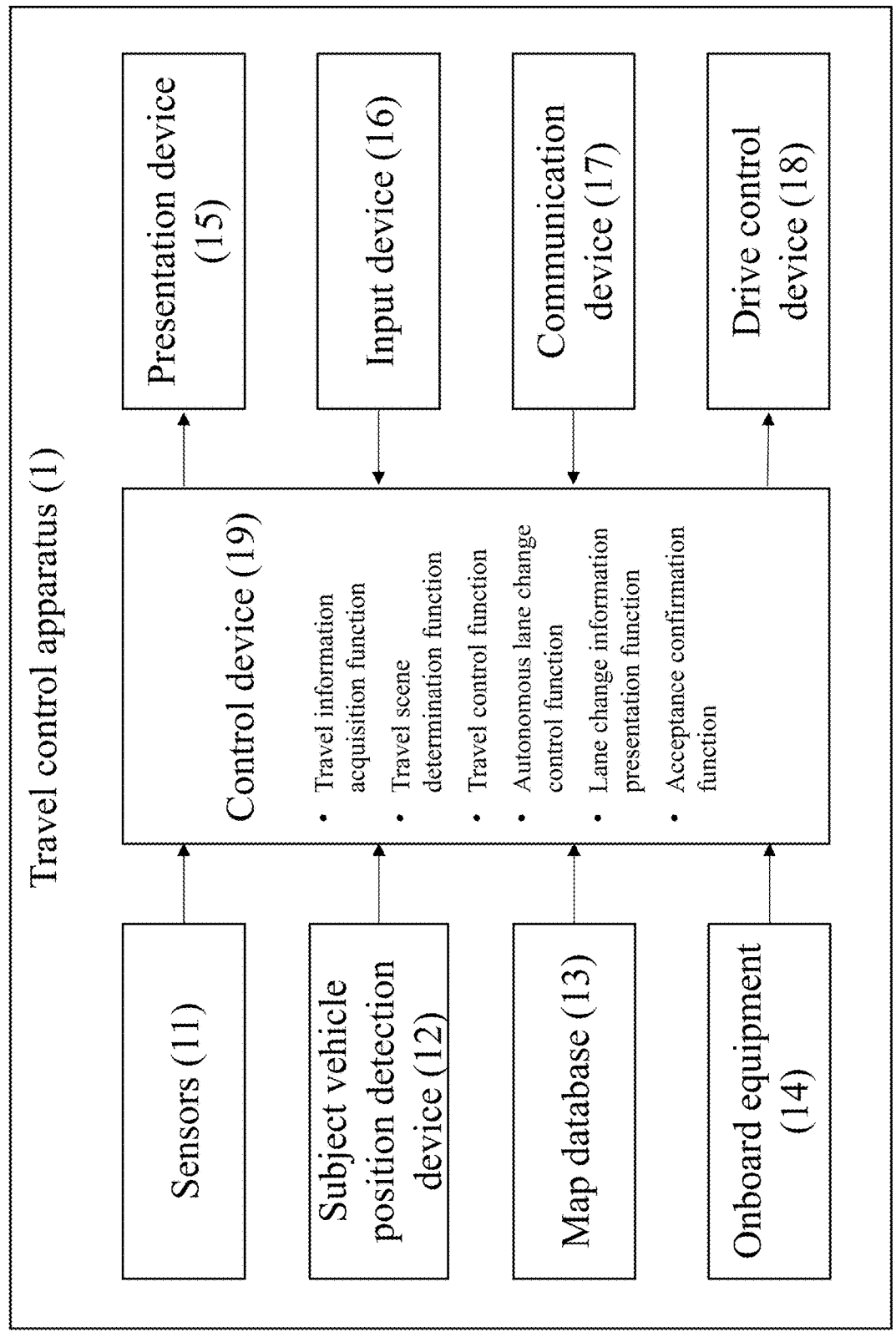
FIG. 1 is a block diagram illustrating an embodiment of the travel control apparatus for a vehicle according to the present invention.

FIG. 1 is a block diagram illustrating the configuration of a travel control apparatus 1 for a vehicle according to one or more embodiments of the present invention. The travel control apparatus 1 for a vehicle according to one or more embodiments of the present invention represents an embodiment of carrying out the travel control method for a vehicle according to the present invention. As illustrated in FIG. 1, the travel control apparatus 1 for a vehicle according to one or more embodiments of the present invention includes sensors 11, a subject vehicle position detection device 12, a map database 13, onboard equipment 14, a presentation device 15, an input device 16, a communication device 17, a drive control device 18, and a control device 19. These devices are connected to one another, for example, via a controller area network (CAN) or other onboard LAN for mutually exchanging information.

The sensors 11 detect a traveling state of the subject vehicle. Examples of the sensors 11 include a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a vehicle speed sensor that detects the vehicle speed of the subject vehicle, and an onboard camera that captures images of the driver. The sensors 11 may be represented by one of the above-described various sensors or may also be configured as a combination of two or more sensors. The detection results of the sensors 11 are output to the control device 19 at predetermined time intervals.

The subject vehicle position detection device 12 is composed of a GPS unit, a gyro-sensor, a vehicle speed sensor, and other components. The subject vehicle position detection device 12 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 12 is output to the control device 19 at predetermined time intervals.

The map database 13 stores map information that includes positional information of various facilities and specific points. Specifically, the map database 13 stores positional information of merging points and branching points, toll-gates, positions at which the number of lanes decreases, service areas (SA)/parking areas (PA), etc. together with the map information. The map information includes information on roads such as road types, road widths, the number of lanes, road radii, presence or absence of right-turn and left-turn exclusive lanes, and the number and speed limit of the exclusive lanes. The control device 19 can refer to the map information stored in the map database.

The onboard equipment 14 includes various modules equipped in the vehicle and is operated by the driver. Examples of such onboard equipment include a steering, an accelerator pedal, a brake pedal, a navigation device, an audio device, an air conditioner, a hands-free switch, power windows, wipers, lights, flashers, a horn, and specific switches. When the driver operates the onboard equipment 14, its information is output to the control device 19.

The presentation device 15 is, for example, a device such as a display of a navigation device, a display incorporated in a rearview mirror, a display incorporated in a meter unit, a head-up display projected on a windshield, a speaker of an audio device, or a seat device with embedded vibrating bodies. The presentation device 15 informs the driver of presentation information and lane change information, which will be described later, under the control by the control device 19.

The input device 16 is, for example, a device such as a dial switch or a touch panel disposed on a display screen with which the driver can input information by the manual operation or a microphone with which the driver can input information by the voice. In one or more embodiments of the present invention, the driver can operate the input device 16 thereby to input response information in response to the presentation information which is presented by the presentation device 15. For example, in one or more embodiments of the present invention, switches of flashers or other onboard equipment 14 can also be used as the input device 16. More specifically, the input device 16 may be configured such that the driver turns on the switch of a flasher thereby to input acceptance or permission for changing lanes in response to a query as to whether or not the control device 19 autonomously performs changing lanes. The response information which is input via the input device 16 is output to the control device 19.

The communication device 17 performs communication with communication equipment located outside the subject vehicle. For example, the communication device 17 performs vehicle-to-vehicle communication with another vehicle, performs road-to-vehicle communication with equipment provided at a road shoulder, or performs wireless communication with an information server provided outside the vehicle and can thereby acquire various information items from the external equipment. The information acquired by the communication device is output to the control device 19.

The drive control device 18 controls travel of the subject vehicle. For example, when the subject vehicle performs follow-up travel control to follow a preceding vehicle, the drive control device 18 controls the operation of a drive mechanism (which includes the operation of an internal-combustion engine in the case of an engine car and the operation of an electric motor for travel in the case of an electric car and further includes the torque distribution for an internal-combustion engine and an electric motor for travel in the case of a hybrid car) and the braking operation to achieve the acceleration, deceleration, and vehicle speed so that the distance between the subject vehicle and the preceding vehicle is maintained at a constant distance. Additionally or alternatively, when the subject vehicle performs lane keeping control of detecting lane marks of a lane in which the subject vehicle travels (also referred to as a "subject vehicle lane," hereinafter) and controlling the traveling position of the subject vehicle in the road width direction so that the subject vehicle travels in the subject vehicle lane, or when the subject vehicle performs autonomous lane change control such as overtaking of a preceding vehicle or change of the traveling direction, or when the subject vehicle performs travel control of turning right or left at an intersection or the like, the drive control device 18 performs the steering control of the subject vehicle by controlling the operation of the steering actuator in addition to the operation of the drive mechanism and the braking operation for achieving the acceleration, deceleration, and vehicle speed. The drive control device 18 controls travel of the subject vehicle in accordance with commands from the control device 19, which will be described below. Any of other well-known methods can also be used as the travel control method performed by the drive control device 18.

The control device 19 is composed of a read only memory (ROM) that stores programs for controlling travel of the subject vehicle, a central processing unit (CPU) that performs the programs stored in the ROM, and a random-access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can also be used as the operation circuit.

The control device 19 performs the programs stored in the ROM using the CPU thereby to achieve a travel information acquisition function of acquiring information regarding a traveling state of the subject vehicle, a travel scene determination function of determining a travel scene of the subject vehicle, a travel control function of controlling travel of the subject vehicle, an autonomous lane change control function of autonomously determining whether or not changing lanes is possible and controlling the changing lanes, a lane change information presentation function of presenting the driver with lane change information regarding the travel operation of the subject vehicle performed by the autonomous lane change control, and an acceptance confirmation function of confirming whether or not the driver accepts the changing lanes in response to the presented lane change information. These functions of the control device 19 will be described below.

The travel information acquisition function of the control device 19 is a function of acquiring the travel information regarding the traveling state of the subject vehicle. For example, the control device 19 uses the travel information acquisition function to acquire as the travel information the external image information around the vehicle captured by the front camera and rear camera included in the sensors 11 and/or the detection results by the front radar, rear radar, and side radars included in the sensors 11. Additionally or alternatively, the control device 19 uses the travel information acquisition function to acquire as the travel information the vehicle speed information of the subject vehicle detected by the vehicle speed sensor included in the sensors 11 and/or the image information of the driver's face captured by the onboard camera included in the sensors 11.

Additionally or alternatively, the control device 19 uses the travel information acquisition function to acquire as the travel information the information on the current position of the subject vehicle from the subject vehicle position detection device 12. Additionally or alternatively, the control device 19 uses the travel information acquisition function to acquire as the travel information the positional information of merging points, branching points, tollgates, positions at which the number of lanes decreases, service areas (SA)/parking areas (PA), etc. from the map database 13. Further, the control device 19 uses the travel information acquisition function to acquire information such as the road types, the road widths, the number of lanes, the road radii, presence or absence of the right-turn and left-turn exclusive lanes and the number and the speed limit of the exclusive lanes as the travel information from the map database 13. In addition, the control device 19 uses the travel information acquisition function to acquire as the travel information the information on an operation of the onboard equipment 14 (e.g., intermittent time of a wiper) performed by the driver from the onboard equipment 14.

The travel scene determination function of the control device 19 is a function of referring to a table stored in the ROM of the control device 19 to determine the travel scene in which the subject vehicle is traveling. FIG. 2 is a diagram illustrating an example of the table. As illustrated in FIG. 2, the table stores travel scenes suitable for changing lanes and the determination condition for each travel scene. The control device 19 uses the travel scene determination function to refer to the table illustrated in FIG. 2 to determine whether or not the travel scene of the subject vehicle is a travel scene suitable for changing lanes.

For example, in the example illustrated in FIG. 2, the determination condition for a "scene of catching up with a preceding vehicle" is defined by four conditions: a condition that "a preceding vehicle exists ahead," a condition of "the vehicle speed of the preceding vehicle <the set vehicle speed of the subject vehicle," a condition of "reaching the preceding vehicle within a predetermined time," and a condition that "the direction of changing lanes is not under a lane change prohibition condition." The control device 19 uses the travel scene determination function to determine whether or not the subject vehicle satisfies the above conditions, for example, on the basis of the detection results by the front camera and/or front radar included in the sensors 11, the vehicle speed of the subject vehicle detected by the vehicle speed sensor included in the sensors 11, the positional information of the subject vehicle detected by the subject vehicle position detection device 12, etc. When the above conditions are satisfied, the control device 19 determines that the subject vehicle is in the "scene of catching up with a preceding vehicle." Likewise, for all other travel scenes registered in the scene determination table illustrated in FIG. 2, the control device 19 uses the travel scene determination function to determine whether or not each determination condition is satisfied.

Examples of the lane change prohibition condition include a condition that "the subject vehicle is traveling in a lane change prohibition area," a condition that "an obstacle exists in the direction of changing lanes," a condition that "the subject vehicle will get across a centerline (road center line)," and a condition that "the subject vehicle will enter a road shoulder or get across a road end." On a road on which emergency stop is permitted at a road shoulder or the like in an "emergency evacuation scene," the condition that "the subject vehicle will enter a road shoulder or get across a road end" may be permitted in the "emergency evacuation scene." In the table illustrated in FIG. 2, the necessity level of changing lanes, the time limit, and the direction of changing lanes will be described later.

When the travel scene of the subject vehicle corresponds to a plurality of travel scenes, the control device 19 uses the travel scene determination function to determine a travel scene having a higher necessity level of changing lanes as the travel scene of the subject vehicle. For example, it is assumed that, in the table illustrated in FIG. 2, the travel scene of the subject vehicle corresponds to a "scene of catching up with a preceding vehicle" and a "scene of lane transfer toward a destination" and the necessity level X1 of changing lanes in the "scene of catching up with a preceding vehicle" is lower than the necessity level X8 of changing lanes in the "scene of lane transfer toward a destination" (X1<X8). In this case, the control device 19 uses the travel scene determination function to determine the "scene of lane transfer toward a destination" with the higher necessity level of changing lanes as the travel scene of the subject vehicle. The "scene of lane transfer toward a destination" refers to a scene of changing lanes for transfer from a lane in which the subject vehicle is currently traveling, such as at a location before a branching point or an exit of a road with multiple lanes, to a lane in the intended branch direction or exit direction.

The travel control function of the control device 19 is a function of controlling travel of the subject vehicle. For example, the control device 19 uses the travel control function to detect lane marks of the subject vehicle lane in which the subject vehicle travels, on the basis of the detection results of the sensors 11 and perform the lane keeping control of controlling the traveling position of the subject vehicle in the road width direction so that the subject vehicle travels in the subject vehicle lane. In this case, the control device 19 uses the travel control function to allow the drive control device 18 to control the operation of the steering actuator and the like so that the subject vehicle travels at an appropriate traveling position. Additionally or alternatively, the control device 19 can also use the travel control function to perform the follow-up travel control of autonomously following a preceding vehicle with a certain distance from the preceding vehicle. When performing the follow-up travel control, the control device 19 uses the travel control function to output control signals to the drive control device 18, which controls the operation of the drive mechanism such as the engine and brake so that the subject vehicle travels with a constant distance between the subject vehicle and the preceding vehicle. In the following description, the autonomous travel control will be described as including the lane keeping control, the follow-up travel control, the right or left turn travel control, and the autonomous lane change control.

The autonomous lane change control function of the control device 19 is a function of determining whether or not to perform changing lanes, on the basis of the travel scene of the subject vehicle and/or information on obstacles existing around the subject vehicle. Additionally or alternatively, the autonomous lane change control function is a function of allowing the drive control device 18 to control the operation of the drive mechanism such as the engine and brake and the operation of the steering actuator when determining to perform changing lanes. Additionally or alternatively, the autonomous lane change control function is a function of setting the start timing of starting the autonomous lane change control on the basis of the traveling state of the subject vehicle and the state of the driver and performing the autonomous lane change control in accordance with the set start timing.

The autonomous lane change control function includes a function that consecutively performs two or more times of lane changes in the same direction of lane change from the subject vehicle lane, and a function that controls the lateral speed of the vehicle when consecutively performing the two or more times of lane changes. When consecutively performing the two or more the lane changes in the same direction of lane change, the surrounding situations are confirmed with the sensors 11 and the like prior to start of each lane change. However, the surrounding situations may change over time until the second and subsequent lane changes are started. In the present embodiment, the lateral speed is controlled so that the lateral speed of the second and subsequent autonomous lane change control is slower than the lateral speed of the first autonomous lane change control in order to be able to consecutively perform the two or more times of lane changes in the same direction of lane change even when the surrounding situations change. The lateral speed of the vehicle is moving speed with respect to an axis perpendicular to an axis along a traveling direction of the vehicle. In other words, when the vehicle travels on a traveling lane, the moving speed in the width direction of the traveling lane is the lateral speed of the vehicle.

Hereinafter, the lateral speed control according to the first embodiment of the present invention will be described. FIG. 3A is a diagram illustrating the lateral speed control when performing consecutive lane changes according to the embodiment of the present invention. FIG. 3A shows the plan view illustrating the travel scene when the subject vehicle $V_0$ changes lanes, and the graph illustrating the lateral position and the lateral speed of the subject vehicle $V_0$ when changing lanes. The plan view of FIG. 3A is a plan view illustrating an example of the autonomous lane change control in which the lane change is performed consecutively from the lane L1 to the next adjacent lane L3 via the adjacent lane L2 while the subject vehicle $V_0$ travels due to the presence of a branch point of the road ahead on the left-hand traffic road having three lanes L1, L2, L3 on one side.

Although the representation is omitted, while the subject vehicle $V_0$ travels in the rightmost lane L3, an exit of a vehicle exclusive way exists on the front left side. When a traveling direction is changed to the exit, the lane change needs to be consecutively performed from the current lane L3 to the leftmost lane L1 via the lane L2, and the same control is performed in such a case.

The control device 19 accelerates the lateral speed Vh (m/s) of the subject vehicle $V_0$ to a predetermined first lateral speed Vh1 in the subject vehicle lane L1 by the autonomous lane change control function, as shown in the graph of FIG. 3A. Then, the control device 19 performs the lane change from the subject vehicle lane L1 to the adjacent lane L2 while maintaining the first lateral speed Vh1. The control device 19 then decelerates the lateral speed Vh of the subject vehicle $V_0$ to a predetermined second lateral speed Vh2 in the adjacent lane L2 by the autonomous lane change control function. Then, the control device 19 performs the lane change from the adjacent lane L2 to the next adjacent lane L3 while maintaining the second lateral speed Vh2. The relationship between the first lateral speed Vh1 and the second lateral speed Vh2 is Vh1>Vh2.

Figure 4A:
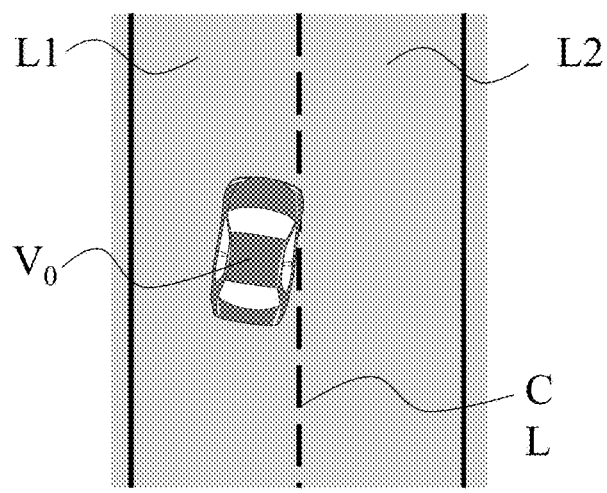
FIGS. 4A and 4B are plan views illustrating lateral speed according to the embodiment of the present invention.
Figure 4B:
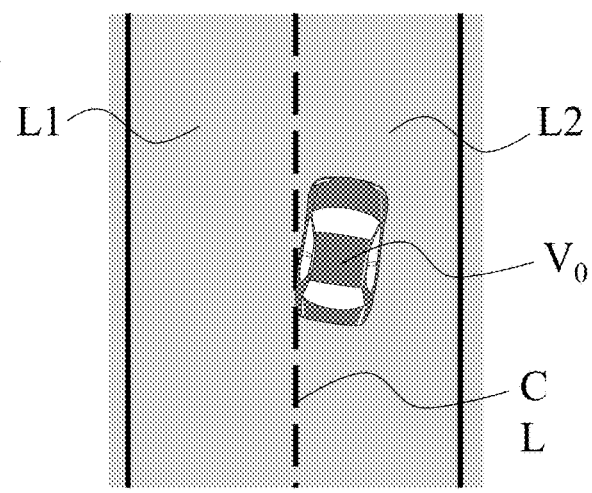

Note that, the lateral speed when the subject vehicle $V_0$ changes lanes is lateral speed when the subject vehicle $V_0$ crosses the lane mark CL provided between the lanes (hereinafter also referred to as an object lane mark). Further, when the subject vehicle $V_0$ crosses the object lane mark CL means, for example, a period from the right front wheel of the subject vehicle $V_0$ pressing the object lane mark CL to the rear left wheel going beyond the object lane mark CL, when the lane change is performed from the lane L1 on the left side to the lane L2 on the right side as shown in FIGS. 4A and 4B.

According to the lateral speed control by the autonomous lane change control function of the present embodiment, the second lateral speed Vh2 when the subject vehicle $V_0$ performs the second lane change control between the adjacent lane L2 and the next adjacent lane L3 is set slower than the first lateral speed Vh1 when the subject vehicle $V_0$ performs the first autonomous lane change control between the subject vehicle lane L1 and the adjacent lane L2. As a result, the second autonomous lane change control is performed at lower speed than the first autonomous lane change control. Therefore, the surrounding situations can be properly confirmed since the time used for confirming the surrounding situations with the sensors 11 and the like becomes longer prior to starting the second and subsequent autonomous lane change control. Further, by performing the second autonomous lane change control at speed lower than that of the first autonomous lane change control, time that a following vehicle uses to confirm the lane change of the subject vehicle $V_0$ is lengthened. This allows a driver of the following vehicle to easily recognize the lane change of the subject vehicle $V_0$. Accordingly, safety of the autonomous lane change control is further enhanced.

Note that, the control device 19 performs the same the lateral speed control by the autonomous lane change control function when performing two or more times of the consecutive autonomous lane change control on a road having three or more lanes on the one side. For example, when performing three times of the consecutive autonomous lane change control in a left-hand traffic road having four lanes on the one side, in the same manner as the above, the lateral speed of the first autonomous lane change control is set to the first lateral speed Vh1, and the lateral speed of the second and third autonomous lane change control is set to the second lateral speed Vh2 that is slower than the first lateral speed Vh1. That is, when a lane change after the first lane change is referred to as a (n+1)th lane change (n is a natural number), lateral speed of the (n+1)th autonomous lane change control and lateral speed of the (n+2)th autonomous lane change control are set to the same value. As a result, even in the second and subsequent lane changes, the surrounding situations can be properly confirmed, and the lane change of the subject vehicle $V_0$ can be clearly recognize by the following vehicle.

Figure 3B:
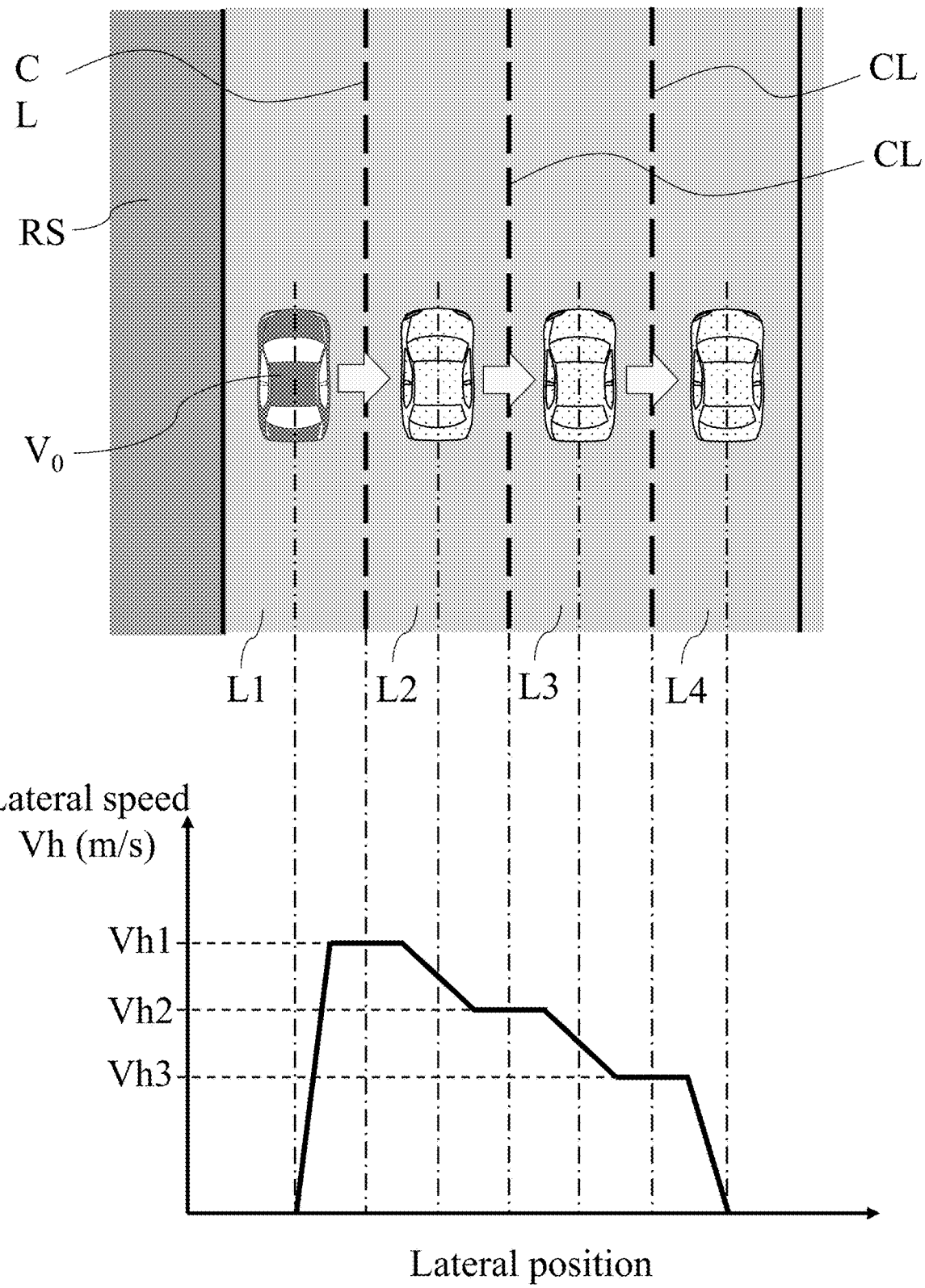
FIG. 3B is a diagram comprising a plan view illustrating a lane change scene on a road having four lanes according to the embodiment of the present invention and a graph illustrating lateral speed control according to the first embodiment of the travel control apparatus for a vehicle according to the present invention.

In addition, unlike the above, the lateral speed of the (n+2)th autonomous lane change control may be set slower than the lateral speed of the (n+1)th autonomous lane change control. Specifically, as shown in FIG. 3B, when performing three times of the consecutive autonomous lane change control from the leftmost lane L1 to the rightmost lane L4 in the left-hand traffic road having four lanes L1 to L4 on the one side, the lateral speed of the first autonomous lane change control from the lane L1 to the lane L2 is set to the first lateral speed Vh1. Next, the lateral speed of the second autonomous lane change control from the lane L2 to the lane L3 is set to the second lateral speed Vh2 that is slower than the first lateral speed Vh1. The lateral speed of the third autonomous lane change control from the lane L3 to the lane L4 is set to the third lateral speed Vh3 that is slower than the second lateral speed Vh2. Accordingly, since the lateral speed of the autonomous lane change control becomes slower as the number of the lane changes increases, the surrounding situations can be properly confirmed even in the second and subsequent lane changes, and the lane change of the subject vehicle $V_0$ can be clearly recognized by the following vehicle.

Figure 3C:
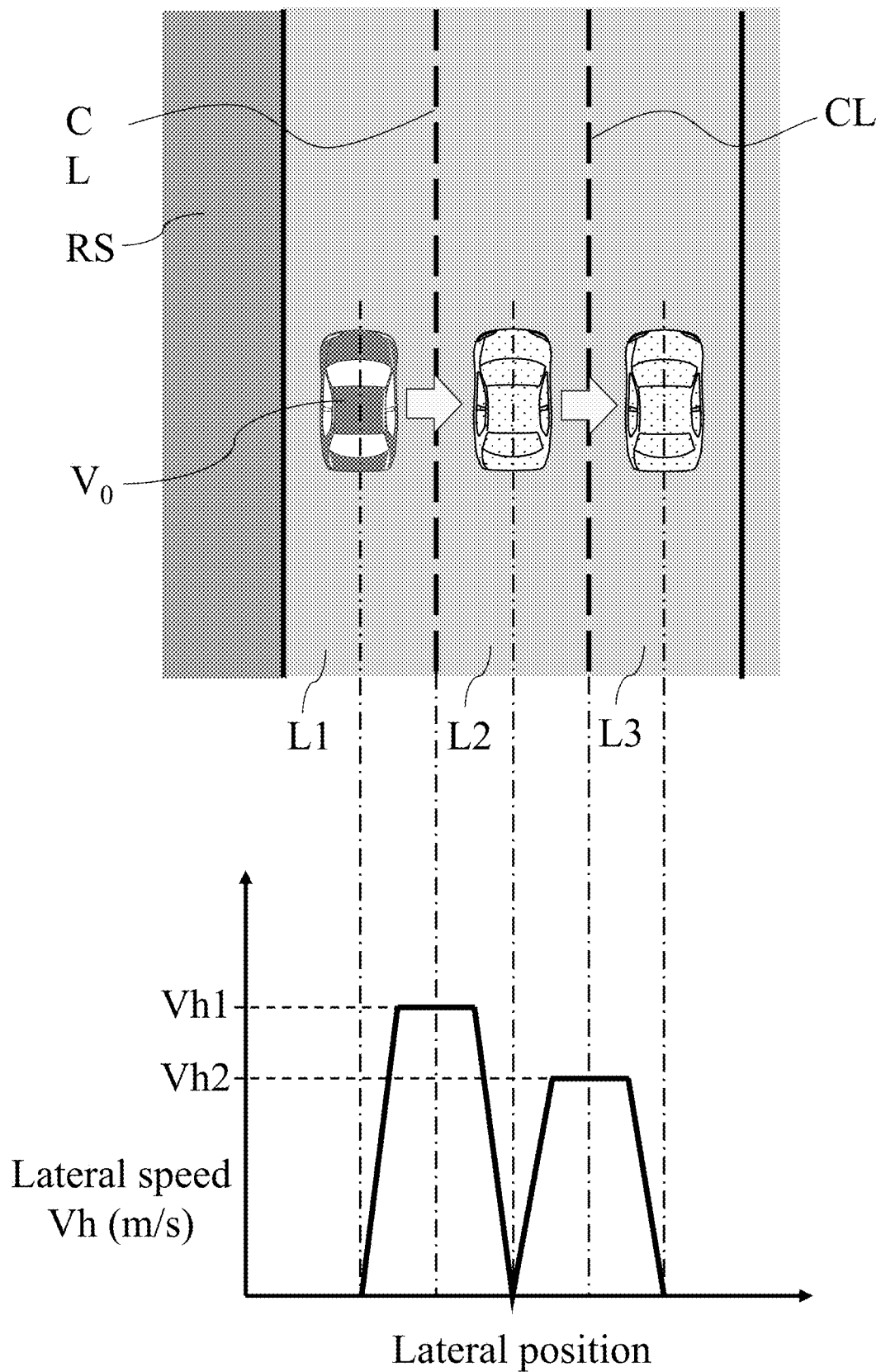
FIG. 3C is a diagram comprising a plan view illustrating a lane change scene according to the embodiment of the present invention and a graph illustrating lateral speed control in which lateral speed becomes temporarily null prior to a second the lane change in the first embodiment of the travel control apparatus for a vehicle according to the present invention.

In the lateral speed control shown in FIG. 3A, the lateral speed Vh of the subject vehicle $V_0$ is decelerated from the first lateral speed Vh1 to the second lateral speed Vh2 in the lane L2. However, as shown in FIG. 3C, the lane keeping control may be performed with the first lateral speed Vh1 temporarily becoming null in the lane L2, and the second autonomous lane change control may be performed with accelerating the lateral speed to the second lateral speed Vh2 in the lane L2. Even when the lateral speed is controlled in this manner, the surrounding situations can be properly confirmed by the second and subsequent lane changes, and the lane change of the subject vehicle $V_0$ can be clearly recognized by the following vehicle.

In the lateral speed control according to the first embodiment described above, predetermined second lateral speed Vh2, predetermined third lateral speed Vh3, and the like are used for the lateral speed of the second and subsequent autonomous lane change control. However, the lateral speed of the second and subsequent autonomous lane change control may be set according to travel information. In the following, the second to fifth embodiments for setting the second and subsequent lateral speed on a basis of the travel information acquired by the travel information acquisition function of the control device 19 will be described.

Figure 3D:
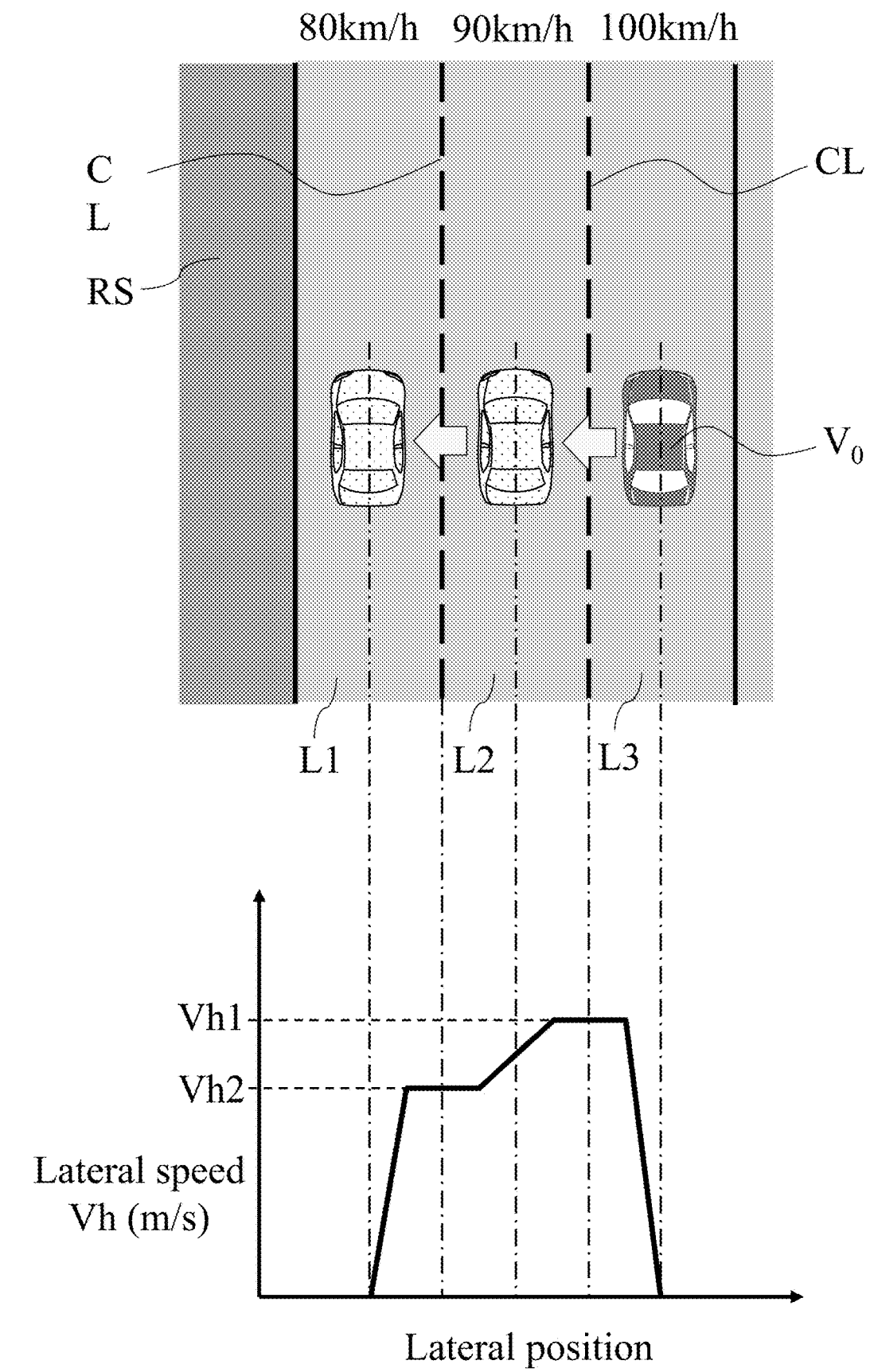
FIG. 3D is a diagram (part 1) comprising a plan view of a lane change scene according to the embodiment of the present invention and a graph illustrating lateral speed control according to a second embodiment of the travel control apparatus of a vehicle according to the present invention.
Figure 3E:
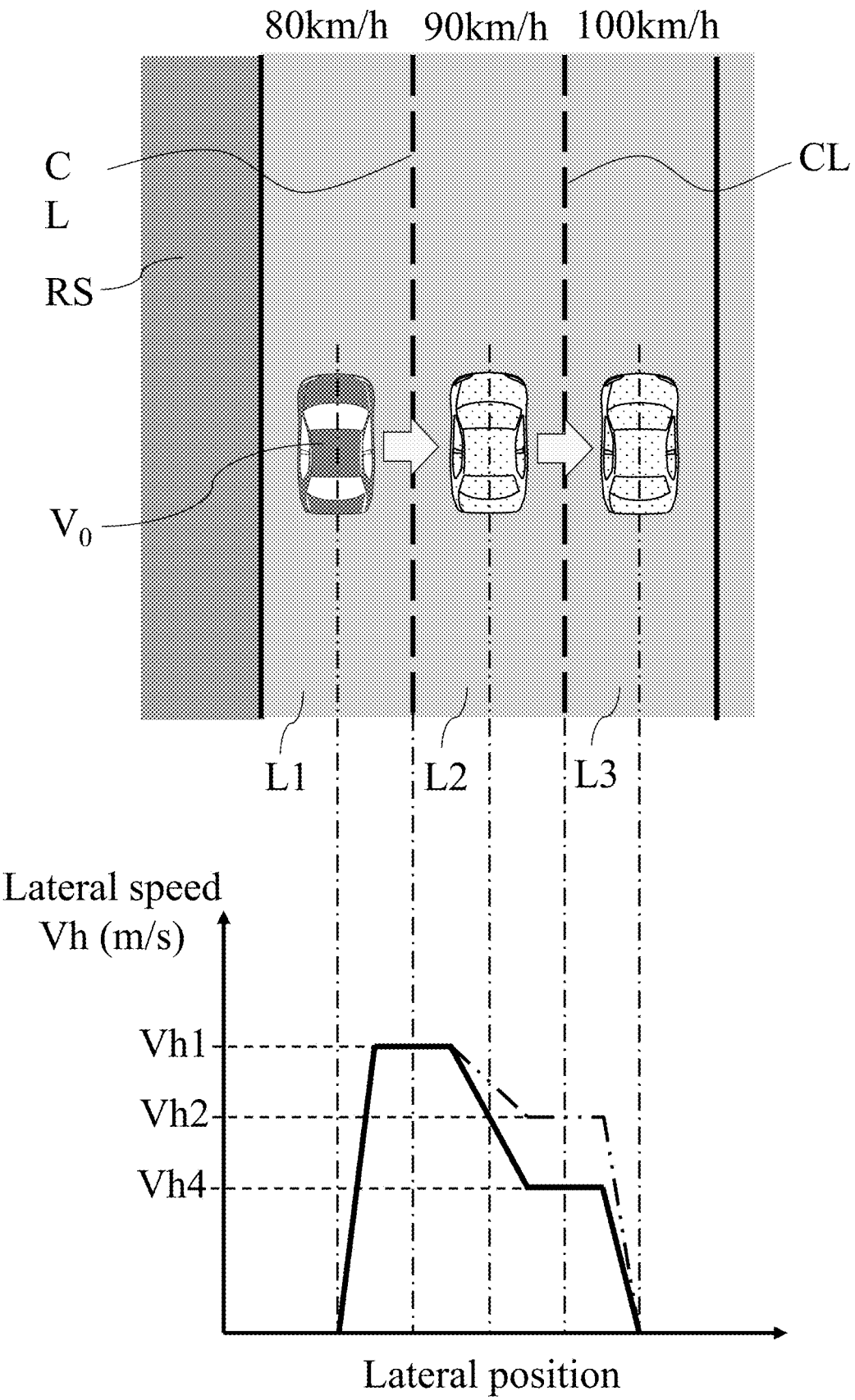
FIG. 3E is a diagram (part 2) comprising a plan view of the lane change scene according to the embodiment of the present invention and a graph illustrating lateral the speed control according to the second embodiment of the travel control apparatus of a vehicle according to the present invention.

FIG. 3D and FIG. 3E illustrate the lateral speed control according to the second embodiment of the present invention. In this embodiment, the control device 19 sets the lateral speed of the second and subsequent autonomous lane change control according to the direction of the lane change by the autonomous lane change control function. In other words, when performing the lane changes from a lane with slow average traveling speed to a lane with fast average traveling speed, relative speed of the following vehicle with respect to the subject vehicle $V_0$ becomes faster, and the inter-vehicle distance between the subject vehicle $V_0$ and the following vehicle becomes shorter. Thus, time for confirming the surrounding situations for the second and subsequent lane changes is shortened for the subject vehicle $V_0$. To solve this problem, the present embodiment sets the lateral speed so that the second and subsequent autonomous lane change control is performed at lower speed when changing lanes from the lane of which the average traveling speed is slow to the lane of which the average traveling speed is fast.

The control device 19 determines whether or not the average traveling speed of the subject vehicle lane in which the subject vehicle $V_0$ travels is faster than the average traveling speed of the lane to which the subject vehicle changes lanes, on a basis of the travel information acquired with the autonomous lane change control function. The average traveling speed of the subject vehicle lane may be the traveling speed of the subject vehicle $V_0$. Alternatively, the average traveling speed of the subject vehicle lane may be detected on a basis of image information of the outside of the vehicle captured by the rear camera of the subject vehicle $V_0$ or a detection result of the rear radar. The average traveling speed of the lane to which the subject vehicle changes lanes may be detected on the basis of the image information of the outside of the vehicle image captured by the rear camera of the subject vehicle $V_0$ or the detection result of the rear radar.

In addition, as the travel information, information on a lane position of the subject vehicle lane and information on a lane position of the lane to which the subject vehicle changes lanes may be obtained from the map information to determine whether or not the average traveling speed of the subject vehicle lane is faster than the average traveling speed of the lane to which the subject vehicle changes lanes, on the basis of the information on the acquired lane position. For example, on a road having two or more lanes on the one side, average the traveling speed may differ depending on the lane position. With respect to the roads in Japan, the average traveling speed of the rightmost passing lane is faster than that of the leftmost traveling lane. Therefore, referring to the information on the lane position, it is possible to determine whether or not the average traveling speed of the subject vehicle lane is faster than the average traveling speed of the lane to which the subject vehicle changes lanes. Since the lane position of the traveling lane and the passing lane differs depending on the country or region, right-hand traffic or left-hand traffic, traffic rules, and the like, it is desirable to determine according to the road on which the vehicle travels.

Then, when the average traveling speed of the lane to which the subject vehicle changes lanes is faster than the average traveling speed of the subject vehicle lane, the control device 19 sets the lateral speed by the autonomous lane change control function to be set for the second and subsequent autonomous lane change control slower than the lateral speed when the average traveling speed of the lane to which the subject vehicle changes lanes is slower than the average traveling speed of the subject vehicle lane. That is, the control device 19 performs the second and subsequent autonomous lane change control at lower speed by the autonomous lane change control function, when performing the lane changes from a lane of which the average traveling speed is slow to a lane of which the average traveling speed is fast.

The travel scene shown in the plan view of FIG. 3D illustrates two consecutive autonomous lane change control from the passing lane L3 at the right end to the traveling lane L1 at the left end. For example, when the average traveling speed of the lanes L1, L2, L3 determined from the travel information is 80 km/h, 90 km/h, and 100 km/h, respectively, the average traveling speed of the subject vehicle lane L3 on which the subject vehicle $V_0$ travels is determined to be faster than the average traveling speed of the lane L1 to which the subject vehicle changes lanes. Note that, the determination result becomes the same even when it is determined on a basis of the lane position of the lane L1 and the lane L3. Such a travel scene falls within the lane change from the lane of which the average traveling speed is fast to the lane of which the average traveling speed is slow. Therefore, the relative speed of the following vehicle with respect to the subject vehicle $V_0$ does not increase by the lane change. The control device 19 sets the predetermined first lateral speed Vh1 to perform the first autonomous lane change control and sets the predetermined second lateral speed Vh2 to perform the second autonomous lane change control by the autonomous lane change control function, as shown in the graph of FIG. 3D.

On the other hand, the travel scene shown in the plan view of FIG. 3E illustrates two consecutive autonomous lane change control from the traveling lane L1 at the left end to the passing lane L3 at the right end. For example, when the average traveling speed of the lanes L1, L2, L3 determined from the travel information is respectively 80 km/h, 90 km/h, and 100 km/h in the same manner as FIG. 3D, the average traveling speed of the subject vehicle lane L1 on which the subject vehicle $V_0$ travels is determined to be slower than the average traveling speed of the lane L3 to which the subject vehicle changes lanes. Note that, the determination result becomes the same even when it is determined on the basis of the lane position of the lane L1 and the lane L3. Such a travel scene falls within the lane change from the lane of which the average traveling speed is slow to the lane of which the average traveling speed is fast. For this reason, the control device 19 sets the predetermined first lateral speed Vh1 to perform the first autonomous lane change control and sets the fourth lateral speed Vh4 that is slower than the second lateral speed Vh2 to perform the second autonomous lane change control by the autonomous lane change control function, as shown in the graph of FIG. 3E.

Note that, the relationship of the first lateral speed Vh1, the second lateral speed Vh2, and the fourth lateral speed Vh4 is Vh1>Vh2>Vh4. Further, the fourth lateral speed Vh4 is calculated by using the following equation (a) with the autonomous lane change control function of the control device 19. C1 in the following equation (a) is a coefficient used to calculate the fourth lateral speed Vh4. Numerical values equal to or less than 1 are used for the coefficient. Further, the coefficient C1 may be smaller as a speed difference between the subject vehicle lane and the lane to which the subject vehicle changes lanes becomes large.

$$Vh4 = Vh2 \times C1 \qquad (a)$$

Thus, in the second and subsequent lane changes, when moving from the lane of which the average traveling speed is slow to the lane of which the average traveling speed is fast, the lateral speed of the second and subsequent autonomous lane change control is set slower. This allows the second and subsequent autonomous lane change control to be performed at lower speed, and the time used for confirming the surrounding situations with the sensors 11 and the like prior to starting the second and subsequent autonomous lane change control is lengthened. Therefore, it is possible to properly confirm the surrounding situations. Further, since time to be used for confirming the lane change of the subject vehicle $V_0$ is lengthened, the following vehicle can easily recognize the lane change. Accordingly, the safety of the autonomous lane change control is further enhanced. In addition, the larger the speed difference between the subject vehicle lane and the lane to which the subject vehicle changes lanes is, the smaller the coefficient C1 becomes. This allows the second and subsequent autonomous lane change control to be performed at lower speed as the speed difference becomes small. As a result, the surrounding situations are properly confirmed, and the following vehicle can clearly recognize the lane change of the subject vehicle $V_0$.

FIG. 3F illustrates the lateral speed control according to the third embodiment of the present invention. In this embodiment, the control device 19 sets the lateral speed of the second and subsequent autonomous lane change control according to the traffic congestion level K by the autonomous lane change control function. That is, when the traffic congestion level K around the subject vehicle $V_0$ is higher, a distance between the subject vehicle $V_0$ and the other vehicle around the subject vehicle $V_0$ becomes small. Thus, the time that the subject vehicle $V_0$ can use for confirming the surrounding situations for the second and subsequent lane changes is shortened. To solve this problem, the present embodiment sets the lateral speed so that the second and subsequent autonomous lane change control is performed at lower speed when the traffic congestion level K is high.

The control device 19 determines the traffic congestion level K on the basis of the travel information acquired by using the autonomous lane change control function. The traffic congestion level K is obtained on a basis of, for example, the inter-vehicle distance between the subject vehicle $V_0$ and the preceding vehicle $V_2$, the inter-vehicle distance between the subject vehicle $V_0$ and the following vehicle $V_3$, the number of surrounding vehicles, the congestion level included in VICS (registered trademark) information, the degree of deviation between the legal speed and the actual vehicle speed of the subject vehicle $V_0$, and the like. The traffic congestion level K is determined to be higher as the inter-vehicle distance between the subject vehicle $V_0$ and the preceding vehicle $V_2$ is shorter, the inter-vehicle distance between the subject vehicle $V_0$ and the following vehicle $V_3$ is shorter, the number of the surrounding vehicles is larger, the congestion level included in the VICS information is higher, or the degree of deviation between the legal speed and the actual vehicle speed of the subject vehicle is larger.

When the traffic congestion level K is lower than the predetermined value Kth, the control device 19 sets the predetermined first lateral speed Vhf to perform the first autonomous lane change control and sets the second lateral speed Vh2 to perform the second autonomous lane change control by the autonomous lane change control function, as shown in the graph of FIG. 3F. When the traffic congestion level K is higher than the predetermined value Kth, the control device 19 sets the predetermined first lateral speed Vhf to perform the first autonomous lane change control and sets the fifth lateral speed Vh5 slower than the second lateral speed Vh2 to perform the second autonomous lane change control by the autonomous lane change control function.

Note that, the relationship of the first lateral speed Vh1, the second lateral speed Vh2, and the fifth lateral speed Vh5 is Vh1>Vh2>Vh5. Further, the fifth lateral speed Vh5 is calculated by using the following equation (b) with the autonomous lane change control function of the control device 19. C2 in the following equation (b) is a coefficient used to calculate the fifth lateral speed Vh5. Numerical values equal to or less than 1 are used for the coefficient. The coefficient C2 may be smaller as the traffic congestion level K is higher.

$$Vh5 = Vh2 \times C2 \tag{b}$$

When performing the two or more consecutive autonomous lane change control at a situation in which the traffic congestion level K is high, the lateral speed of the second and subsequent autonomous lane change control is set slower. As a result, the second and subsequent autonomous lane change control is performed at lower speed, and the time used for confirming the surrounding situations prior to starting the second and subsequent lane changes is lengthened. Therefore, it is possible to properly confirm the surrounding situations. Further, since time to be used for confirming the lane change of the subject vehicle $V_0$ is lengthened, the following vehicle can easily recognize the lane change. Accordingly, the safety of the autonomous lane change control is further enhanced. Further, by setting the coefficient C2 smaller as the traffic congestion level K is higher, the second and subsequent autonomous lane change control is performed at lower speed as the traffic congestion level K is higher. As a result, the surrounding situations are properly confirmed, and the following vehicle can clearly recognize the lane change of the subject vehicle $V_0$.

Figure 3G:
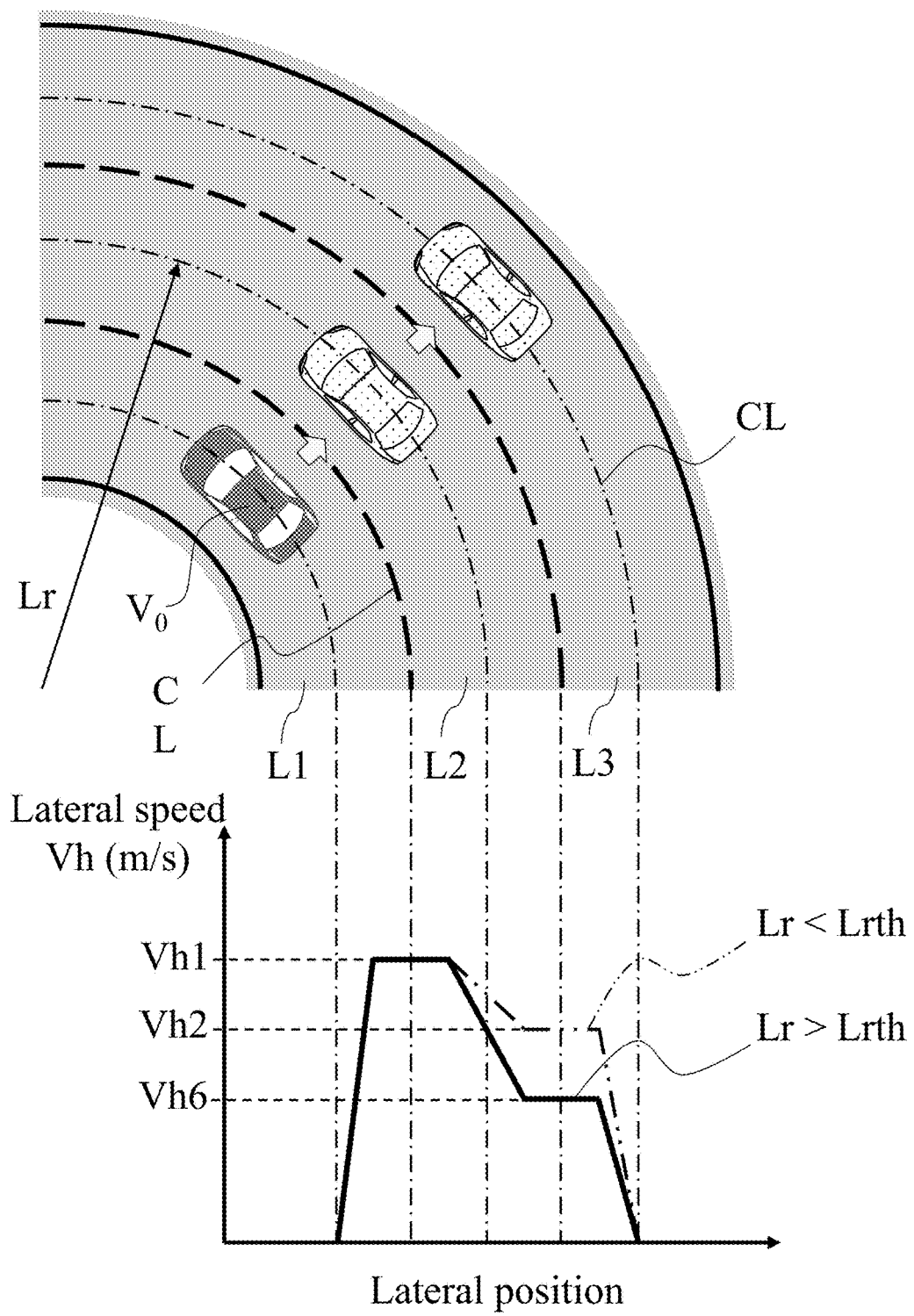
FIG. 3G is a diagram comprising a plan view of a lane change scene according to the embodiment of the present invention and a graph illustrating lateral speed control according to a fourth embodiment of the travel control apparatus for a vehicle according to the present invention.

FIG. 3G illustrates the lateral speed control according to the fourth embodiment of the present invention. In this embodiment, the control device 19 sets the lateral speed of the second and subsequent autonomous lane change control according to the radius Lr of the track on which the subject vehicle $V_0$ travels by the autonomous lane change control function. That is, when the radius Lr of the track is small, the driver cannot see far ahead, and therefore it becomes difficult for the subject vehicle $V_0$ to confirm the surrounding situations with the sensors 11 and the like for the second lane change. To solve this problem, the present embodiment sets the lateral speed so that the second and subsequent autonomous lane change control is performed at lower speed when the radius Lr of the track is small.

The control device 19 determines the radius Lr of the track from the map information that is the travel information by using the autonomous lane change control function. Note that, the lane of which the radius Lr is determined may be the subject vehicle lane or may be the lane to which the subject vehicle changes lanes. When the radius Lr of the track is larger than the predetermined value Lrth, the control device 19 sets the predetermined first lateral speed Vh1 to perform the first autonomous lane change control and sets the second lateral speed Vh2 to perform the second autonomous lane change control by the autonomous lane change control function, as shown in the graph of FIG. 3G. When the radius Lr of the track is smaller than the predetermined value Lrth, the control device 19 sets the predetermined first lateral speed Vh1 to perform the first autonomous lane change control and sets the sixth lateral speed Vh6 slower than the second lateral speed Vh2 to perform the second autonomous lane change control by the autonomous lane change control function.

Note that, the relationship of the first lateral speed Vh1, the second lateral speed Vh2, and the sixth lateral speed Vh6 is Vh1>Vh2>Vh6. Further, the sixth lateral speed Vh6 is calculated by using the following equation (c) with the autonomous lane change control function of the control device 19. C3 in the following equation (c) is a coefficient used to calculate the sixth lateral speed Vh6. Numerical values equal to or less than 1 are used for the coefficient. Further, the smaller the radius Lr of the track is, the smaller the coefficient C3 may be.

$$Vh6 = Vh2 \times C3 \tag{c}$$

Thus, when performing the two or more consecutive lane changes in the traffic situation in which the radius Lr of the track is smaller, the lateral speed of the second and subsequent autonomous lane change control is set slower. As a result, the second and subsequent autonomous lane change control is performed at lower speed, and the time used for confirming the surrounding situations prior to starting the second the lane change is lengthened. Therefore, it is possible to properly confirm the surrounding situations. Further, since time to be used for confirming the lane change of the subject vehicle $V_0$ is lengthened, the following vehicle can easily recognize the lane change. Accordingly, the safety of the autonomous lane change control is further enhanced. Further, the smaller the radius Lr of the track is, the smaller the coefficient C3 is set. As a result, as the radius Lr of the track is smaller, the second and subsequent autonomous lane change control is performed at lower speed. As a result, the surrounding situations are properly confirmed, and the following vehicle can clearly recognize the lane change of the subject vehicle $V_0$.

Figure 3H:
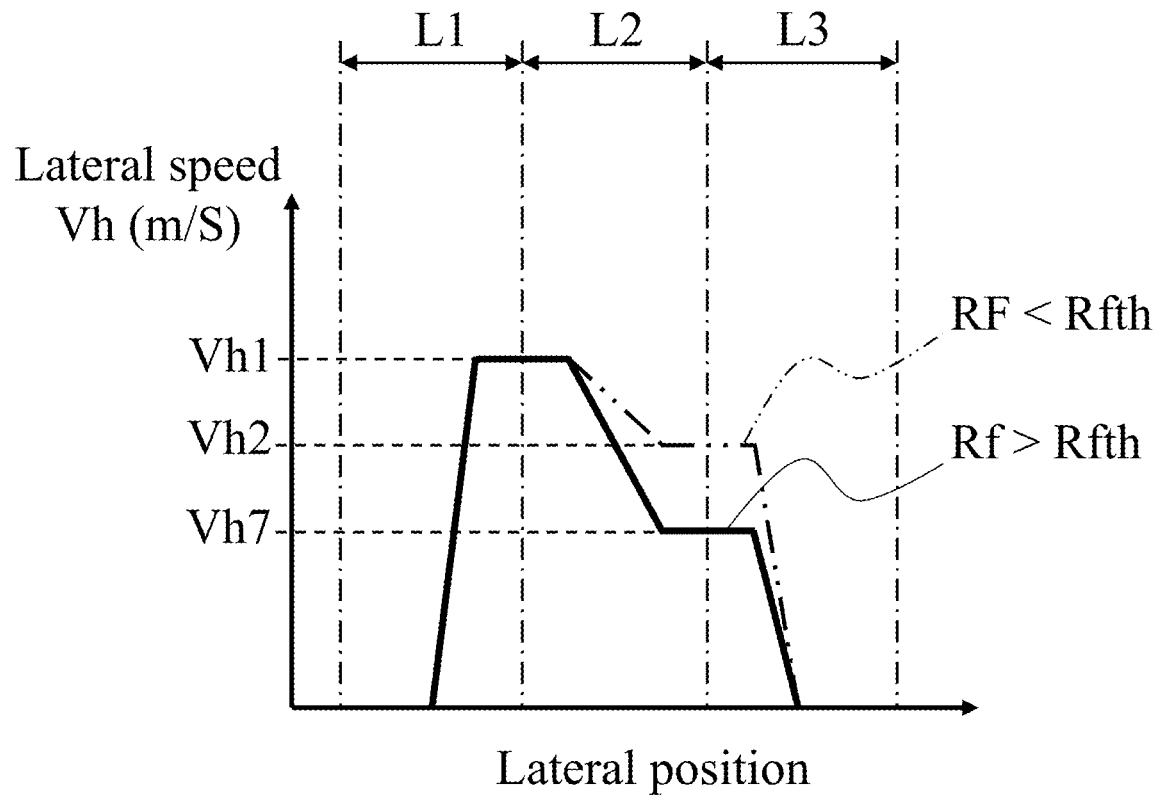
FIG. 3H is a graph illustrating lateral speed control according to a fifth embodiment of the travel control apparatus for a vehicle according to the present invention.

FIG. 3H is a graph illustrating the lateral speed control according to the fifth embodiment of the present invention. In this embodiment, the control device 19 sets the lateral speed of the second and subsequent autonomous lane change control according to the rainfall Rf by the autonomous lane change control function. That is, when the rainfall Rf is large, the surrounding situations are difficult to be confirmed for performing the second lane change with the sensors 11 and the like of the subject vehicle $V_0$. To solve this problem, the present embodiment sets the lateral speed so that the second and subsequent autonomous lane change control is performed at lower speed when the rainfall Rf is large.

The control device 19 determines the rainfall Rf from the intermittent time of the wiper, which is the travel information, by using the autonomous lane change control function. When the subject vehicle $V_0$ has a raindrop sensor, the travel information "rainfall" may be acquired from the detection result of the raindrop sensor, or the detection result of the raindrop sensor and the intermittent time of the wiper may be combined to determine "rainfall". When the rainfall Rf is larger than the predetermined value Rfth, the control device 19 sets the predetermined first lateral speed Vhf to perform the first autonomous lane change control and sets the second lateral speed Vh2 to perform the second autonomous lane change control by the autonomous lane change control function, as shown in the graph of FIG. 3H. When the rainfall Rf is smaller than the predetermined value Rfth, the control device 19 sets the predetermined first lateral speed Vh1 to perform the first autonomous lane change control and sets the seventh lateral speed Vh7 slower than the second lateral speed Vh2 to perform the second autonomous lane change control by the autonomous lane change control function.

Note that, the relationship of the first lateral speed Vh1, the second lateral speed Vh2, and the seventh lateral speed Vh7 is Vh1>Vh2>Vh7. Further, the seventh lateral speed Vh7 is calculated by using the following equation (d) with the autonomous lane change control function of the control device 19. C4 in the following equation (d) is a coefficient used to calculate the seventh lateral speed Vh7. Numerical values equal to or less than 1 are used for the coefficient. Further, the larger the rainfall Rf is, the smaller the coefficient C4 may be set.

$$Vh7 = Vh2 \times C4 \tag{d}$$

Thus, when performing the two or more consecutive lane changes in the traffic situation in which the rainfall Rf is larger, the lateral speed of the second and subsequent autonomous lane change control is set slower. As a result, the second and subsequent autonomous lane change control is performed at lower speed, and the time used for confirming the surrounding situations prior to starting the second the lane change is lengthened. Therefore, it is possible to properly confirm the surrounding situations. Further, since time to be used for confirming the lane change of the subject vehicle $V_0$ is lengthened, the following vehicle can easily recognize the lane change. Accordingly, the safety of the autonomous lane change control is further enhanced. Further, by setting the coefficient C4 smaller as the rainfall Rf increases, the second and subsequent autonomous lane change control is performed at lower speed as the rainfall Rf increases. As a result, the surrounding situations are properly confirmed, and the following vehicle can clearly recognize the lane change of the subject vehicle $V_0$.

Note that, the second to fifth embodiments may be used alone or in combination as appropriate respectively. When the second to fifth embodiments are combined to be used, for example, as shown in Equation (e) below, the lateral speed of the second and subsequent autonomous lane change control can be determined by multiplying the second lateral speed Vh2 by the coefficients C1 to C4. Note that, when the traveling condition of the subject vehicle $V_0$ falls within more than one of the conditions stipulated in the travel information of the second to fifth embodiments, the lateral speed of the second and subsequent autonomous lane change control determined from the second lateral speed Vh2 becomes extremely slow and the lane change takes too much time. Therefore, the lower limit value for the lateral speed of the second and subsequent autonomous lane change control may be set in advance, and when the calculated lateral speed is lower than the lower limit value, the lower limit value may be set as the lateral speed of the second and subsequent autonomous lane change control.

In addition, in the lateral speed control according to the second to fifth embodiments, when the autonomous lane change control is performed two or more times consecutively on a road having three or more lanes on the one side, in the same manner as in the lateral speed control according to the first embodiment, the lateral speed of the (n+1)th autonomous lane change control and the lateral speed of the (n+2)th lane change control may be the same, or the lateral speed of the (n+2)th autonomous lane change control may be set to be slower than the lateral speed of the (n+1)th autonomous lane change control. When setting the lateral speed of the (n+2)th autonomous lane change control slower than the lateral speed of the (n+1)th autonomous lane change control, it is preferable to determine the lateral speed of the next autonomous lane change control by multiplying the lateral speed of the autonomous lane change control performed immediately before by the coefficient. For example, referring to the second embodiment as shown in FIG. 3E, the lateral speed for the third autonomous lane change control is determined by multiplying the fourth lateral speed determined for the second autonomous lane change control by the coefficient C1.

In addition, in the lateral speed control according to the second to fifth embodiments, in the same manner as the lateral speed control according to the first embodiment, the lane keeping control may be performed by setting the first lateral speed Vh1 temporarily null in the lane L2, and the second autonomous lane change control may be performed with accelerating to the second lateral speed Vh2 in the lane L2, as shown in FIG. 3C.

Next, the lane change information presentation function of the control device 19 will be described. The lane change information presentation function of the control device 19 is a function of presenting the driver, via the presentation device 15, with lane change information regarding the travel operation of the subject vehicle performed by the lane change control. For example, when a branching point of a road or an exit of an expressway exists ahead during execution of the lane keeping control, changing lanes may be necessary by changing the traveling direction of the subject vehicle. Additionally or alternatively, when a preceding vehicle changes lanes during execution of the follow-up control of following the preceding vehicle, the subject vehicle may also change lanes accordingly. When performing such autonomous lane change control, the control device 19 uses the lane change information presentation function to present the driver with the lane change information in order to encourage the driver to confirm safety by himself/herself. The timing of presenting the lane change information may be at least before the start of the autonomous lane change control because the presentation of the lane change information is for the purpose of safety confirmation by the driver himself/herself, but the lane change information may also be presented during execution of the autonomous lane change control and/or at the time of completion of the autonomous lane change control.

When the presentation device 15 includes a display, the form of presentation on the presentation device 15 using the lane change information presentation function may be a form of display of a visual pattern including an image, a language, etc. Additionally or alternatively, when the presentation device 15 includes a speaker, the autonomous lane change control may be performed to present the driver with the lane change information including the direction of movement of the subject vehicle in the road width direction (e.g., guidance information indicating the autonomous lane change in the right or left direction) as audio information (voice or sound). Additionally or alternatively, when the presentation device 15 includes one or more warning lamps installed on the instrument panel or the like, a specific warning lamp may be lit in a specific presentation form thereby to perform the autonomous lane change control to present the driver with the lane change information including the direction of movement of the subject vehicle in the road width direction. Additionally or alternatively, when the presentation device 15 includes a seat device with a plurality of embedded vibrating bodies, a specific vibrating body may be vibrated in a specific presentation form thereby to perform the autonomous lane change control to present the driver with the lane change information including the direction of movement of the subject vehicle in the road width direction.

Thus, instead of or in addition to displaying the lane change information on the display as visual information, presenting the driver with the lane change information as audio information such as voice and sound, as visual information via the display of a warning lamp, or as tactile information via the vibration allows the driver to more intuitively perceive the lane change information.

The acceptance confirmation function of the control device 19 is a function of confirming whether or not the driver accepts the autonomous lane change control in response to the lane change information presented using the lane change information presentation function. The control device 19 receives input operations to the input device 16 by the driver by using the acceptance confirmation function, for example, an operation of a dial switch, an operation of a touch screen arranged on a display screen, an audio input to a microphone, an operation of a direction indicator, and the like, after the lane change information is presented by the lane change information presentation function. The control device 19 determines whether or not the driver accepts the autonomous lane change control on a basis of these input operations by using the acceptance confirmation function.

An autonomous lane change control process according to one or more embodiments of the present invention will now be described with reference to FIGS. 5A to 5E. FIGS. 5A to 5E are flowcharts illustrating the autonomous lane change control process according to one or more embodiments of the present invention. The autonomous lane change control process described below is performed by the control device 19 at predetermined time intervals. The description will be made below on the assumption that it becomes necessary to change lanes to a next adjacent lane (lane further beyond the adjacent lane) for a preliminarily input destination while the control device 19 uses the travel control function to perform the lane keeping control of controlling the traveling position of the subject vehicle in the road width direction so that the subject vehicle travels in the subject vehicle lane. Further, the lateral speed control performed in the autonomous lane change will be described with respect to a case in which the lateral speed of the second and subsequent autonomous lane change control is set corresponding to the traffic congestion level of the third embodiment.

Figure 5A:
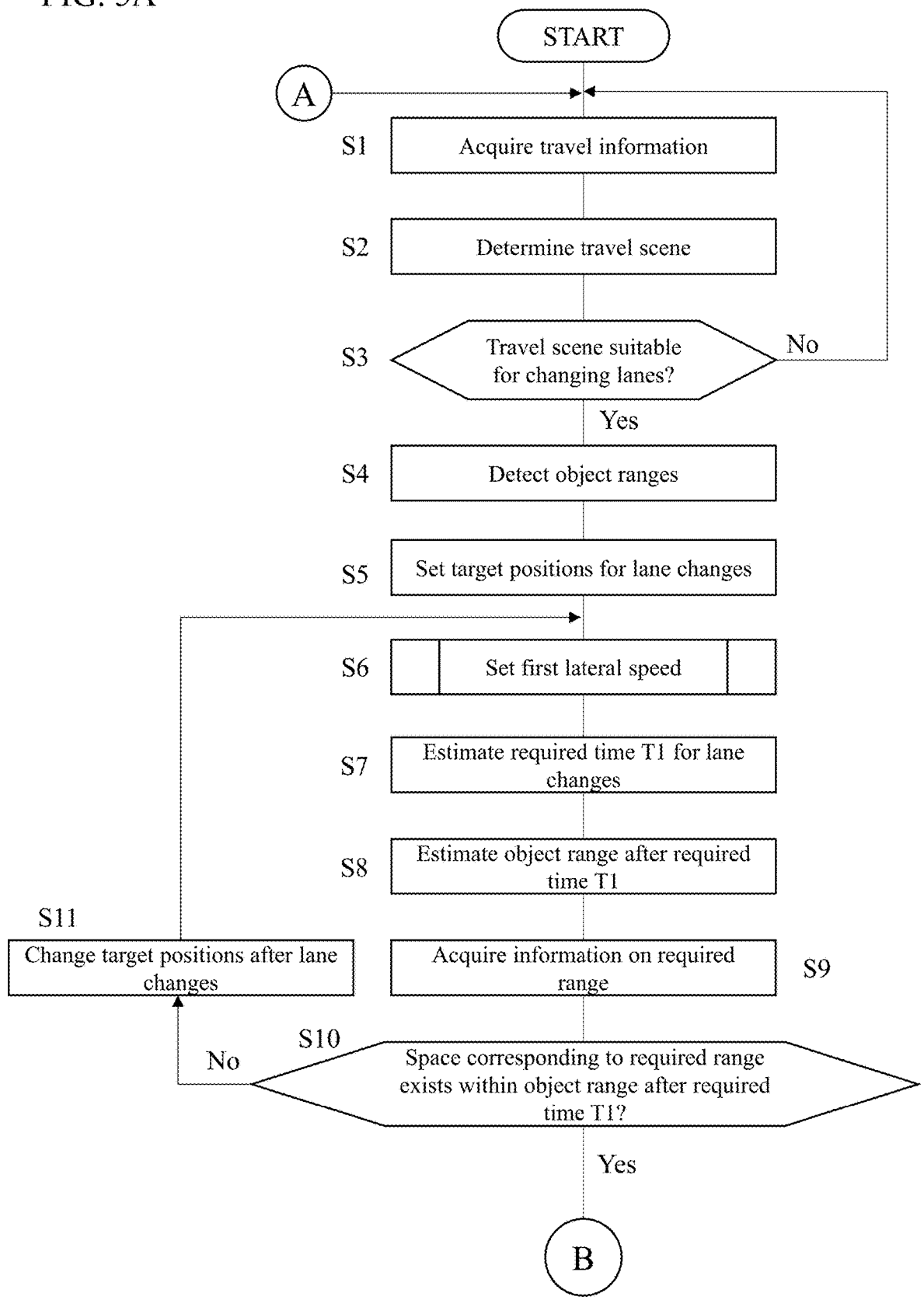
FIG. 5A is a flowchart (part 1) illustrating an autonomous lane change control process performed by the travel control apparatus for a vehicle according to the embodiment of the present invention.

First, in step S1 of FIG. 5A, the control device 19 uses the travel information acquisition function to acquire the travel information regarding the traveling state of the subject vehicle. Step S1 is followed by step S2, in which the control device 19 uses the travel scene determination function to determine the travel scene of the subject vehicle on the basis of the travel information acquired in step S1.

In step S3, the control device 19 uses the travel scene determination function to determine whether or not the travel scene of the subject vehicle determined in step S2 is a travel scene suitable for changing lanes. Specifically, when the travel scene of the subject vehicle is any of travel scenes illustrated in FIG. 2, the travel scene determination function is used to determine that the travel scene of the subject vehicle is a travel scene suitable for changing lanes. When the travel scene of the subject vehicle is not a travel scene suitable for changing lanes, the process returns to step S1, from which the determination of the travel scene is repeated. When the travel scene of the subject vehicle is a travel scene suitable for changing lanes, the process proceeds to step S4.

In step S4, the control device 19 uses the autonomous lane change control function to detect object ranges. Specifically, the control device 19 uses the autonomous lane change control function to detect obstacles existing around the subject vehicle on the basis of the external image information around the vehicle captured by the front camera and rear camera included in the sensors 11 and/or the travel information including the detection results by the front radar, rear radar, and side radars included in the sensors 11. Then, the control device 19 uses the autonomous lane change control function to detect ranges that are located on a side of the subject vehicle and in which no obstacles exist, as the object ranges.

The "object ranges" in one or more embodiments of the present invention refer to relative ranges with reference to the traveling position when the subject vehicle travels at the current speed; therefore, when another vehicle existing around the subject vehicle travels straight ahead at the same speed as the subject vehicle, the object ranges do not vary. The "side of the subject vehicle" refers to a range in which the position on the side of the subject vehicle can be taken as a target position for changing lanes when the subject vehicle changes lanes (this target position is also a relative position with reference to the traveling position when the subject vehicle travels at the current speed), and this range (such as direction, size, and angle) can be set as appropriate. Methods of detecting object ranges OS will be described below with reference to FIGS. 6A to 6F. FIGS. 6A to 6E are plan views for describing object ranges.

Figure 6A:
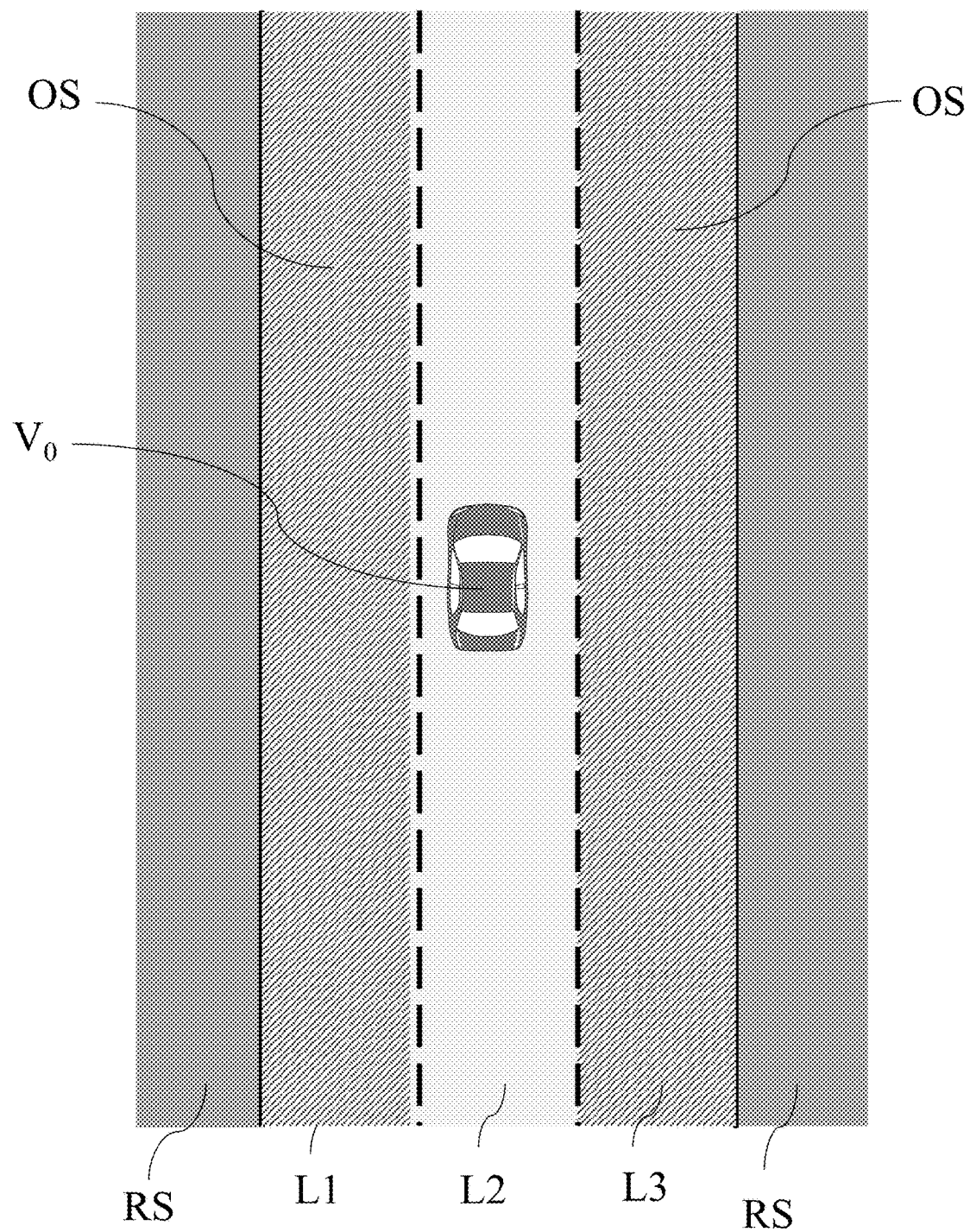
FIG. 6A is a plan view (part 1) for describing a method of detecting object ranges performed by the travel control apparatus for a vehicle according to the embodiment of the present invention.

In an example of a scene illustrated in FIG. 6A, another vehicle $V_1$ that is an obstacle does not exist neither in an adjacent lane L2 adjacent to a lane L1 in which the subject vehicle $V_0$ travels nor in a lane L3 further beyond the adjacent lane L2 (the lane L3 will also be referred to as a next adjacent lane L3, hereinafter). In this case, the control device 19 uses the autonomous lane change control function to detect the adjacent lane L2 and the next adjacent lane L3 as object ranges OS. Note that road shoulders RS are excluded from the object ranges OS because the road shoulders RS are basically within ranges in which changing lanes cannot be performed. Note, however, that when the travel scene of the subject vehicle $V_0$ is an "emergency evacuation scene" on a road on which emergency stop or the like is permitted at the road shoulders RS, the road shoulders RS can be included in the object ranges OS (here and hereinafter).

Figure 6B:
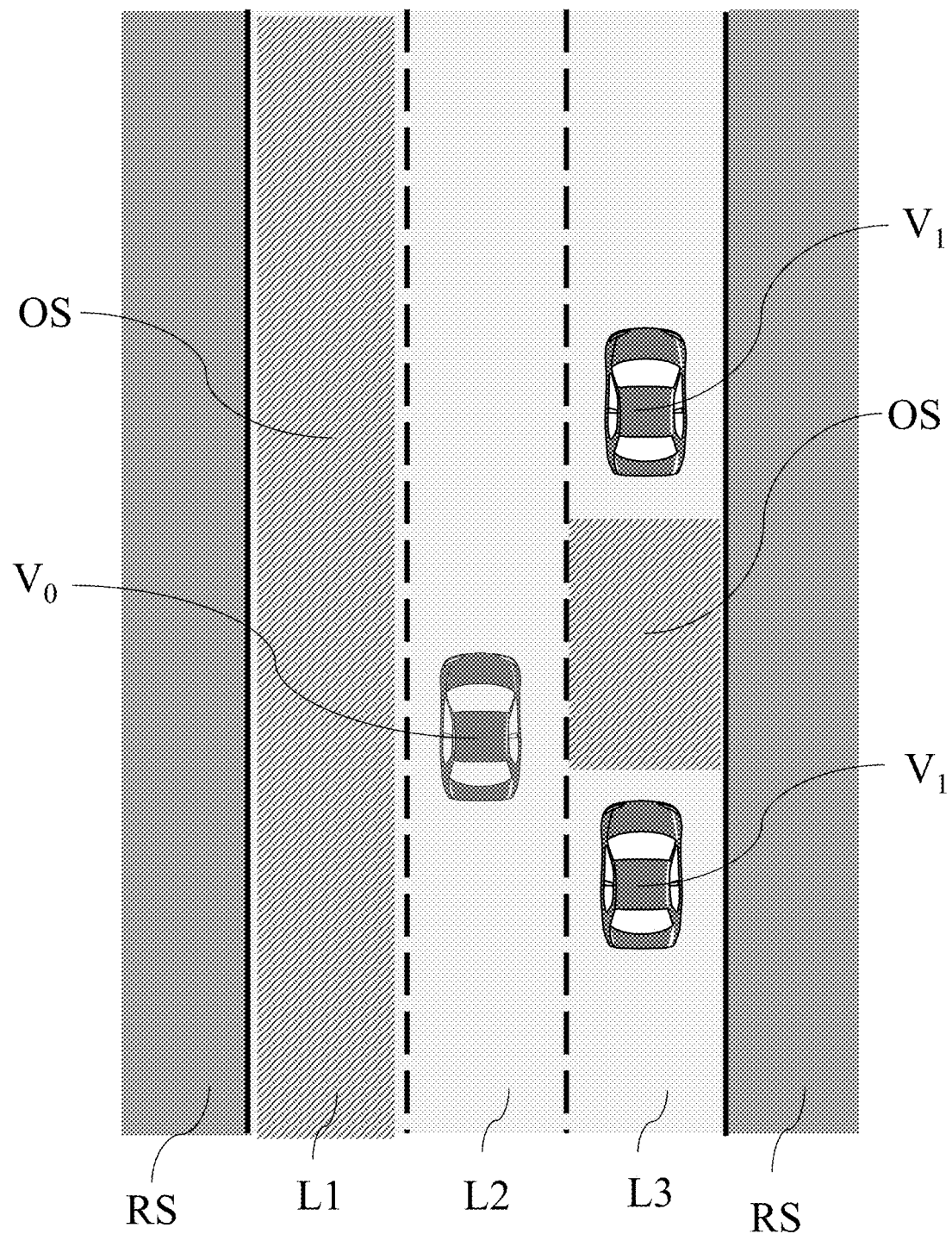
FIG. 6B is a plan view (part 2) for describing a method of detecting object ranges performed by the travel control apparatus for a vehicle according to the embodiment of the present invention.

In an example of a scene illustrated in FIG. 6B, other vehicles $V_1$ and $V_1$ that are obstacles exist in the adjacent lane L2 adjacent to the lane L1 in which the subject vehicle $V_0$ travels, but a range in which no other vehicles exist is present in the adjacent lane L2 between the front other vehicle $V_1$ traveling ahead of a space adjacent to the lane L1 in which the subject vehicle $V_0$ travels and the rear other vehicle $V_1$ traveling behind that space, and no other vehicles exist as obstacles in the next adjacent lane L3. The control device 19 uses the autonomous lane change control function to detect, as the object ranges OS, the next adjacent lane L3 and the range of the adjacent lane L2 in which no other vehicles exist.

Figure 6C:
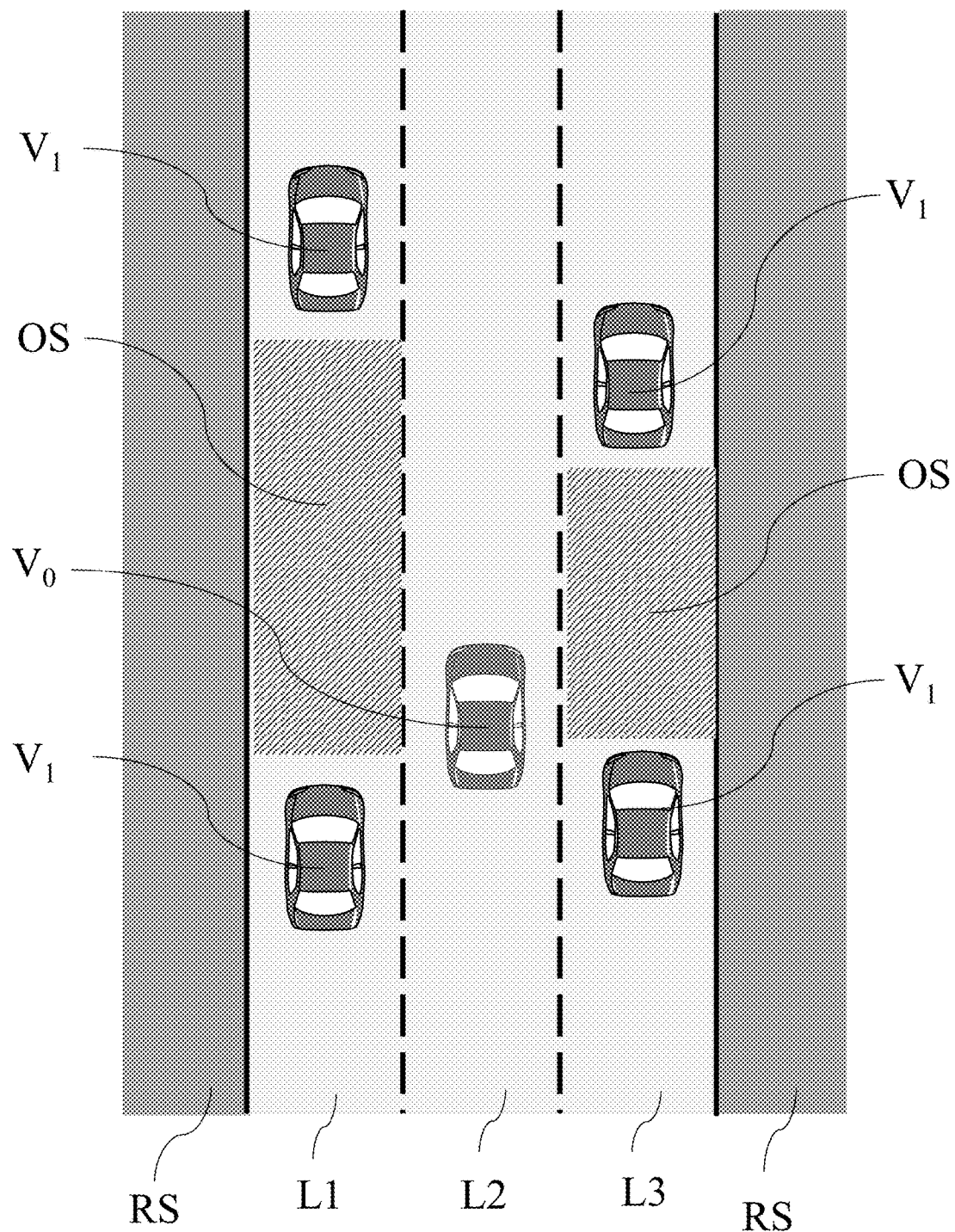
FIG. 6C is a plan view (part 3) for describing a method of detecting object ranges performed by the travel control apparatus for a vehicle according to the embodiment of the present invention.

In an example of a scene illustrated in FIG. 6C, a range in which no other vehicles exist is present in the adjacent lane L2 as in the example illustrated in FIG. 6B, and a range in which no other vehicles exist is also present in the next adjacent lane L3 between the front other vehicle $V_1$ and the rear other vehicle $V_1$. In this case, the control device 19 uses the autonomous lane change control function to detect, as the object ranges OS, the range in the adjacent lane L2 in which no other vehicles exist and the range in the next adjacent lane L3 in which no other vehicles exist.

Figure 6D:
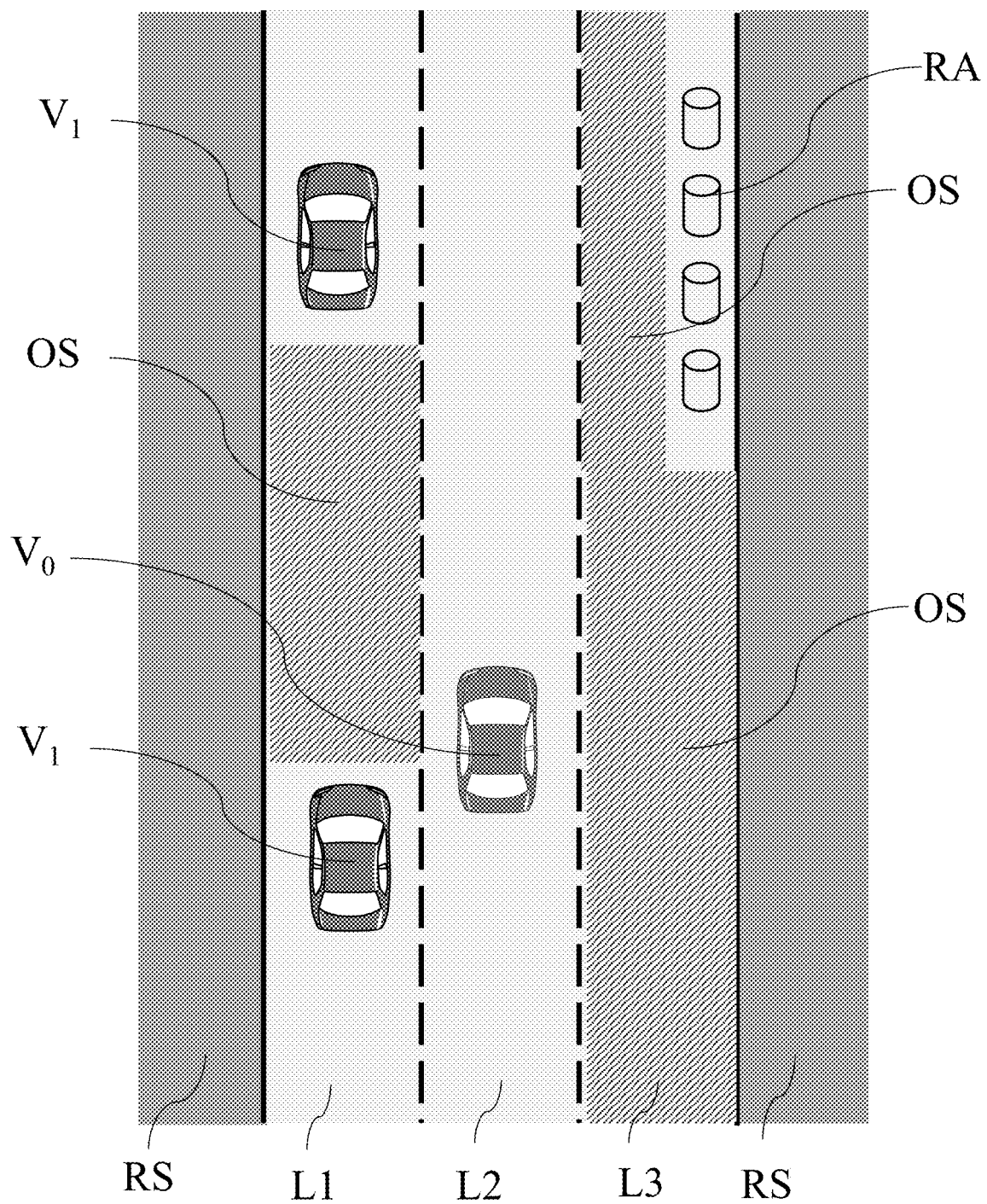
FIG. 6D is a plan view (part 4) for describing a method of detecting object ranges performed by the travel control apparatus for a vehicle according to the embodiment of the present invention.

In an example of a scene illustrated in FIG. 6D, a range in which no other vehicles exist is present in the adjacent lane L2 as in the example illustrated in FIG. 6B, and no other vehicles exist in the next adjacent lane L3, but the next adjacent lane L3 includes a range RA, such as a construction section or a space occupied by a damaged vehicle, in which the subject vehicle $V_0$ cannot travel. In this case, the control device 19 uses the autonomous lane change control function to detect the object ranges OS by excluding the range RA, such as a construction section or a space occupied by a damaged vehicle, in which the subject vehicle $V_0$ cannot travel, from the object ranges OS. Examples of the range RA in which the subject vehicle $V_0$ cannot travel include, in addition to a construction section, a range in which another vehicle $V_1$ parks or stops and a range in which vehicles are prohibited from traveling due to traffic regulation or the like. As illustrated in FIG. 6D, when the range RA in which the subject vehicle $V_0$ cannot travel due to a construction section or the like occupies half or more of the next adjacent lane L3 (half or more in the road width direction), for example, the remaining less than half of the range may be excluded from the object ranges OS.

Figure 6E:
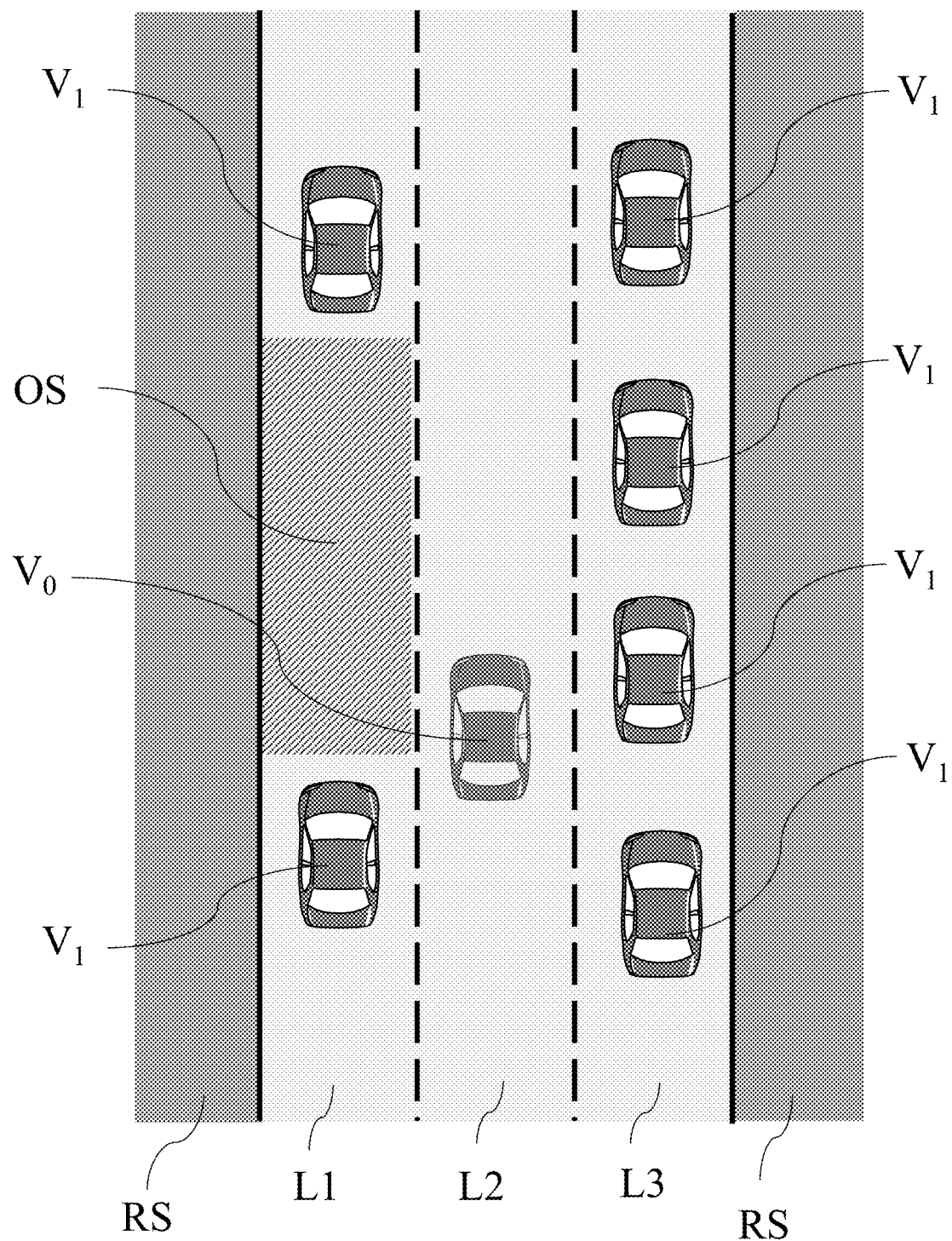
FIG. 6E is a plan view (part 5) for describing a method of detecting object ranges performed by the travel control apparatus for a vehicle according to the embodiment of the present invention.

In an example of a scene illustrated in FIG. 6E, a range in which no other vehicles exist is present in the adjacent lane L2, but other vehicles $V_1$ are traveling in series in the next adjacent lane L3, and the next adjacent lane L3 does not include a space to which changing lanes is possible. In this case, the control device 19 uses the autonomous lane change control function to determine that the object ranges OS cannot be detected.

Figure 6F:
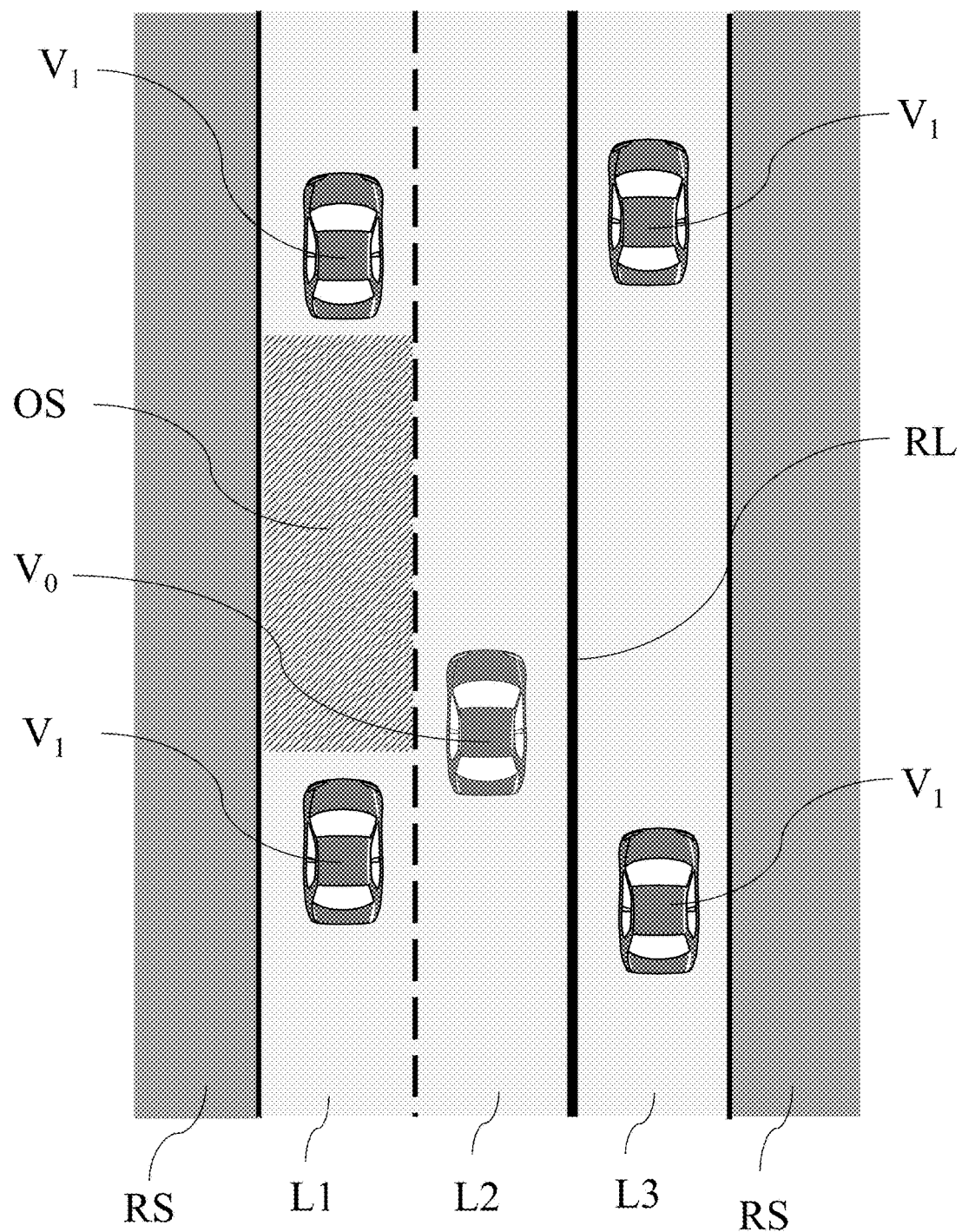
FIG. 6F is a plan view (part 6) for describing a method of detecting object ranges performed by the travel control apparatus for a vehicle according to the embodiment of the present invention.

In an example of a scene illustrated in FIG. 6F, lane change from the adjacent lane L2 to the next adjacent lane L3 is prohibited by a mark RL indicating the prohibition of lane change. On such a road, the control device 19 uses the autonomous lane change control function to determine that the object ranges OS cannot be detected.

The control device 19 in one or more embodiments of the present invention uses the autonomous lane change control function to detect the object ranges OS in a direction, among right and left directions, which is suitable for changing lanes in the travel scene of the subject vehicle $V_0$. In one or more embodiments of the present invention, the direction suitable for changing lanes in each travel scene is preliminarily stored in the table illustrated in FIG. 2. The control device 19 uses the autonomous lane change control function to refer to the table illustrated in FIG. 2 to acquire information on the "direction of changing lanes" in the travel scene of the subject vehicle. For example, when the travel scene of the subject vehicle is a "scene of lane transfer toward the destination," the control device 19 uses the autonomous lane change control function to refer to the table of FIG. 2 to acquire a direction "toward the lane side for heading to the destination" as the "direction of changing lanes." Then, the control device 19 uses the autonomous lane change control function to detect the object ranges OS in the acquired "direction of changing lanes."

Additionally or alternatively, the control device 19 uses the autonomous lane change control function to detect the object ranges OS on a side of the subject vehicle $V_0$. For example, even when ranges in which no obstacles exist are detected in the adjacent lane L2 and the next adjacent lane L3, if the ranges are separate from the current position of the subject vehicle $V_0$ by a certain distance or more and located behind or ahead of the subject vehicle, it may be difficult to change lanes to such ranges, which are therefore not detected as the object ranges OS.

Figure 7:
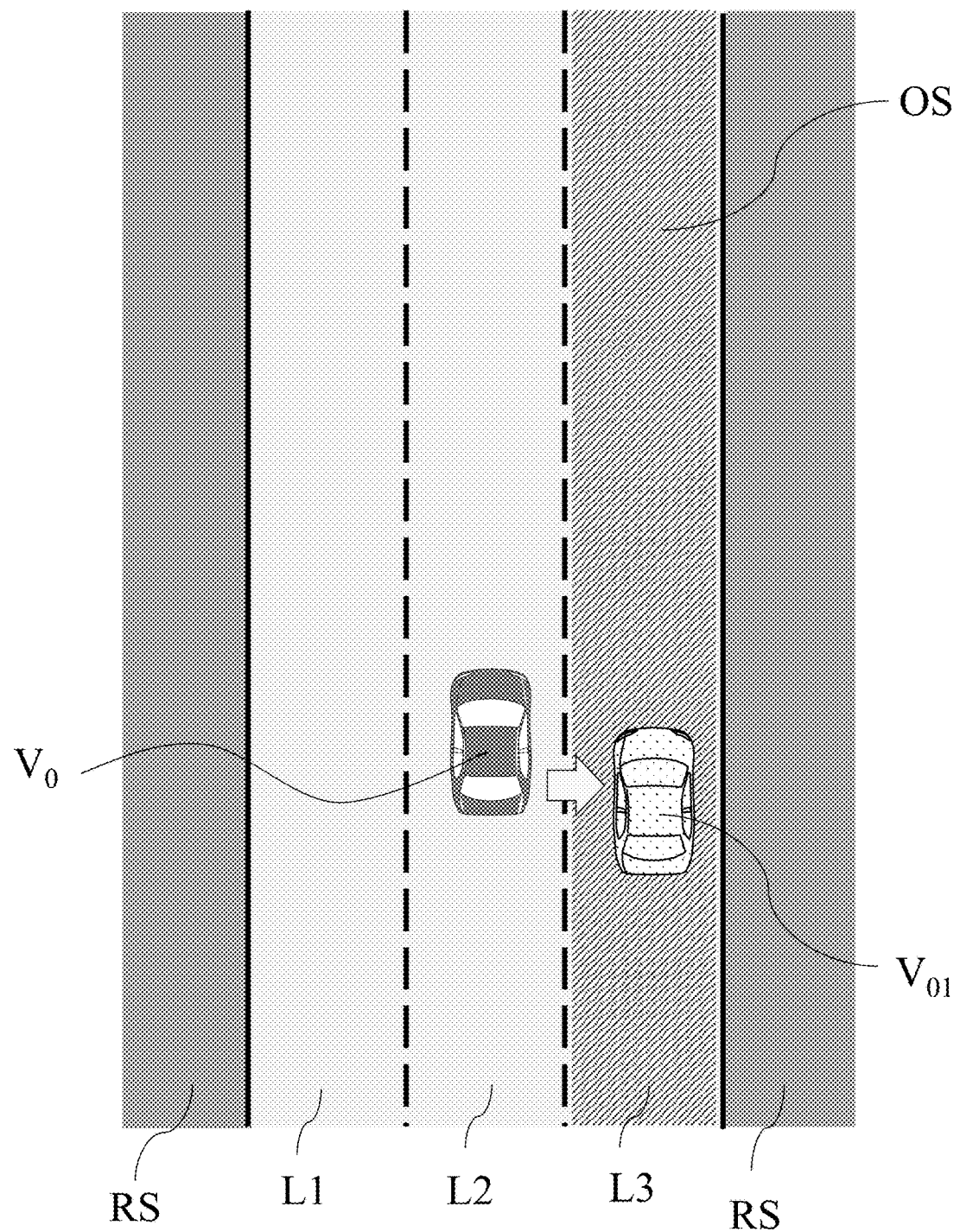
FIG. 7 is a plan view for describing a method of setting target positions for lane changes, wherein the method is performed by the travel control apparatus for a vehicle according to the embodiment of the present invention.

Referring again to FIG. 5A, in step S5, the control device 19 uses the autonomous lane change control function to set target positions for lane changes. FIG. 7 is a diagram for describing a method of setting the target positions for lane changes. For example, as illustrated in FIG. 7, the control device 19 uses the autonomous lane change control function to set a position that is within the object range OS in the adjacent lane L2 detected in step S4 and that is shifted backward from the position of the subject vehicle $V_0$ by a small distance and a position that is within the object range OS in the next adjacent lane L3 detected in step S4 and that is shifted backward from the position of the subject vehicle $V_0$ by a small distance, as the target positions for lane changes (e.g., the positions of vehicles $V_{01}$ and $V_{02}$ illustrated in FIG. 7). The target positions for lane changes (positions of the vehicles $V_{01}$ and $V_{02}$) are relative positions with respect to the position at which the subject vehicle $V_0$ travels. That is, provided that the position when the subject vehicle $V_0$ travels at the current speed without changing the speed is a reference position, positions located laterally behind the reference position by a small distance are set as the target positions for lane changes. This allows the subject vehicle $V_0$ to change lanes to the next adjacent lane L3 via the adjacent lane L2 without accelerating the subject vehicle $V_0$ when the subject vehicle $V_0$ moves to the target positions for lane changes.

The control device 19 may use the autonomous lane change control function to set the target positions for lane changes by taking into account the ease of lane changes, such as a situation that the object ranges OS in the adjacent lane L2 and the next adjacent lane L3 include a range to which the subject vehicle $V_0$ can move and a situation that another vehicle $V_1$ that may enter an object range OS does not exist around the subject vehicle $V_0$. For example, when another vehicle $V_1$ existing around an object range OS lights the blinkers toward the object range OS and/or travels while deviating toward the object range OS side, the autonomous lane change control function is used to determine that the other vehicle $V_1$ may enter the object range OS. In this case, another position in an object range OS which the other vehicle $V_1$ is less likely to enter may be set as a target position. In the above exemplary case, the target positions for lane changes are set at positions located behind the subject vehicle $V_0$ and within the object ranges OS in the adjacent lane L2 and the next adjacent lane L3. In an alternative embodiment, the target positions for lane changes may be set at positions located ahead of the subject vehicle $V_0$ and within the object ranges OS in the adjacent lane L2 and the next adjacent lane L3. In an alternative embodiment, step S105 may include setting target routes for performing lane changes instead of setting the target positions for lane changes.

Returning to FIG. 5A, in step S6, the control device 19 sets the lateral speed of the first autonomous lane change control by the autonomous lane change control function. Specifically, the predetermined first lateral speed Vh1 is set as the lateral speed of the first autonomous lane change control, as shown in the graph of FIG. 3F.

In step S7, the control device 19 uses the autonomous lane change control function to estimate a time required for the subject vehicle to move from the current position to a target position for the lane changes as the required time T1 on the basis of the vehicle speed and/or acceleration of the subject vehicle. Accordingly, when the width of a lane is wide, when the road is congested, or when consecutive lane changes are performed as in this example, for example, the required time T1 is estimated as a long time.

In step S8, the control device 19 uses the autonomous lane change control function to estimate an object range OS after the required time T1 estimated in step S7. Specifically, the control device 19 uses the autonomous lane change control function to estimate the traveling position after the required time T1 of another vehicle $V_1$ existing around the subject vehicle $V_0$ on the basis of the vehicle speed and acceleration of the other vehicle $V_1$. For example, the control device 19 uses the autonomous lane change control function to repeatedly detect the positional information of the other vehicle $V_1$ thereby to calculate the speed vector $v_0$, acceleration vector $a_0$, and positional vector $p_0$ of the other vehicle $V_1$, as illustrated in FIG. 8A.

Figure 8A:
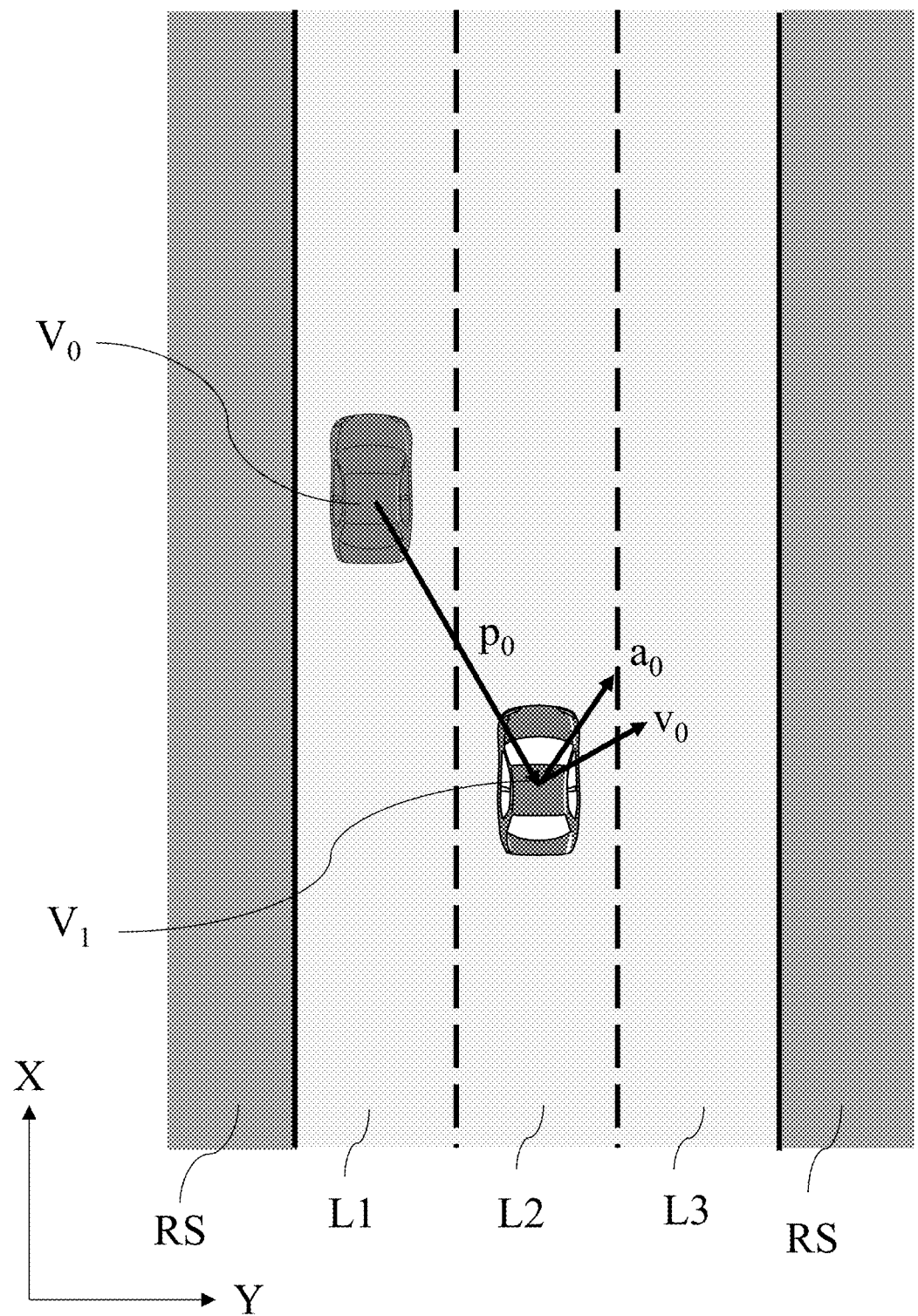
FIG. 8A is a plan view (part 1) for describing a method of estimating the position of another vehicle after a required time, wherein the method is performed by the travel control apparatus for a vehicle according to the embodiment of the present invention.

As illustrated in FIG. 8A, when the traveling direction of the subject vehicle $V_0$ is along X-axis and the road width direction is along Y-axis, the speed vector $v_0$ of the other vehicle $V_1$ is represented by the following equation (1).

$$v_0 = vx_0 i + vy_0 j \qquad (1)$$

In the above equation (1), $vx_0$ represents a speed component in the X-axis direction of the speed vector $v_0$ of the other vehicle $V_1$ and $vy_0$ represents a speed component in the Y-axis direction of the speed vector $v_0$ of the other vehicle $V_1$. In the above equation (1), i represents a unit vector in the X-axis direction and j represents a unit vector in the Y-axis direction (the same applies to the following equations (2), (3), and (6)).

The acceleration vector $a_0$ of the other vehicle $V_1$ can be obtained as represented by the following equation (2) while the positional vector $p_0$ of the other vehicle $V_1$ can be obtained as represented by the following equation (3).

$$a_0 = ax_0 i + ay_0 j \qquad (2)$$

$$p_0 = px_0 i + py_0 j \qquad (3)$$

In the above equation (2), $ax_0$ represents an acceleration component in the X-axis direction of the acceleration vector $a_0$ of the other vehicle $V_1$ and $ay_0$ represents an acceleration component in the Y-axis direction of the acceleration vector $a_0$ of the other vehicle $V_1$. In the above equation (3), $px_0$ represents a positional component in the X-axis direction of the positional vector $p_0$ of the other vehicle $V_1$ and $py_0$ represents a positional component in the Y-axis direction of the positional vector $p_0$ of the other vehicle $V_1$.

Figure 8B:
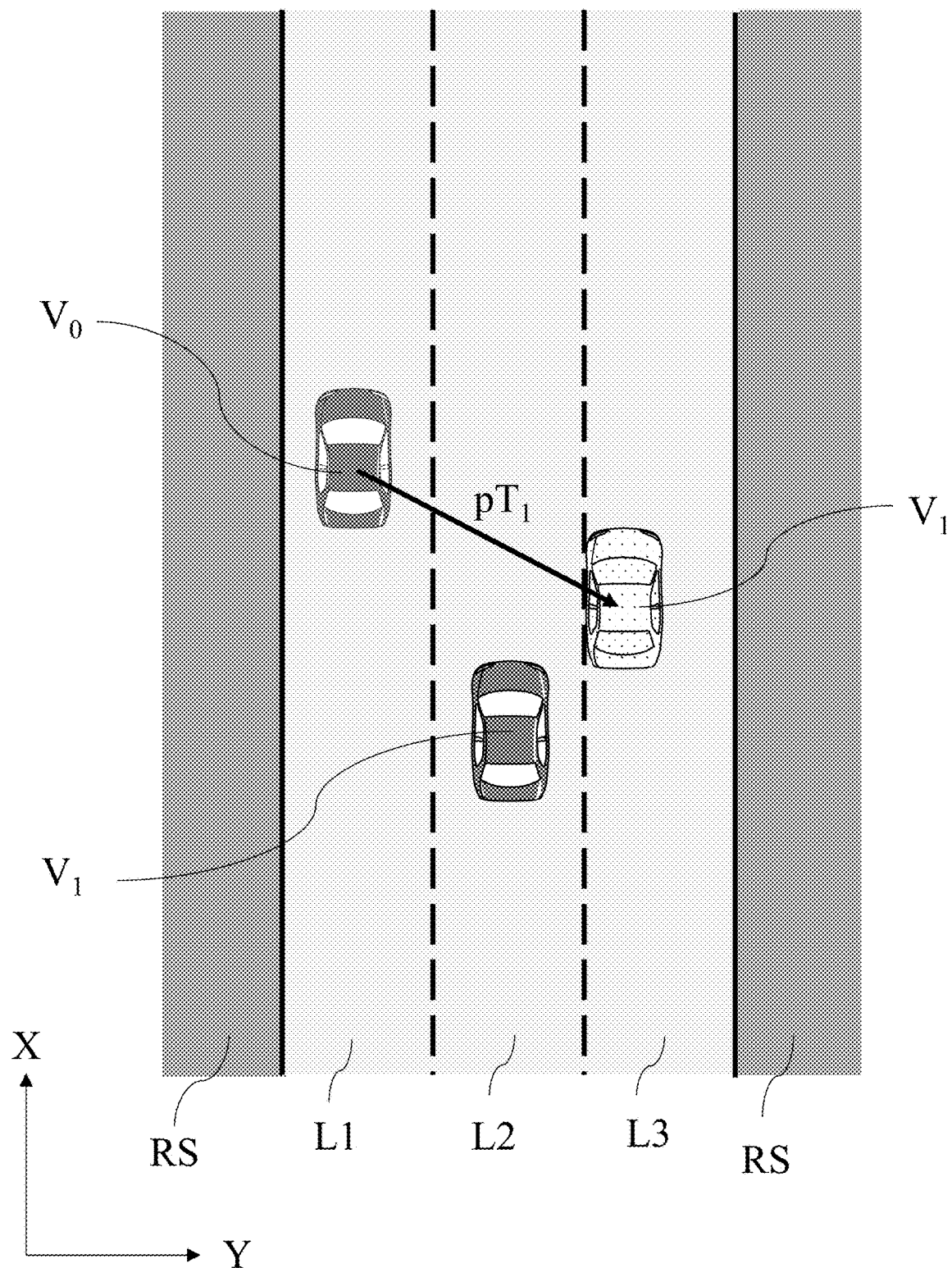
FIG. 8B is a plan view (part 2) for describing a method of estimating the position of another vehicle after a required time, wherein the method is performed by the travel control apparatus for a vehicle according to the embodiment of the present invention.

Then, the control device 19 uses the autonomous lane change control function to calculate a positional vector $pT_1$ after the required time T1 of the other vehicle $V_1$, as illustrated in FIG. 8B. Specifically, the control device 19 uses the autonomous lane change control function to calculate the positional vector $pT_1$ after the required time T1 of the other vehicle $V_1$ on the basis of the following equations (4) to (6).

$$pxT_1 = px_0 + vx_0 T1 + 1/2(ax_0 T1)^2 \qquad (4)$$

$$pyT_1 = py_0 + vy_0 T1 + 1/2(ay_0 T1)^2 \qquad (5)$$

$$pT_1 = pxT_1 i + pyT_1 j \qquad (6)$$

In the above equations (4) and (5), $pxT_1$ represents a positional component in the X-axis direction of the positional vector $pT_1$ after the required time T1 of the other vehicle $V_1$, $pyT_1$ represents a positional component in the Y-axis direction of the positional vector $pT_1$ after the required time T1 of the other vehicle $V_1$, $vx_0 T1$ represents a moving speed in the X-axis direction of the other vehicle $V_1$ after the required time T1, $vy_0 T1$ represents a moving speed in the Y-axis direction of the other vehicle $V_1$ after the required time T1, $ax_0 T1$ represents acceleration in the X-axis direction of the other vehicle $V_1$ after the required time T1, and $ay_0 T1$ represents acceleration in the Y-axis direction of the other vehicle $V_1$ after the required time T1.

The control device 19 uses the autonomous lane change control function to estimate positions after the required time T1 of all other vehicles $V_1$ existing around the subject vehicle $V_0$. Then, the control device 19 uses the autonomous lane change control function to estimate an object range OS after the required time T1 on the basis of the positions after the required time T1 of the other vehicles $V_1$. The control device 19 uses the autonomous lane change control function to estimate an object range OS after the required time T1 by taking into account the situation of lane regulation after the required time T1, existence of obstacles on the road, presence or absence of obstruction in the adjacent lane L2 and the next adjacent lane L3, and existence of a section, such as a construction section, to which the subject vehicle cannot move. The control device 19 can use the autonomous lane change control function to estimate an object range OS after the required time T1 as in step S4.

In step S9, the control device 19 uses the autonomous lane change control function to acquire information on a required range RR. The required range RR refers to a range having a size necessary for the subject vehicle $V_0$ to change lanes, or a range having a size that is at least equal to or larger than a size which the subject vehicle $V_0$ occupies on the road surface. In one or more embodiments of the present invention, when a required range RR is set at the target position for changing lanes and the object range OS in each of the adjacent lane L2 and the next adjacent lane L3 includes the required range RR, a determination is made that a space corresponding to the required range RR exists within the object range OS in each of the adjacent lane L2 and the next adjacent lane L3, and changing lane is permitted. In one or more embodiments of the present invention, the memory of the control device 19 stores information including the shape and size of a required range RR, and the autonomous lane change control function is used to acquire the information on the required range RR from the memory of the control device 19.

Figure 9A:
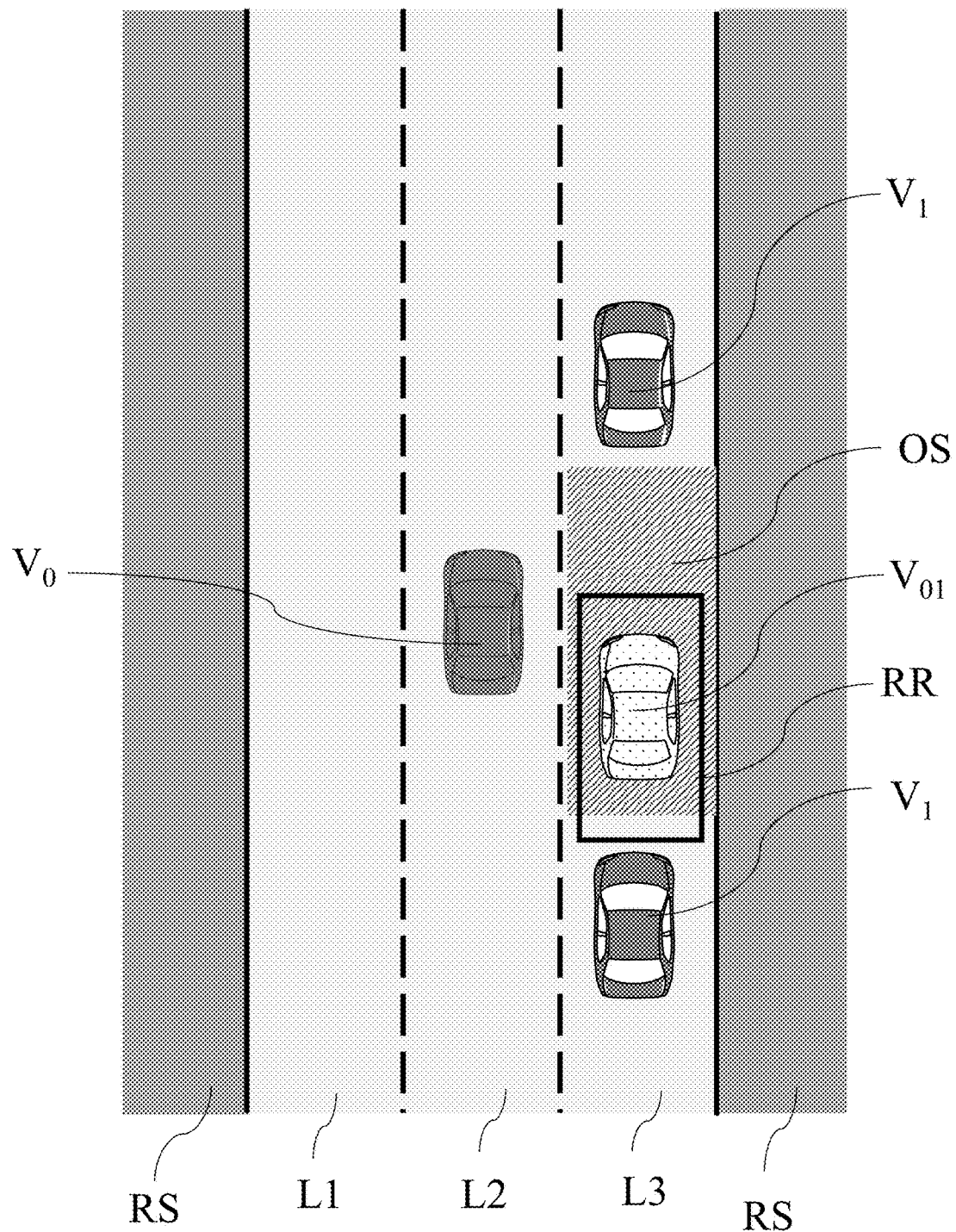
FIG. 9A is a plan view (part 1) for describing a method of determining whether or not changing lanes is possible, wherein the method is performed by the travel control apparatus for a vehicle according to the embodiment of the present invention.

In step S10, the control device 19 uses the autonomous lane change control function to determine whether or not there is a space within the object range OS in each of the adjacent lane L2 and the next adjacent lane L3 after the required time T1. The space corresponds to the required range RR acquired in step S9. The object range OS in each of the adjacent lane L2 and the next adjacent lane L3 after the required time T1 is estimated in step S8. Specifically, as illustrated in FIG. 9A, the control device 19 uses the autonomous lane change control function to set the required range RR at the target position for changing lanes (position of the subject vehicle $V_0$) which is set in step S5. Then, the control device 19 uses the autonomous lane change control function to determine whether or not the object range OS in each of the adjacent lane L2 and the next adjacent lane L3 after the required time T1 includes the required range RR.

Figure 9B:
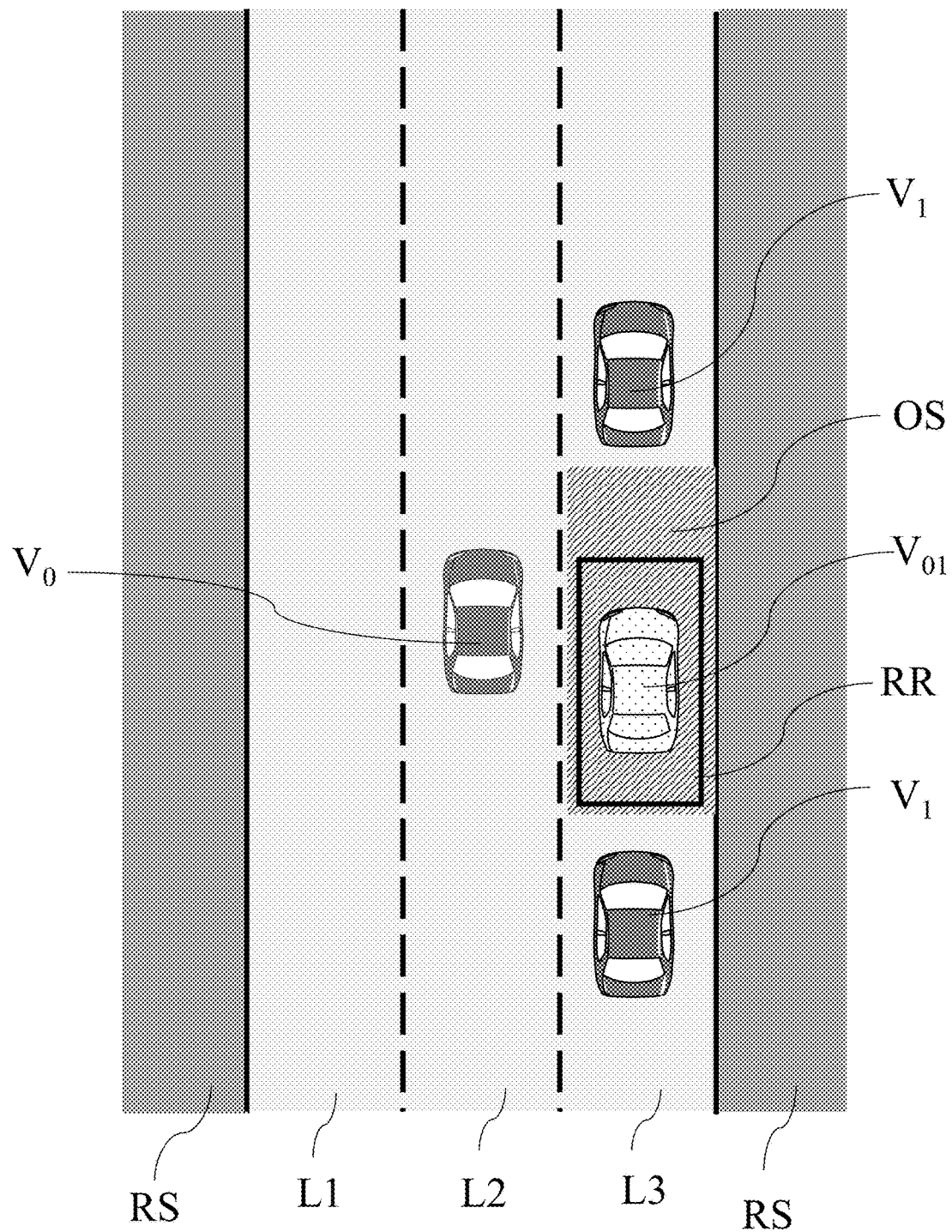
FIG. 9B is a plan view (part 2) for describing a method of determining whether or not changing lanes is possible, wherein the method is performed by the travel control apparatus for a vehicle according to the embodiment of the present invention.

For example, in the example illustrated in FIG. 9A, the object range OS in each of the adjacent lane L2 and the next adjacent lane L3 after the required time T1 does not include the rear portion of the required range RR. The control device 19 therefore uses the autonomous lane change control function to determine that there is not a space corresponding to the required range RR within the object range OS in each of the adjacent lane L2 and the next adjacent lane L3 after the required time T1. On the other hand, as illustrated in FIG. 9B, when the object range OS in each of the adjacent lane L2 and the next adjacent lane L3 after the required time T1 includes the required range RR, the control device 19 uses the autonomous lane change control function to determine that there is a space corresponding to the required range RR within the object range OS in each of the adjacent lane L2 and the next adjacent lane L3 after the required time T1. When there is a space corresponding to the required range RR within the object range OS in each of the adjacent lane L2 and the next adjacent lane L3 after the required time T1, the process proceeds to step S12 illustrated in FIG. 5B, while when there is no space, the process proceeds to step S11.

In step S11, a determination has been made that the object range OS in each of the adjacent lane L2 and the next adjacent lane L3 after the required time T1 does not include the required range RR and a space cannot be detected which corresponds to the required range RR within the object range OS in each of the adjacent lane L2 and the next adjacent lane L3 after the required time T1. In step S10, therefore, the control device 19 uses the autonomous lane change control function to change the target positions for lane changes. Specifically, the control device 19 uses the autonomous lane change control function to re-set the target positions for lane changes so that the object range OS in each of the adjacent lane L2 and the next adjacent lane L3 after the required time T1 includes the required range RR. For example, when the rear portion of the required range RR is not included in the object range OS in each of the adjacent lane L2 and the next adjacent lane L3 after the required time T1 as illustrated in FIG. 9A, the target positions for lane changes are shifted frontward. This allows the required range RR to be included in the object range OS in each of the adjacent lane L2 and the next adjacent lane L3 after the required time T1 as illustrated in FIG. 9B, and a determination is made that a space can be detected which corresponds to the required range RR within the object range OS in each of the adjacent lane L2 and the next adjacent lane L3 after the required time T1. Step S11 is followed by step S6, from which setting of the lateral speed, estimation of the required time T1, detection of object ranges OS, and the like are performed again.

Figure 5B:
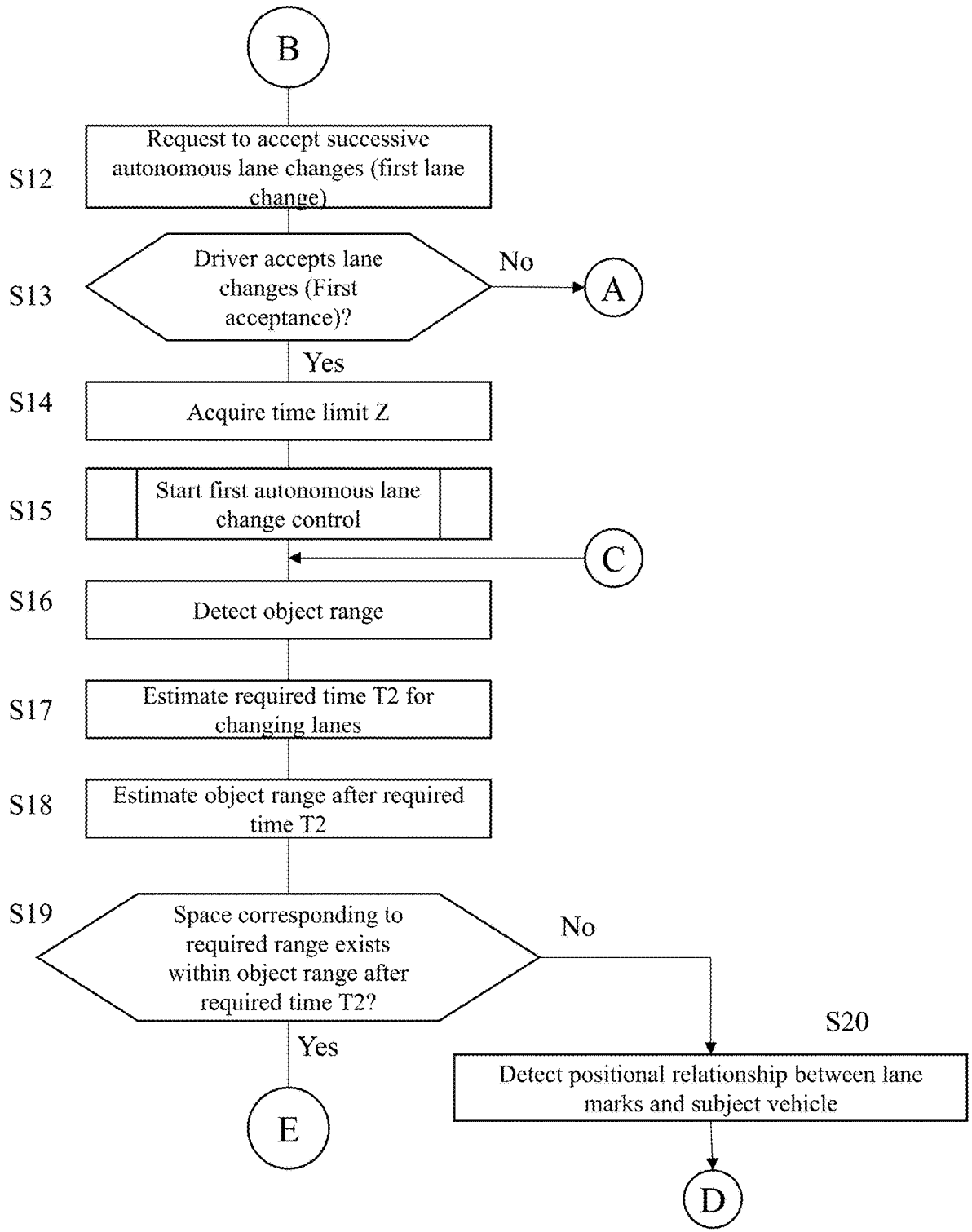
FIG. 5B is a flowchart (part 2) illustrating the autonomous lane change control process performed by the travel control apparatus for a vehicle according to the embodiment of the present invention.

On the other hand, when, in step S10 of FIG. 5A, a determination is made that the object range OS in each of the adjacent lane L2 and the next adjacent lane L3 after the required time T1 includes the required range RR, the process proceeds to step S12 illustrated in FIG. 5B. In step S12 of FIG. 5B, the control device 19 uses the autonomous lane change control function to perform an acceptance request process for the autonomous control of consecutive lane changes. In step S12, the control device 19 has determined a situation in which the autonomous control of consecutive lane changes is possible through the processes of steps S1 to S10; therefore, before actually performing the autonomous lane change control, the control device 19 requests the driver to make a reply as to whether or not to accept the execution of the autonomous lane change control, in order to encourage the driver to confirm safety by himself/herself.

The acceptance request process of the autonomous lane change control performed in step S11 is performed by presenting the lane change information related to the first lane change to the driver via the presentation device 15 including the display, speaker, warning lamp, a vibrator of the seat, and the like. In response to the lane change information provided by the lane change information presentation function, the driver visually confirms the surrounding situations. When the driver judges that the lane change may be performed, the driver operates the dial switch and/or the touch screen of the input device 16 or the direction indicator of the onboard equipment 14, or inputs audio to the microphone.

In step S13, the control device 19 determines whether or not the driver accepts the autonomous control of consecutive lane changes in response to the acceptance request of step S12. When the driver accepts the autonomous lane change control, the process proceeds to step S14, while when the driver does not accept the autonomous lane change control, the process returns to step S1 without performing the autonomous lane change control.

In step S14, the control device 19 uses the autonomous lane change control function to acquire a time limit Z for changing lanes. In one or more embodiments of the present invention, as illustrated in FIG. 2, the table stores as the time limit Z the time for the subject vehicle to approach a point at which the lane change is difficult in each travel scene. The control device 19 uses the autonomous lane change control function to refer to the table illustrated in FIG. 2 to acquire the time limit Z in the travel scene of the subject vehicle. For example, in the "scene of lane transfer toward a destination" among the examples illustrated in FIG. 2, the time limit is stored as (a time to reach the lane change point—α) seconds. In this case, the control device 19 uses the travel control function to refer to the table illustrated in FIG. 2 to calculate the time to reach the lane change point and acquire (the calculated time to reach the lane change pointe—α) seconds as the time limit Z. The constant α is some seconds (e.g., 5 seconds) and can be set for each travel scene as appropriate. For example, when the time to reach the lane change point is 30 seconds and a is 5 seconds, the time limit Z for changing lanes is 25 seconds.

In step S15, a start process for the first autonomous lane change control is performed. In the start process for the first autonomous lane change control, the control device 19 uses the autonomous lane change control function to set start timing L at which the autonomous lane change control is started. The method of setting the start timing L is not particularly limited, and the start timing L can be set, for example, with any of the following methods (1) to (8) described below. That is, (1) unique timing is set as the start timing L for the autonomous lane change control. For example, the timing after a predetermined time (e.g., 6 seconds) has elapsed from the driver's acceptance of the autonomous lane change control is set as the start timing L for the autonomous lane change control. (2) The start timing L for the autonomous lane change control is set based on the necessity level of changing lanes illustrated in FIG. 2. Specifically, the necessity level of changing lanes in the travel scene of the subject vehicle is acquired from the table illustrated in FIG. 2, and when the necessity level of changing lanes is not lower than a predetermined value, the start timing L for the autonomous lane change control is set to earlier timing than that in the case in which the necessity level of changing lanes is lower than the predetermined value. (3) The start timing L for the autonomous lane change control is set based on the time limit Z for changing lanes illustrated in FIG. 2. Specifically, the time limit Z for changing lanes in the travel scene of the subject vehicle is acquired from the table illustrated in FIG. 2, and when the time limit Z for changing lanes is less than a predetermined time $Z_{th}$, the start timing L for the autonomous lane change control is set to earlier timing than that in the case in which the time limit Z for changing lanes is not less than the predetermined time $Z_{th}$. (4) The start timing L for the autonomous lane change control is set based on the required time T1 for changing lanes. Specifically, when the required time T1 for changing lanes estimated in step S6 of FIG. 5A is less than a predetermined time $T_{th}$, the start timing L for the autonomous lane change control is set to earlier timing than that in the case in which the required time T1 for changing lanes is not less than the predetermined time $T_{th}$.

(5) The start timing L for the autonomous lane change control is set based on the time limit Z and required time T1 for changing lanes. Specifically, a margin time Y is obtained from the required time T1 for changing lanes and the time limit Z for changing lanes (e.g., Time limit Z−Required time T1=Margin time Y), and when the margin time Y is less than a predetermined time $Y_{th}$, the start timing L for the autonomous lane change control is set to earlier timing than that in the case in which the margin time Y is not less than the predetermined time $Y_{th}$. (6) The start timing L for the autonomous lane change control is set based on an attention level (commitment level) O that represents a degree as to how the driver is involved in the driving. For example, a determination is made whether the driver is making a conversation or hands-free call, by detecting the driver's voice using the input device 16 such as an onboard microphone or a hands-free device, and when the driver is making a conversation or hands-free call, the driver's attention level O is determined to be less than a threshold $O_{th}$, and the start timing L for the autonomous lane change control is set to later timing than that in the case in which the driver's attention level O is not less than the threshold $O_{th}$.

(7) The start timing L for the autonomous lane change control is set based on a traffic congestion level K. As explained in the third embodiment, the traffic congestion level K is determined on a basis of, for example, the distance to a preceding vehicle, the distance to a following vehicle, the number of surrounding vehicles, the congestion level contained in the VICS (registered trademark) information, and/or the degree of deviation between the legal speed and the actual speed of the subject vehicle. When the traffic congestion level K is not lower than a predetermined value Kth, the control device 19 sets the start timing L for the autonomous lane change control to earlier timing than that in the case in which the traffic congestion level K is lower than the predetermined value Kth. (8) The start timing L for the autonomous lane change control is set based on a likelihood B of changing lanes. For example, a degree at which it can be assured that the subject vehicle changes lanes can be obtained as the likelihood B on the basis of the presence or absence of setting of a destination and/or the distance to a preceding vehicle. Specifically, when the destination is set and it is necessary to change lanes in order for the subject vehicle to reach the destination, a determination is made that the likelihood B of changing lanes is not lower than a threshold $B_{th}$. Additionally or alternatively, when the distance to a preceding vehicle is less than a predetermined distance, a determination is made that the driver desires to change lanes, and the likelihood B of changing lanes is determined to be not less than the threshold $B_{th}$. Then, when the likelihood B of changing lanes is not less than the threshold $B_{th}$, the start timing L for the autonomous lane change control is set to earlier timing than that in the case in which the likelihood B of changing lanes is less than the threshold $B_{th}$. Thus, the start timing L for the autonomous lane change control is set as above. The above-described (1) to (8) are examples of the method of setting the start timing L, and the method is not limited to the above.

After setting the start timing L, the control device 19 may set, before starting the autonomous lane change control, preliminary notice presentation timing P for presenting the lane change information indicating that the autonomous lane change control will be started.

When the set start timing L is reached, the control device 19 uses the autonomous lane change control function to start the autonomous lane change control. Specifically, the control device 19 uses the autonomous lane change control function to allow the drive control device 18 to start control of the operation of the steering actuator so that the subject vehicle moves to the target positions for lane changes which are set in step S5 or step S11 of FIG. 5A. After the autonomous lane change control is started, the presentation device 15 may present the lane change information indicating that the autonomous lane change control is being performed.

The control device 19 controls the lateral speed of the first autonomous lane change control by the autonomous lane change control function. The control device 19 accelerates the lateral speed Vh of the subject vehicle $V_0$ to the predetermined first lateral speed Vh1 in the subject vehicle lane L1 and performs the lane change from the subject vehicle lane L1 to the adjacent lane L2 while maintaining the first lateral speed Vh1 by the autonomous lane change control function, as shown in the graph of FIG. 3F.

In steps S16 to S18 of FIG. 5B, like steps S4 and S7 to S8 of FIG. 5A, the current object range OS and the object range OS after the required time T2 for the subject vehicle $V_0$ to move to the target position related to the first lane change (lane change from the lane L1 to the lane L2 of FIG. 3F) are detected. Then, in step S19, the control device 19 uses the autonomous lane change control function to determine whether or not there is a space within the object range OS in each of the adjacent lane L2 and the next adjacent lane L3 after the required time T2. The space corresponds to the required range RR acquired in step S9. The object range OS in each of the adjacent lane L2 and the next adjacent lane L3 after the required time T2 is estimated in step S18. Then, the control device 19 uses the autonomous lane change control function to set a required range RR at the target position for each of the first and second lane changes. When the object range OS in each of the adjacent lane L2 and the next adjacent lane L3 after the required time T2 includes the required range RR, the control device 19 determines that there is a space corresponding to the required ranges RR within the object range OS in each of the adjacent lane L2 and the next adjacent lane L3 after the require time T2, and the process proceeds to step S20 of FIG. 5C. On the other hand, when the control device 19 determines that there is not a space corresponding to the required range RR within the object range OS in at least one of the adjacent lane L2 and the next adjacent lane L3 after the require time T2, the process proceeds to step S20. The process of step S20 and the subsequent processes will be described later with reference to FIG. 5E.

Figure 5C:
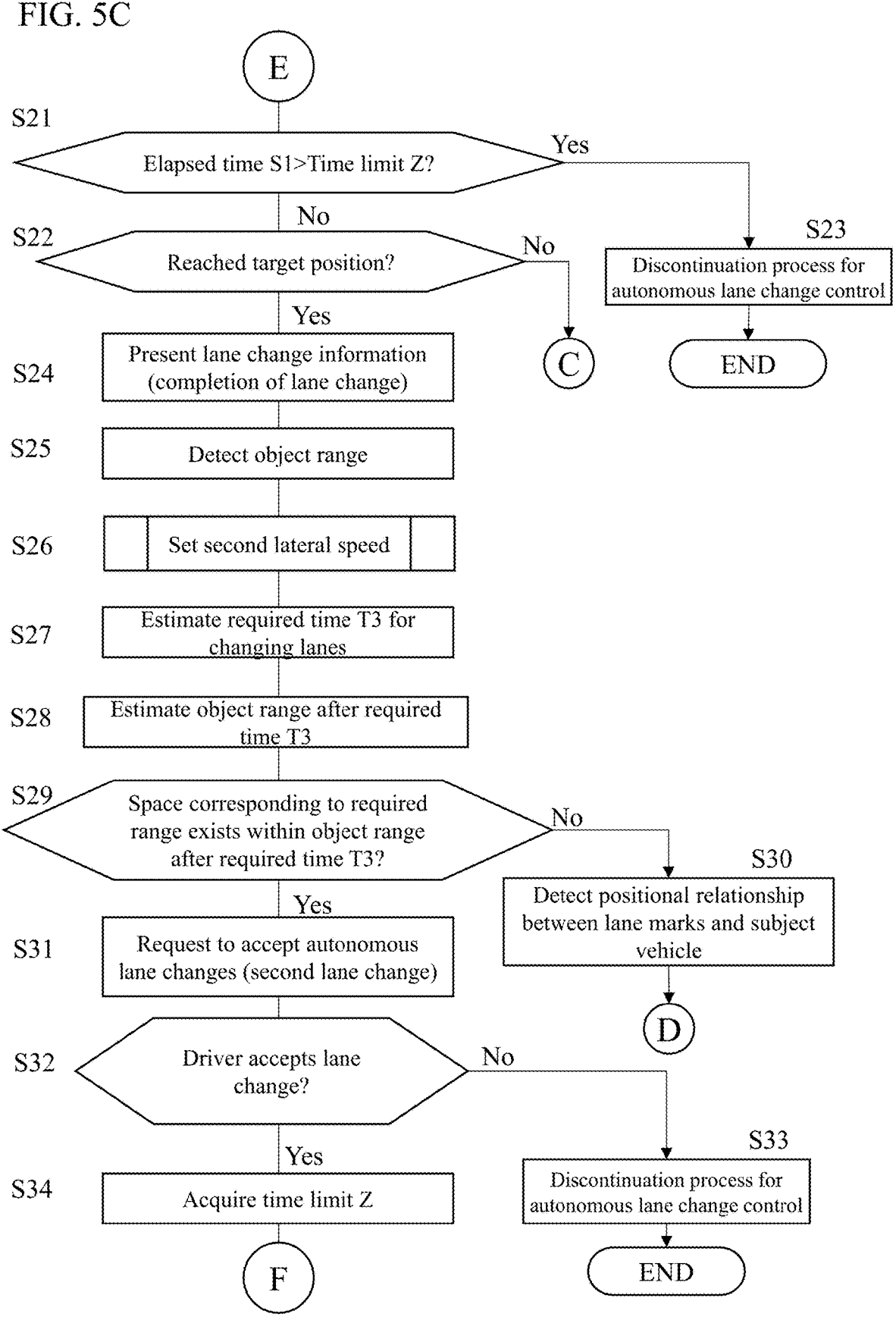
FIG. 5C is a flowchart (part 3) illustrating the autonomous lane change control process performed by the travel control apparatus for a vehicle according to the embodiment of the present invention.

In step S21 of FIG. 5C, the control device 19 uses the autonomous lane change control function to determine whether or not the time limit Z acquired in step S14 has elapsed since the first autonomous lane change control was started in step S15. When the elapsed time S1 after starting the first autonomous lane change control exceeds the time limit Z, that is, when the target position for the first lane change cannot be reached even after the time limit Z has elapsed since the autonomous lane change control was started, the process proceeds to step S23. In step S23, the control device 19 uses the autonomous lane change control function to perform a discontinuation process for the first autonomous lane change control. Specifically, the control device 19 uses the autonomous lane change control function to announce the information indicating that the autonomous lane change control will be discontinued to the driver. For example, the control device 19 controls the presentation device 15 to announce a message "Lane changes will be discontinued due to time out" to the driver and then concludes the autonomous lane change control. In the discontinuation process for the autonomous lane change control, the control device 19 may leave the traveling position of the subject vehicle in the road width direction at the position at which the autonomous lane change control is concluded or may also recover the traveling position to the position at which the autonomous lane change control is started. When the traveling position is recovered to the position at which the autonomous lane change control is started, a message may be announced to the driver, such as "The original position will be recovered due to time out."

On the other hand, when, in step S21, the elapsed time S1 from the start of the autonomous lane change control does not exceed the time limit Z, the process proceeds to step S22. In step S22, the control device 19 uses the autonomous lane change control function to determine whether or not the subject vehicle has reached the target position for the first lane change. When the subject vehicle has reached the target position for the first lane change, the process proceeds to step S24. In step S24, the first autonomous lane change control is completed using the autonomous lane change control function, and the presentation device 15 therefore presents the lane change information indicating that the first autonomous lane change is completed. When, in step S22, a determination is made that the subject vehicle has not reached the target position for the first lane change, the process returns to step S16 to continue the autonomous lane change control.

In step S25, the control device 19 uses the autonomous lane change control function to transition to the second autonomous lane change control. That is, in steps S25 to S29, like steps S4 and S6 to S8 of FIG. 5A and steps S16 to S18 of FIG. 5B, the object range OS after the required time T3 for the subject vehicle $V_0$ to move to the target position related to the second lane change (lane change from the lane L2 to the lane L3 of FIG. 3F) is detected and the lateral speed of the second autonomous lane change control is set.

The control device 19 determines the traffic congestion level K on the basis of the travel information acquired by using the autonomous lane change control function to set the lateral speed of the second autonomous lane change control. When the traffic congestion level K is used for setting start timing L of the autonomous lane change control in step S15, the traffic congestion level K can be used. The control device 19 compares the determined traffic congestion level K and the predetermined value Kth of the traffic congestion level by the autonomous lane change control function. When the traffic congestion level K is lower than the predetermined value Kth, the control device 19 sets the second lateral speed Vh2 for the second autonomous lane change control, as shown in the graph of FIG. 3F.

Further, when the traffic congestion level K is higher than the predetermined value Kth, the control device 19 calculates the fifth lateral speed Vh5 that is the lateral speed of the second autonomous lane change control by the autonomous lane change control function using the above-described equation (b). For example, when the second lateral speed Vh2 is 5 m/s and the coefficient C2 is 0.8, the fifth lateral speed Vh5 is 4 m/s. The control device 19 sets the calculated fifth lateral speed Vh5 as the lateral speed of the second autonomous lane change control.

Then, in step S29, the control device 19 uses the autonomous lane change control function to determine whether or not there is a space within the object range OS in the next adjacent lane L3 after the required time T3. The space corresponds to the required range RR acquired in step S9. The object range OS in the next adjacent lane L3 after the required time T3 is estimated in step S27. Then, the control device 19 uses the autonomous lane change control function to set a required range RR at the target position for the lane change. When the object range OS in the next adjacent lane L3 after the required time T3 includes the required range RR, the control device 19 determines that there is a space corresponding to the required range RR within the object range OS in the next adjacent lane L3 after the require time T3, and the process proceeds to step S28. On the other hand, when the control device 19 determines that there is not a space corresponding to the required range RR within the object range OS in the next adjacent lane L3 after the require time T3, the process proceeds to step S30. The process of step S30 and the subsequent processes will be described later with reference to FIG. 5E.

In step S31, the control device 19 uses the autonomous lane change control function to perform an acceptance request process for the second autonomous lane change control. In step S31, the control device 19 has determined a situation in which the autonomous control of consecutive lane changes is possible through the processes of steps S1 to S10 and has also determined a situation in which the second autonomous lane change control is possible through the processes of steps S25 to S29; therefore, before actually performing the second autonomous lane change control, the control device 19 requests the driver to make a reply as to whether or not to accept the execution of the second autonomous lane change control, in order to encourage the driver to confirm safety by himself/herself. In step S32, the control device 19 determines whether or not the driver accepts the second autonomous lane change control in response to the acceptance request in step S31. Since the acceptance request and the acceptance confirmation for the second autonomous lane change control are the same as those in the first autonomous lane change control, detailed description thereof is omitted.

In step S34, as in the previously described process of step S14, the control device 19 uses the autonomous lane change control function to acquire a time limit Z for the second lane change. In one or more embodiments of the present invention, as illustrated in FIG. 2, the table stores as the time limit Z the time for the subject vehicle to approach a point at which the lane change is difficult in each travel scene. The control device 19 uses the autonomous lane change control function to refer to the table illustrated in FIG. 2 to acquire the time limit Z in the travel scene of the subject vehicle. For example, in the "scene of lane transfer toward a destination" among the examples illustrated in FIG. 2, the time limit is stored as (a time to reach the lane change point—α) seconds. In this case, the control device 19 uses the travel control function to refer to the table illustrated in FIG. 2 to calculate the time to reach the lane change point and acquire (the calculated time to reach the lane change pointe—α) seconds as the time limit Z. The constant α is some seconds (e.g., 5 seconds) and can be set for each travel scene as appropriate. For example, when the time to reach the lane change point is 30 seconds and α is 5 seconds, the time limit Z for changing lanes is 25 seconds.

In step S35, a start process for the second autonomous lane change control is performed. In the start process for the autonomous lane change control, the control device 19 uses the autonomous lane change control function to set the start timing L at which the second autonomous lane change control is started. The method of setting the start timing L is not particularly limited, and the start timing L can be set, for example, with any of the methods (1) to (8) which are previously described for step S15 of FIG. 5B. After setting the start timing L, the control device 19 may set, before starting the second autonomous lane change control, the preliminary notice presentation timing P for presenting the lane change information indicating that the second autonomous lane change control will be started.

When the set start timing L is reached, the control device 19 uses the autonomous lane change control function to start the second autonomous lane change control. Specifically, the control device 19 uses the autonomous lane change control function to allow the drive control device 18 to start control of the operation of the steering actuator so that the subject vehicle moves to the target position for changing lanes which is set in step S5 or step S11 of FIG. 5A. After the autonomous lane change control is started, the presentation device 15 may present the lane change information indicating that the autonomous lane change control is being performed.

The control device 19 controls the lateral speed of the second autonomous lane change control by the autonomous lane change control function. The control device 19 decelerates the lateral speed Vh of the subject vehicle $V_0$ from the first lateral speed Vh1 to the fifth lateral speed Vh5 in the adjacent lane L2 and performs the lane change from the adjacent lane L2 to the next adjacent lane L3 while maintaining the fifth lateral speed Vh5 by the autonomous lane change control function, as shown in the graph of FIG. 3F.

Figure 5D:
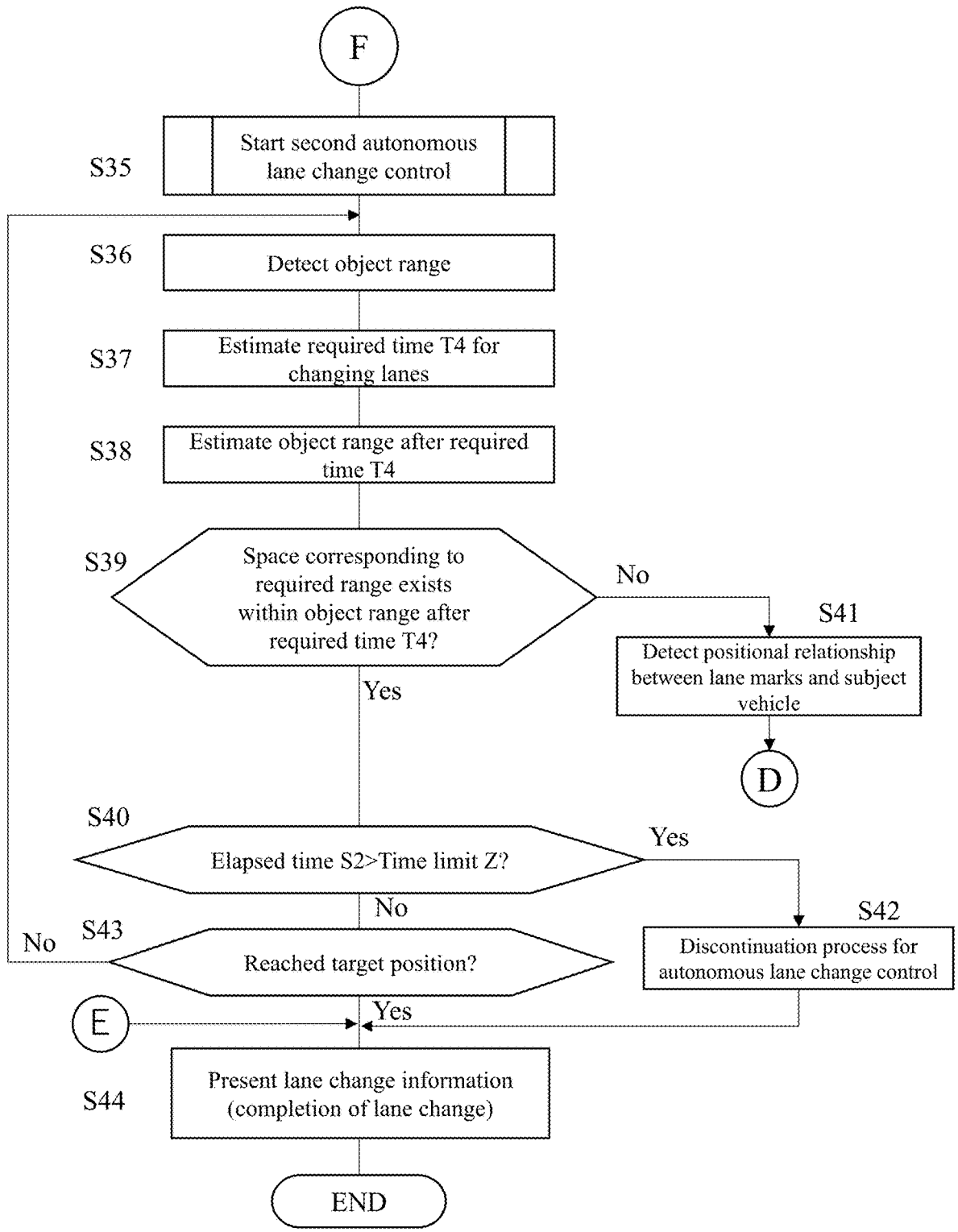
FIG. 5D is a flowchart (part 4) illustrating the autonomous lane change control process performed by the travel control apparatus for a vehicle according to the embodiment of the present invention.

In steps S36 to S38 of FIG. 5D, like steps S4 and S7 to S8 of FIG. 5A and steps S16 to S18 of FIG. 5B, the current object range OS and the object range OS after the required time T4 for the subject vehicle $V_0$ to move to the target position related to the second lane change (lane change from the lane L2 to the lane L3 of FIG. 3F) are detected. Then, in step S39, the control device 19 uses the autonomous lane change control function to determine whether or not there is a space within the object range OS in the next adjacent lane L3 after the required time T4. The space corresponds to the required range RR acquired in step S9. The object range OS in the next adjacent lane L3 after the required time T4 is estimated in step S38. Then, the control device 19 uses the autonomous lane change control function to set a required range RR at the target position for the second lane change. When the object range OS in the next adjacent lane L3 after the required time T4 includes the required range RR, the control device 19 determines that there is a space corresponding to the required range RR within the object range OS in the next adjacent lane L3 after the require time T4, and the process proceeds to step S40. On the other hand, when the control device 19 determines that there is not a space corresponding to the required range RR within the object range OS in the next adjacent lane L3 after the require time T4, the process proceeds to step S41. The process of step S41 and the subsequent processes will be described later with reference to FIG. 5E.

In step S40, the control device 19 uses the autonomous lane change control function to determine whether or not the time limit Z acquired in step S34 has elapsed since the second autonomous lane change control was started in step S35. When the elapsed time S2 after starting the second autonomous lane change control exceeds the time limit Z, that is, when the target position for the second lane change cannot be reached even after the time limit Z has elapsed since the autonomous lane change control was started, the process proceeds to step S42. In step S42, the control device 19 uses the autonomous lane change control function to perform a discontinuation process for the second autonomous lane change control. Specifically, the control device 19 uses the autonomous lane change control function to announce the information indicating that the autonomous lane change control will be discontinued to the driver. For example, the control device 19 controls the presentation device 15 to announce a message "Lane changes will be discontinued due to time out" to the driver and then concludes the autonomous lane change control. In the discontinuation process for the autonomous lane change control, the control device 19 may leave the traveling position of the subject vehicle in the road width direction at the position at which the autonomous lane change control is concluded or may also recover the traveling position to the position at which the autonomous lane change control is started. When the traveling position is recovered to the position at which the autonomous lane change control is started, a message may be announced to the driver, such as "The original position will be recovered due to time out."

On the other hand, when, in step S40, the elapsed time S2 from the start of the second autonomous lane change control does not exceed the time limit Z, the process proceeds to step S43. In step S43, the control device 19 uses the autonomous lane change control function to determine whether or not the subject vehicle has reached the target position for the second lane change. When the subject vehicle has reached the target position for the second lane change, the process proceeds to step S44. In step S44, the second autonomous lane change control is completed using the autonomous lane change control function, and the presentation device 15 therefore presents the lane change information indicating that the second autonomous lane change control is completed, that is, the autonomous control of consecutive lane changes is completed. When, in step S43, a determination is made that the subject vehicle has not reached the target position for the second lane change, the process returns to step S36 to continue the autonomous lane change control.

When, in step S19 of FIG. 5B, a determination is made that there is not a space corresponding to the required range RR within the object range OS in each of the adjacent lane L2 and the next adjacent lane L3 after the required time T2, the process proceeds to step S20. That is, when there was a space corresponding to the required range RR within the object range OS in each of the adjacent lane L2 and the next adjacent lane L3 at the time point of step S10 of starting the autonomous control of consecutive lane changes but there is not a space corresponding to the required range RR within the object range OS in each of the adjacent lane L2 and the next adjacent lane L3 after starting the first autonomous lane change control, the process proceeds to step S20. In step S20, detection is performed for the positional relationship in the road width direction between the subject vehicle and lane marks which the subject vehicle gets across when changing lanes (also referred to as "object lane marks," hereinafter).

Figure 10:
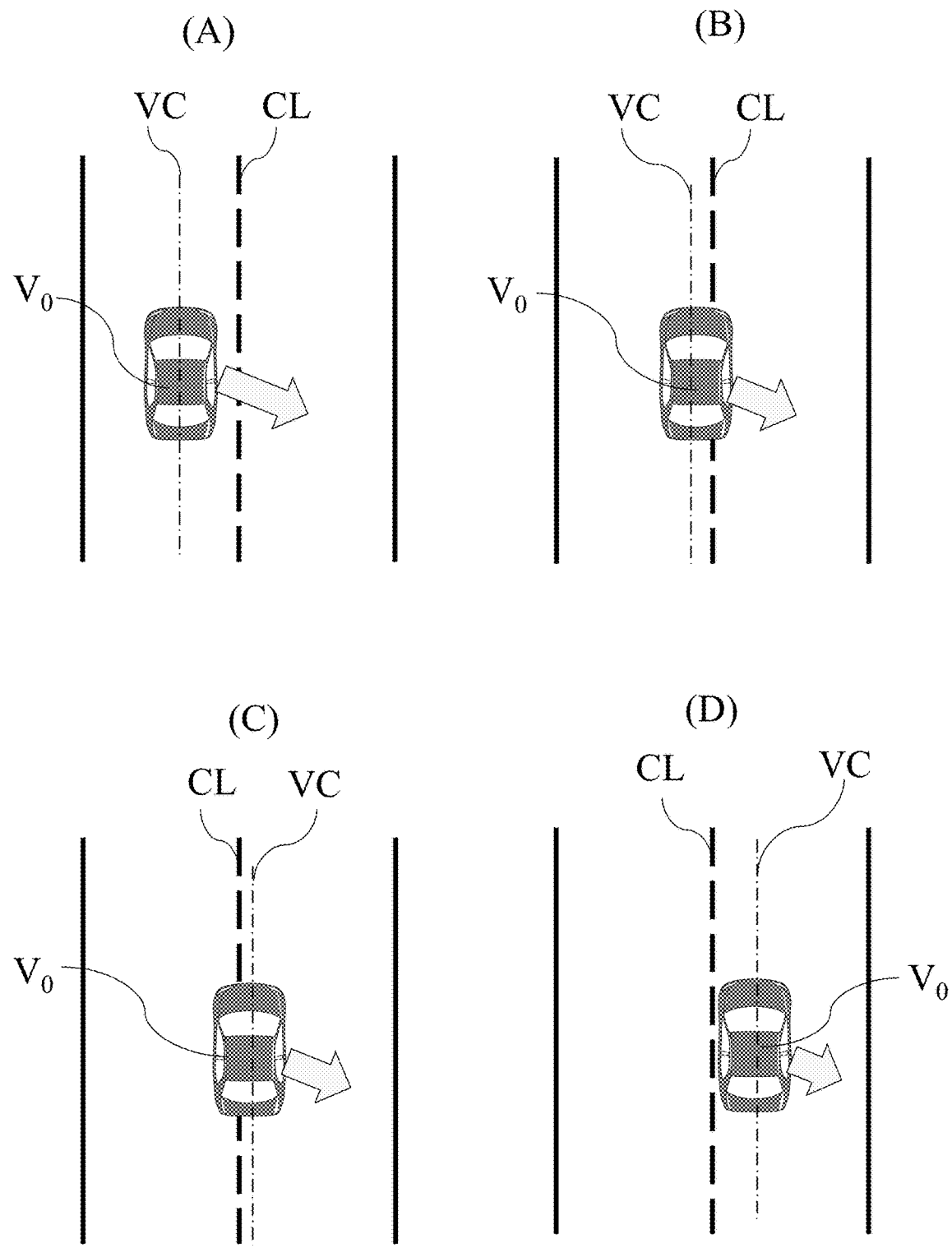
FIG. 10 is a set of diagrams for describing the positional relationship in the road width direction between object lane marks and the subject vehicle according to the embodiment of the present invention.

For example, FIG. 10 exemplifies scenes in which the subject vehicle $V_0$ changes lanes in the direction indicated by arrows in the figure (lane change from the left-side lane to the right-side lane in the figure). In this case, the control device 19 uses the autonomous lane change control function to determine any of a state in which no part of the subject vehicle $V_0$ gets across the object lane marks CL as illustrated in FIG. 10(A), a state in which a part of the subject vehicle $V_0$ gets across the object lane marks CL but the center line VC of the subject vehicle $V_0$ does not get across the object lane marks CL as illustrated in FIG. 10(B), a state in which the whole of the subject vehicle $V_0$ does not get across the object lane marks CL but the center line VC of the subject vehicle $V_0$ gets across the object lane marks CL as illustrated in FIG. 10(C), and a state in which the whole of the subject vehicle $V_0$ gets across the object lane marks CL as illustrated in FIG. 10(D).

Figure 5E:
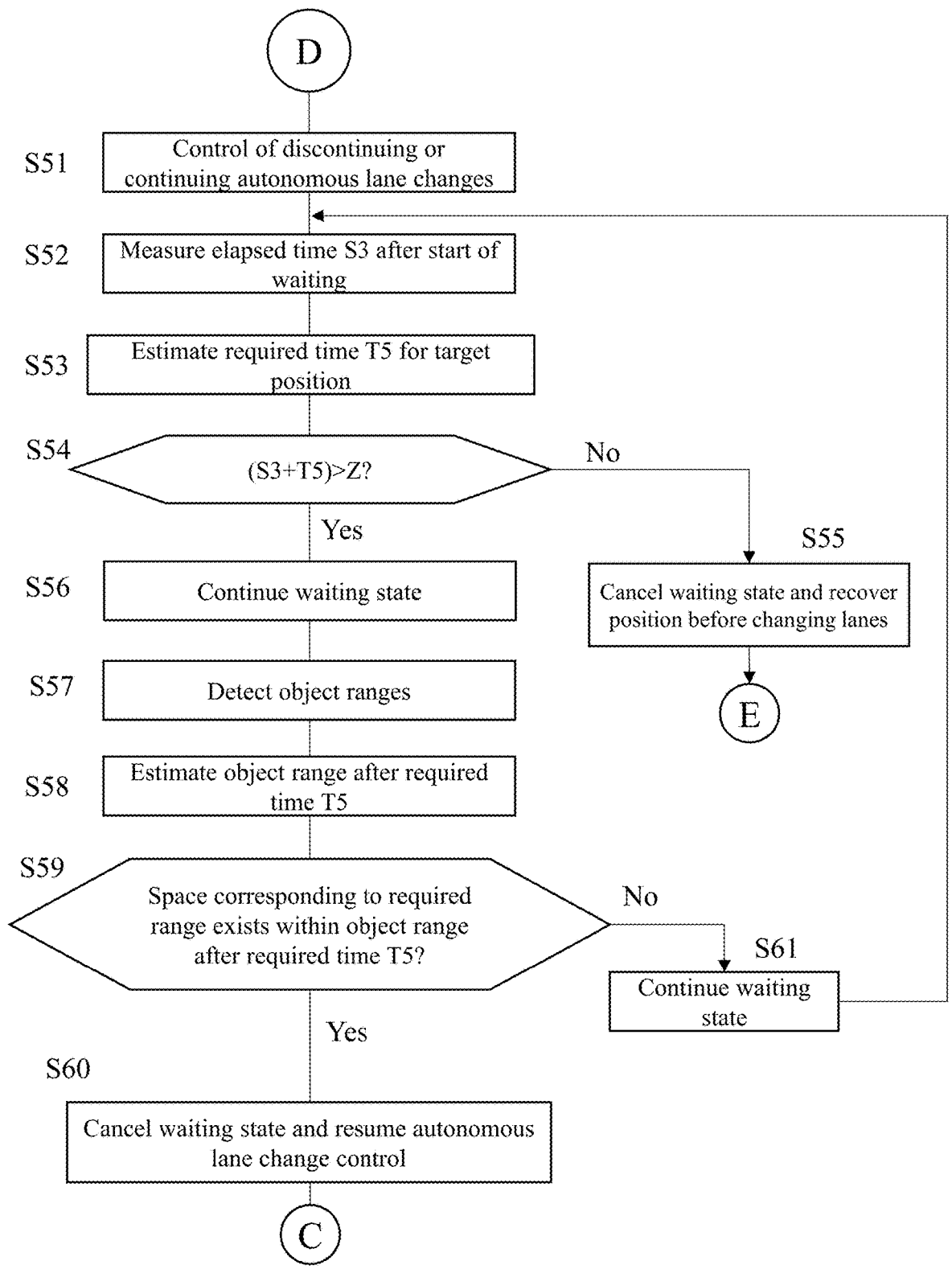
FIG. 5E is a flowchart (part 5) illustrating the autonomous lane change control process performed by the travel control apparatus for a vehicle according to the embodiment of the present invention.

In step S51 illustrated in FIG. 5E, the control device 19 uses the autonomous lane change control function to perform a control process for discontinuing or continuing the autonomous lane change control, on the basis of the positional relationship in the road width direction between the object lane marks CL and the subject vehicle $V_0$ determined in step S19 of FIG. 5B. Specifically, the control device 19 uses the autonomous lane change control function to determine (a) a method of presenting information to the driver when discontinuing or continuing the autonomous lane change control, (b) control after discontinuing or continuing the autonomous lane change control, and (c) a traveling position of the subject vehicle $V_0$ when discontinuing or continuing the autonomous lane change control, on the basis of the positional relationship in the road width direction between the object lane marks CL and the subject vehicle $V_0$.

For example, the control device 19 uses the autonomous lane change control function to carry out any of the following four methods as the method (a) of presenting information to the driver when discontinuing or continuing the autonomous lane change control: (a1) a method that includes presenting information for allowing the driver to select between options of discontinuing and continuing the autonomous lane change control without time limit and, when the driver selects any of the options, performing control of the option (discontinuing or continuing the autonomous lane change control) selected by the driver; (a2) a method that includes presenting information for allowing the driver to select between options of discontinuing and continuing lane change with time limit and, when the driver selects any of the options within the time limit, performing control of the option (discontinuing or continuing the autonomous lane change control) selected by the driver or, when the driver does not select between the options within the time limit, performing control (default control) of a predetermined option among the options of discontinuing and continuing the autonomous lane change control; (a3) a method that includes autonomously performing discontinuation or continuation of the autonomous lane change control and expressly providing the driver with a method of canceling the discontinuation or continuation of the autonomous lane change control which is autonomously performed; and (a4) a method that includes autonomously performing discontinuation or continuation of the autonomous lane change control without expressly providing the driver with a method of canceling the discontinuation or continuation of the autonomous lane change control which is autonomously performed.

Additionally or alternatively, the control device 19 uses the autonomous lane change control function to carry out any of the following three control schemes as the control content (b) after discontinuing or continuing the autonomous lane change control: (b1) a scheme that includes discontinuing the autonomous lane change control and also discontinuing the autonomous travel control; (b2) a scheme that includes discontinuing only the autonomous lane change control and continuing the autonomous travel control; and (b3) a scheme that includes suspending the autonomous lane change control into a waiting state until a space corresponding to the required range RR is detected again within the object range OS in each of the adjacent lane L2 and the next adjacent lane L3 and resuming the autonomous lane change control when a space corresponding to the required range RR is detected again within the object range OS in each of the adjacent lane L2 and the next adjacent lane L3.

Additionally or alternatively, the control device 19 uses the autonomous lane change control function to carry out any of the following three positional adjustment schemes for the traveling position (c) of the subject vehicle when discontinuing or continuing the autonomous lane change control: (c1) a scheme that includes recovering the position of the subject vehicle to the original position before starting the autonomous lane change control; (c2) a scheme that includes moving the subject vehicle to a position in the vicinity of the object lane marks CL in the lane in which the subject vehicle traveled before starting the autonomous lane change control; and (c3) a scheme that includes maintaining the current position.

The control device 19 uses the autonomous lane change control function to perform the control process for discontinuing or continuing the autonomous lane change control by appropriately combining two or more of the method (a) of presenting information to the driver when discontinuing or continuing the autonomous lane change control, the control content (b) after discontinuing or continuing the autonomous lane change control, and the traveling position (c) of the subject vehicle when discontinuing or continuing the autonomous lane change control, on the basis of the positional relationship in the road width direction between the object lane marks CL and the subject vehicle $V_0$.

For example, when no part of the subject vehicle $V_0$ gets across the object lane marks CL as illustrated in FIG. 10(A), the control device 19 can carry out the method (a4) that includes autonomously performing discontinuation of the autonomous lane change control without expressly providing the driver with a method of canceling the discontinuation of the autonomous lane change control. In this case, the control device 19 can use the autonomous lane change control function to carry out the scheme (b1) that includes discontinuing the autonomous lane change control and also discontinuing the autonomous travel control and the scheme (c1) that includes recovering the position of the subject vehicle to the original position before starting the autonomous lane change control. In such a case, the control device 19 can announce the control content to be performed from that time for discontinuing the autonomous lane change control to the driver, such as "Position will be recovered to the original position because the space for changing lanes may be insufficient" and "Autonomous travel control will be canceled after recovery to the original position." In this case, the process proceeds to step S44 of FIG. 5D to conclude the autonomous lane change control.

When a part of the subject vehicle $V_0$ gets across the object lane marks CL but the center line VC of the subject vehicle $V_0$ does not get across the object lane marks CL as illustrated in FIG. 10(B), the control device 19 can carry out the method (a3) that includes autonomously performing discontinuation of the autonomous lane change control and expressly providing the driver with a method of canceling the discontinuation of the autonomous lane change control. In this case, the control device 19 can use the autonomous lane change control function to carry out the scheme (c2) that includes moving the subject vehicle $V_0$ to a position in the vicinity of the object lane marks CL in the lane in which the subject vehicle traveled before starting the autonomous lane change control and then carry out the scheme (b2) that includes discontinuing only the autonomous lane change control and continuing the autonomous travel control. In such a case, the control device 19 can announce the control content to be performed from that time for discontinuing the autonomous lane change control to the driver, such as "Position will be recovered into the original lane because the space for changing lanes may be insufficient" and "Previous autonomous travel control will be continued after recovery to the original position." Additionally or alternatively, the control device 19 can display a message "Please press the button below if lane changes should be continued" together with a button for continuing the autonomous lane change control. When the driver presses the button for continuing the autonomous lane change control, the process proceeds to step S52 of FIG. 5E, while when the driver does not press the button for continuing the autonomous lane change control, the process proceeds to step S44 of FIG. 5D.

When the whole of the subject vehicle $V_0$ does not get across the object lane marks CL but the center line VC of the subject vehicle $V_0$ gets across the object lane marks CL as illustrated in FIG. 10(C), the control device 19 can carry out the method (a4) that includes autonomously performing continuation of the autonomous lane change control without expressly providing the driver with a method of canceling the continuation of the autonomous lane change control. In this case, the control device 19 can carry out the scheme (c3) that includes waiting while maintaining the traveling position of the subject vehicle at the current position and the scheme (b3) that includes suspending the autonomous lane change control until a space corresponding to the required range RR is detected again within the object range OS in each of the adjacent lane L2 and the next adjacent lane L3 and resuming the autonomous lane change control when a space corresponding to the required range RR is detected again within the object range OS in each of the adjacent lane L2 and the next adjacent lane L3. In this case, for example, the control device 19 can announce the control content to be performed from that time for continuing the autonomous lane change control to the driver, such as "Waiting will be conducted at the current position because the space for changing lanes may be insufficient" and "Autonomous lane change control will be resumed if a space for changing lanes is found." In this case, the process proceeds to step S52 of FIG. 5E.

When the whole of the subject vehicle $V_0$ gets across the object lane marks CL as illustrated in FIG. 10(D), the control device 19 can carry out the method (a4) that includes autonomously performing discontinuation of the autonomous lane change control without expressly providing the driver with a method of canceling the discontinuation of the autonomous lane change control. In this case, the control device 19 can carry out the scheme (c3) that includes maintaining the traveling position of the subject vehicle at the current position and the scheme (b2) that includes discontinuing only the autonomous lane change control and continuing the autonomous travel control. In this case, the control device 19 can announce the control content to be performed from that time for discontinuing the autonomous lane change control to the driver, such as "Waiting will be conducted at the current position because the space for changing lanes may be insufficient" and "Previous autonomous travel control will be continued." In this case, the process proceeds to step S44 of FIG. 5D to conclude the travel control process.

The positional relationship in the road width direction between the object lane marks CL and the subject vehicle $V_0$ is not limited to the four scenes illustrated in FIGS. 10(A) to (D) and five or more or three or less possible scenes may be employed. The combination of control schemes for each positional relationship is not limited to the above-described combinations. Any combination is possible among two or more of the method (a) of presenting information to the driver when discontinuing or continuing the autonomous lane change control, the control content (b) after discontinuing or continuing the autonomous lane change control, and the traveling position (c) of the subject vehicle when discontinuing or continuing the autonomous lane change control.

Description will then be made for a case in which continuation of the autonomous lane change control is performed in step S51 of FIG. 5E. Step S51 of starting the continuation of the autonomous lane change control is followed by step S52. In step S52, the control device 19 uses the autonomous lane change control function to measure an elapsed time S3 after the autonomous lane change control comes to a waiting state in step S51. That is, in one or more embodiments of the present invention, when the autonomous lane change control is continued in step S51, the autonomous lane change control is suspended and the autonomous lane change control comes to a waiting state until a space corresponding to the required range RR is detected again in the object range OS in each of the adjacent lane L2 and the next adjacent lane L3. In step S52, the elapsed time S3 after starting the waiting of the autonomous lane change control in this manner is measured.

In step S53, the control device 19 uses the autonomous lane change control function to estimate a required time T5 for the subject vehicle to move from the current position to the target position for changing lanes. The required time T5 can be estimated in the same method as in step S7 of FIG. 5A.

In step S54, the control device 19 uses the autonomous lane change control function to determine whether or not the total time (S3+T5) of the elapsed time S3 measured in step S52 and the required time T5 estimated in step S53 exceeds the time limit Z acquired in step S14 of FIG. 5B. When the total time (S3+T5) exceeds the time limit Z, the process proceeds to step S55, in which the control device 19 uses the autonomous lane change control function to cancel the waiting state of the autonomous lane change control and move the subject vehicle to the traveling position of the subject vehicle before start of the autonomous lane change control. Step S55 is followed by step S44 of FIG. 5D, in which the autonomous lane change control is concluded. On the other hand, when the total time (S3+T5) does not exceed the time limit Z, the process proceeds to step S56.

In step S56, the control device 19 continues the waiting state of the autonomous lane change control. Step S56 is followed by steps S57 to S58, in which the current object range and the object range after the required time T5 are detected as in steps S4 and S8 of FIG. 5A. Then, in step S59, as in step S10 of FIG. 5A, the control device 19 determines whether or not there is a space corresponding to the required range RR within the object range OS in each of the adjacent lane L2 and the next adjacent lane L3 after the required time T5. The object range OS in each of the adjacent lane L2 and the next adjacent lane L3 after the required time T5 is estimated in step S58. In step S59, the control device 19 sets the required range RR at the target position for changing lanes. When the object range OS in each of the adjacent lane L2 and the next adjacent lane L3 after the required time T5 includes the required range RR, the control device 19 determines that there is a space corresponding to the required range RR within the object range OS in each of the adjacent lane L2 and the next adjacent lane L3 after the required time T5, and the process proceeds to step S60. In step S60, the control device 19 uses the autonomous lane change control function to cancel the waiting state of the autonomous lane change control and resume the autonomous lane change control because a space corresponding to the required range RR is detected within the object range OS in each of the adjacent lane L2 and the next adjacent lane L3. The process in this case returns to step S16 of FIG. 5B. On the other hand, when a determination is made in step S59 that there is not a space corresponding to the required range RR within the object range in each of the adjacent lane L2 and the next adjacent lane L3 after the required time T5, the process proceeds to step S61, in which the waiting state of the autonomous lane change control is continued, and the process returns to step S52.

The above processes illustrated in FIG. 5E are borrowed for the process of step S30 of FIG. 5C and the subsequent processes and the process of step S41 of FIG. 5D and the subsequent processes. However, in the process of step S30 of FIG. 5C and the subsequent processes, the processing returns from step S60 of FIG. 5E to step S25 of FIG. 5C, and in the process of step S43 of FIG. 5D and the subsequent processes, the processing returns from step S60 of FIG. 5E to step S36 of FIG. 5D.

In step S6 of FIG. 5A and step S26 of FIG. 5C, an example of performing the third embodiment for setting the lateral speed of the second and subsequent autonomous lane change control according to the traffic congestion level K. However, the present invention is not limited to this example. In place of the third embodiment, either the second embodiment in which the lateral speed of the second and subsequent autonomous lane change control is set according to the direction of the lane change, the fourth embodiment in which the lateral speed of the second and subsequent autonomous lane change control is set according to the radius Lr of the track, or the fifth embodiment in which the lateral speed of the second and subsequent autonomous lane change control is set according to the rainfall Rf may be performed. Alternatively, the second to fifth embodiments may be combined as appropriate to be performed in steps S6 and S26.

As described above, according to the present embodiment of the travel control apparatus 1 and travel control method for a vehicle, the second lateral speed Vh2 for performing the second and subsequent autonomous lane change control is set lower than the first lateral speed Vh1 for performing the first autonomous lane change control when the autonomous lane change control to another adjacent lane in the same direction of lane change (from the adjacent lane L2 to the next adjacent lane L3) is performed after the subject vehicle $V_0$ performs the first autonomous lane change control from the subject vehicle lane L1 to the adjacent lane L2. Thus, the second autonomous lane change control is performed at lower speed than the first autonomous lane change control. As a result, the time for confirming the surrounding situations with the sensors 11 and the like prior to starting the second and subsequent lane changes is lengthened, and the surrounding situations are properly confirmed. Further, by performing the second autonomous lane change control at speed lower than that of the first autonomous lane change control, time that a following vehicle uses to confirm the lane change of the subject vehicle $V_0$ is lengthened. As a result, the following vehicle can easily recognize the lane change of the subject vehicle $V_0$. Accordingly, the safety of the autonomous lane change control is further enhanced.

Further, according to the present embodiment of the travel control apparatus 1 and travel control method for a vehicle, the lateral speed when performing the autonomous lane change control is moving speed when the subject vehicle $V_0$ crosses the object lane mark CL provided between the lanes. In other words, since the moving speed when actually moving between two adjacent lanes is controlled as the lateral speed in the autonomous lane change control, by controlling the lateral speed, the adjustment of the time required to confirm the surrounding situations and the adjustment of the time required to make the following vehicle recognize the lane change of the subject vehicle $V_0$ can be easily controlled.

Further, according to the present embodiment of the travel control apparatus 1 and travel control method for a vehicle, the travel information on the traveling state of the subject vehicle $V_0$ is acquired; and the lateral speed for performing the second and subsequent autonomous lane change control is set on the basis of the acquired travel information. In other words, on the basis of the travel information, when it is determined that the surrounding situations are difficult to be confirmed under the current traveling condition, or when it is determined that the lane change of the subject vehicle $V_0$ is difficult to be confirmed from the following vehicle $V_3$, the lateral speed of the second and subsequent autonomous lane change control is set. By performing the second and subsequent autonomous lane change control at lower speed according to the traveling condition, it is possible to more appropriately confirm the surrounding situations. In addition, by performing the second and subsequent autonomous lane change control at lower speed according to the traveling condition, the following vehicle can clearly recognize the lane change of the subject vehicle $V_0$.

Further, according to the present embodiment of the travel control apparatus 1 and travel control method for a vehicle, it is determined whether or not the average traveling speed of the subject vehicle lane in which the subject vehicle $V_0$ travels is faster than the average traveling speed of the lane to which the subject vehicle $V_0$ changes lanes on the basis of the acquired travel information; and when the average traveling speed of the lane to which the subject vehicle changes lanes is faster than the average traveling speed of the subject vehicle lane, the lateral speed to be set for performing the second and subsequent autonomous lane change control is set slower than the lateral speed to be set when the average traveling speed of the lane to which the subject vehicle changes lanes is slower than the average traveling speed of the subject vehicle lane. In other words, when the lane change from the lane of which the traveling speed is slow to the lane of which the traveling speed is fast is performed, the relative speed of the following vehicle with respect to the subject vehicle $V_0$ becomes fast, and the distance between the subject vehicle $V_0$ and the following vehicle becomes short. Thus, the time for confirming the surrounding situations for the second and subsequent lane changes become short. However, in the present embodiment, since the second and subsequent autonomous lane change control is performed at lower speed when the lane change from the lane of which the traveling speed is slow to the lane of which the traveling speed is fast is performed, the surrounding situations can be more properly confirmed, and the following vehicle can clearly recognize the lane change of the subject vehicle $V_0$.

Further, according to the present embodiment of the travel control apparatus 1 and travel control method for a vehicle, the information on the other vehicle traveling around the subject vehicle $V_0$ is acquired as the travel information; the traffic congestion level K of the road is determined on the basis of the information on the other vehicle; and the lateral speed for performing the second and subsequent autonomous lane change control is set corresponding to the traffic congestion level K. That is, when the traffic congestion level K around the subject vehicle $V_0$ is higher, a distance between the subject vehicle $V_0$ and the other vehicle around the subject vehicle $V_0$ becomes small. Thus, the time that the subject vehicle $V_0$ can use for confirming the surrounding situations for the second and subsequent lane changes is shortened. However, in the present embodiment, since the second and subsequent autonomous lane change control is performed at lower speed according to the traffic congestion level K, the surrounding situations can be more properly confirmed, and the following vehicle can clearly recognize the lane change of the subject vehicle $V_0$.

Further, according to the present embodiment of the travel control apparatus 1 and travel control method for a vehicle, the radius of the track in which the subject vehicle $V_0$ travels is acquired as the travel information; and the lateral speed for performing the second and subsequent autonomous lane change control is set corresponding to the radius of the track. In other words, when the radius Lr of the track is small, the driver cannot see far ahead, and therefore it becomes difficult for the subject vehicle $V_0$ to confirm the surrounding situations with the sensors 11 and the like for the second lane change. However, in the present embodiment, since the second and subsequent autonomous lane change control is performed at lower speed according to the radius Lr of the track, the surrounding situations can be more properly confirmed, and the following vehicle can clearly recognize the lane change of the subject vehicle $V_0$.

Further, according to the present embodiment of the travel control apparatus 1 and travel control method for a vehicle, the information on the rainfall Rf is acquired as the travel information; and the lateral speed for performing the second and subsequent autonomous lane change control is set corresponding to the rainfall Rf. In other words, when the rainfall Rf is large, the surrounding situations are difficult to be confirmed for the second lane change with the sensors 11 and the like of the subject vehicle $V_0$. However, in the present embodiment, since the second and subsequent autonomous lane change control is performed at lower speed according to the rainfall Rf, the surrounding situations can be confirmed more properly, and the following vehicle can clearly recognize the lane change of the subject vehicle $V_0$.

Further, according to the present embodiment of the travel control apparatus 1 and travel control method for a vehicle, the lateral speed of the (n+2)th autonomous lane change control is set to be the same as or slower than the lateral speed of the (n+1)th autonomous lane change control. As a result, even when three or more times of the consecutive autonomous lane change control is performed, the autonomous lane change control can be performed at lower speed, the surrounding situations can be confirmed more properly, and the lane change of the subject vehicle $V_0$ can be clearly recognized by the following vehicle.

DESCRIPTION OF REFERENCE NUMERALS

1 Travel control apparatus
11 Sensors
12 Subject vehicle position detection device
13 Map database
14 Onboard equipment
15 Presentation device
16 Input device
17 Communication device
18 Drive control device
19 Control device
$V_0$ Subject vehicle
$V_1$ Another vehicle
$V_2$ Preceding vehicle
$V_3$ Following vehicle
L1, L2, L3, L4 Lane
RS Road shoulder
OS Object range
RR Required range
RA Range in which subject vehicle cannot travel
RL Lane change prohibition mark CL Object lane mark
VC Center line of subject vehicle
Vh1 First lateral speed
Vh2 Second lateral speed
Vh3 Third lateral speed
Vh4 Fourth lateral speed
Vh5 Fifth lateral speed
Vh6 Sixth lateral speed
Vh7 Seventh lateral speed

The invention claimed is:

1. A travel control method for a vehicle comprising:
performing a first autonomous lane change control by which a subject vehicle changes lanes from a subject vehicle lane in which the subject vehicle travels to a first adjacent lane in a direction towards a target lane;
consecutively performing one or more additional autonomous lane change controls that are subsequent to the first autonomous lane change control by which the subject vehicle changes lanes from the first adjacent lane to another adjacent lane that is subsequent to the first adjacent lane in the direction towards the target lane;
setting a lateral speed for performing the first autonomous lane change control before performing the first autonomous lane change control; and
setting a lateral speed for performing each of the one or more additional autonomous lane change controls before performing each of the one or more additional autonomous lane change controls,
wherein the lateral speed for performing each of the one or more additional autonomous lane change controls is set slower than the lateral speed for performing the first autonomous lane change control.

2. The travel control method for a vehicle according to claim 1, wherein the lateral speed of the first autonomous lane change control and the one or more additional autonomous lane change controls is a lateral speed when the subject vehicle crosses a lane mark provided between lanes.

3. The travel control method for a vehicle according to claim 1, comprising:
acquiring travel information on a traveling state of the subject vehicle; and
setting the lateral speed for performing the one or more additional autonomous lane change controls on a basis of the acquired travel information.

4. The travel control method for a vehicle according to claim 3, comprising:
determining whether or not average traveling speed of the subject vehicle lane in which the subject vehicle travels is faster than average traveling speed of a lane to which the subject vehicle changes lanes, on a basis of the acquired travel information; and
when the average traveling speed of the lane to which the subject vehicle changes lanes is faster than the average traveling speed of the subject vehicle lane, setting the lateral speed to be set for performing the one or more additional autonomous lane change controls slower than the lateral speed when the average traveling speed of the lane to which the subject vehicle changes lanes is slower than the average traveling speed of the subject vehicle lane.

5. The travel control method for a vehicle according to claim 3, comprising:
acquiring information on another vehicle traveling around the subject vehicle;
determining a congestion level of a road on a basis of the information on the other vehicle; and
setting the lateral speed for performing the one or more additional autonomous lane change controls corresponding to the congestion level.

6. The travel control method for a vehicle according to claim 3, comprising:
acquiring a radius of a track in which the subject vehicle travels as the travel information; and
setting the lateral speed for performing the second and subsequent autonomous lane change control corresponding to the radius of the track.

7. The travel control method for a vehicle according to claim 3, comprising:
acquiring information on rainfall as the travel information; and
setting the lateral speed for performing the one or more additional autonomous lane change controls corresponding to the rainfall.

8. The travel control method for a vehicle according to claim 1, wherein
the one or more additional autonomous lane change controls includes (n+1)th autonomous lane change control after the first autonomous lane change control and (n+2)th autonomous lane change control, n being a natural number, and
a lateral speed of the (n+2)th autonomous lane change control is set to be the same as or slower than a lateral speed of the (n+1)th autonomous lane change control.

9. A travel control apparatus for a vehicle, the travel control apparatus comprising a controller, wherein the controller is configured to:
perform first autonomous lane change control by which a subject vehicle changes lanes from a subject vehicle lane in which the subject vehicle travels to a first adjacent lane in a direction towards a target lane;
consecutively perform one or more additional autonomous lane change controls by which the subject vehicle changes lanes from the first adjacent lane to another adjacent lane that is subsequent to the first adjacent lane in the direction of the direction of the target lane;
set a lateral speed for performing the first autonomous lane change control before performing the first autonomous lane change control; and
set a lateral speed for performing each of the one or more additional autonomous lane change controls before performing each of the one or more additional autonomous lane change controls,
wherein the lateral speed for performing the each of the one or more additional autonomous lane change controls is set slower than the lateral speed for performing the first autonomous lane change control.

10. The travel control method for the vehicle according to claim 1, further comprising:
determining the target lane and pathway for performing one or more autonomous lane change controls at different lateral speeds before performing the first autonomous lane change control.

11. The travel control method for the vehicle according to claim 10, further comprising:
setting the lateral speed of the first autonomous lane change control and each of the one or more autonomous lane change controls before performing the first autonomous lane change control.

12. The travel control method for the vehicle according to claim 1, further comprising:
setting the lateral speed of each of the one or more autonomous lane change controls based on a predetermined time so that one or more sensors of the subject vehicle have a lengthened period of time to confirm the surrounding of the subject vehicle.

13. The travel control method for the vehicle according to claim 1, further comprising:
   determining whether a driver accepts the first autonomous lane change control in response to an acceptance request;
   performing the first autonomous lane change control when it is determined that the driver accepts the first autonomous lane change control in response to the acceptance request;
   determining whether the driver accepts the one or more additional autonomous lane change controls in response to the acceptance request; and
   performing the one or more additional autonomous lane change controls when it is determined that the driver accepts the one or more additional autonomous lane change controls in response to the acceptance request.

* * * * *